(12) United States Patent
Nonoshita et al.

(10) Patent No.: US 7,824,287 B2
(45) Date of Patent: Nov. 2, 2010

(54) BICYCLE SPROCKET

(75) Inventors: Tetsu Nonoshita, Izumi (JP); Hideya Inoue, Sakai (JP); Atsuhiro Emura, Sakai (JP)

(73) Assignee: Shimano Inc., Osaka (JP)

( * ) Notice: Subject to any disclaimer, the term of this patent is extended or adjusted under 35 U.S.C. 154(b) by 1291 days.

(21) Appl. No.: 11/291,847

(22) Filed: Dec. 2, 2005

(65) Prior Publication Data
US 2007/0129193 A1  Jun. 7, 2007

(51) Int. Cl.
*F16H 55/30* (2006.01)

(52) U.S. Cl. .......... 474/161; 474/152; 474/160

(58) Field of Classification Search .......... 474/152, 474/160, 175, 161, 902; F16H 55/30
See application file for complete search history.

(56) References Cited

U.S. PATENT DOCUMENTS

| | | | |
|---|---|---|---|
| 3,469,465 A | | 9/1969 | Bebbington, Jr. et al. |
| 4,078,445 A | * | 3/1978 | Kiser, Jr. .......... 474/150 |
| 4,144,773 A | * | 3/1979 | Addicks .......... 474/161 |
| 4,318,310 A | | 3/1982 | Segawa |
| 4,453,924 A | * | 6/1984 | Sugino .......... 474/160 |
| 4,475,894 A | | 10/1984 | Sugino |
| 4,589,860 A | | 5/1986 | Brandenstein et al. |
| 4,867,733 A | * | 9/1989 | Yamanoi et al. .......... 474/161 |
| 4,869,709 A | | 9/1989 | Nagano |
| 5,360,378 A | | 11/1994 | Suzuki et al. |
| 5,852,951 A | | 12/1998 | Santi |
| 6,064,027 A | | 5/2000 | Santi |
| 2005/0032596 A1 | | 2/2005 | Nonoshita et al. |
| 2006/0205549 A1 | | 9/2006 | Nonoshita et al. |

FOREIGN PATENT DOCUMENTS

| | | |
|---|---|---|
| CN | 1830722 | 9/2006 |
| DE | 20218755-UA | 2/2003 |
| EP | 0002964 A1 | 7/1979 |
| EP | 1 504 988 A2 | 2/2005 |
| FR | 983303 | 6/1951 |
| FR | 2 487 772 A1 | 2/1982 |
| FR | 2 527 543 A1 | 12/1983 |
| JP | 56-147960 A | 11/1981 |
| JP | 63-180768 A | 7/1988 |
| JP | 63-126658 U | 8/1988 |
| JP | 63-126659 U | 8/1988 |

(Continued)

*Primary Examiner*—Robert A Siconolfi
*Assistant Examiner*—Vu Q Nguyen
(74) *Attorney, Agent, or Firm*—Global IP Counselors, LLP

(57) ABSTRACT

A bicycle sprocket is provided that has a sprocket ring part, a synthetic resin fastening part and at least one attachment part. The synthetic resin fastening part is non-movably coupled to the sprocket ring part at a location radially inwardly of the sprocket teeth relative to the rotation axis. The least one attachment part is at least partially embedded within the synthetic resin fastening part. The attachment part includes a connecting portion and a radial projecting portion extending outwardly from the connecting portion to space the connecting portion radially inward of the sprocket ring part. The attachment part is formed as a separate member from the sprocket ring part and the synthetic resin fastening part. The synthetic resin fastening part facilitates weight saving, while the attachment part prevents the reduction of fastening power (strength) due to deterioration or deformation of the synthetic resin.

28 Claims, 42 Drawing Sheets

FOREIGN PATENT DOCUMENTS

| | | |
|---|---|---|
| JP | 63-126660 U | 8/1988 |
| JP | 63-126661 U | 8/1988 |
| JP | 63-137164 U | 9/1988 |
| JP | 3583385 B2 | 11/2004 |
| TW | M250876 U | 11/2004 |

* cited by examiner

BICYCLE SPROCKET

BACKGROUND OF THE INVENTION

1. Field of the Invention

The present invention generally relates to a bicycle sprocket. More specifically, the present invention relates to a bicycle sprocket configured to be mounted to a rotational drive unit such as a crank or a hub of a bicycle via a synthetic resin fastening part.

2. Background Information

A bicycle is generally provided with a drive unit or drive train having front and rear sprockets and a chain wrapped around the sprockets. The front sprocket(s) is provided on the gear crank of the bicycle and the rear sprocket(s) is provided on the free hub of the bicycle. This type of bicycle sprocket is made of such materials as the aluminum having the designation A2014P under the standard JIS H4000 (category) or the iron having the designation SPCC under the standard JIS G3141 (category). When a plurality of sprockets are mounted to the gear crank and free hub in order to provide multiple gears, aluminum is used as the material in order to reduce the weight.

There are also known bicycle sprocket designs that reduce the weight even further by having a sprocket ring part that is made of aluminum and has the sprocket teeth formed thereon and a fastening part that is made of a carbon fiber material, attached to the inner circumference of the sprocket ring part, and fastened to the gear crank (see German Utility Model Publication No. 20218755). In the case of this sprocket, the fastening part and an inner circumferential portion of the sprocket ring part are fastened together by installing crimp pins in semicircular holes provided in the sprocket ring part and the fastening part. Since the sprocket is made using two separate members, a gap is provided between the sprocket ring part and the fastening part in order to prevent deformation caused by the effects of weather. In addition, mounting holes with steps are formed in the fastening part of the gear crank. In the sprocket constructed in this manner, generally, a bolt (an example of fixed member) is passed through the mounting hole, and the sprocket is fixed to a spider arm of the gear crank via the bolt and the fastening part.

In the conventional bicycle sprocket just described, age deterioration of synthetic resin fastening part can occur at certain areas resulting in a potential loss of attachment forces. In addition, if the fastening bolts are tightened with too much torque, the synthetic resin fastening part can become deformed, and as the result, there is a possibility for reduced attachment forces. Any reduction in attachment forces can result in play or looseness, adversely affecting operation of the sprocket, shifting of the chain and/or potentially decreasing efficiency of power transfer from the rider to the chain.

In view of the above, it will be apparent to those skilled in the art from this disclosure that there exists a need for an improved bicycle sprocket. This invention addresses this need in the art as well as other needs, which will become apparent to those skilled in the art from this disclosure.

SUMMARY OF THE INVENTION

One object of the present invention is to provide a bicycle sprocket that is constructed of two different materials, which is lightweight, maintains rigidity, prevents looseness or play, and can be fabricated with a simplified manufacturing process.

Another object of the present invention is to provide a bicycle sprocket that prevents a reduction in attachment forces or the attachment strength because of age deterioration of the synthetic resin fastening part, and/or because of deformation of the synthetic resin fastening part.

The foregoing objects can basically be attained by providing a bicycle sprocket according to one aspect of the present invention that basically comprises a sprocket ring part, a synthetic resin fastening part and at least one attachment part. The sprocket ring part includes an inner periphery and an outer periphery with a plurality of sprocket teeth arranged on the outer periphery. The sprocket ring part extends around a central rotation axis. The synthetic resin fastening part is non-movably coupled to the sprocket ring part at a location radially inwardly of the sprocket teeth relative to the rotation axis. The attachment part is at least partially embedded within the synthetic resin fastening part. The attachment part includes a connecting portion and a radial projecting portion extending outwardly from the connecting portion to space the connecting portion radially inward of the sprocket ring part. The attachment part is formed as a separate member from the sprocket ring part and the synthetic resin fastening part.

The foregoing objects can basically be attained by providing a bicycle sprocket according to another aspect of the present invention that basically comprises a sprocket ring part, a synthetic resin fastening part and at least one attachment part. The sprocket ring part includes an inner periphery and an outer periphery with a plurality of sprocket teeth arranged on the outer periphery. The sprocket ring part extends around a central rotation axis. The synthetic resin fastening part is non-movably coupled to the sprocket ring part at a location radially inwardly of the sprocket teeth relative to the rotation axis. The attachment part includes a connecting portion and a radial projecting portion extending outwardly from the connecting portion to space the connecting portion radially inward of the sprocket ring part. The radial projecting portion has a distal end that is secured to the sprocket ring part by a fastener. The attachment part is formed as a separate member from the sprocket ring part and the synthetic resin fastening part.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
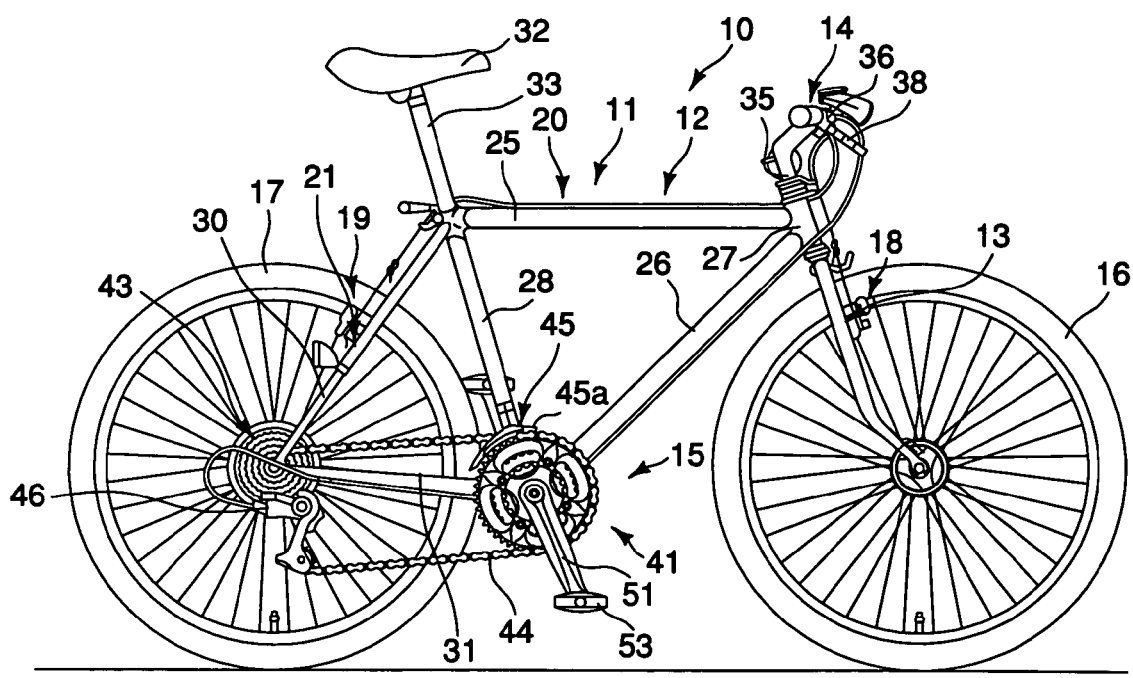
FIG. 1 is a side elevational view of bicycle having a front crankset with a front sprocket in accordance with a preferred embodiment of the present invention and a set of rear cassette sprockets in accordance with a preferred embodiment of the present invention.

Referring initially to FIG. 1, a bicycle 10 is illustrated that can be used with each embodiment of the present invention. The bicycle 10 is equipped in accordance with a first embodiment of the present invention. While the bicycle 10 is illustrated as a mountain bike, it will be apparent to those skilled in the art from this disclosure that the present invention can be applied to other types of bicycles such as a road bike. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The bicycle 10 has a diamond-style frame 11 constituting the structure of the bicycle 10. The frame 11 has a frame body 12 and a front fork 13 that is rotatably supported about a longitudinal axle inclined towards a front end of the frame body 12. The front fork 13 divides in two wheel attachment portions at its bottom end. The bicycle 10 also comprises a flat style handlebar unit 14, a drive unit 15, a front wheel 16, a rear wheel 17, a front braking device 18 and a back braking device 19. The handlebar unit 14 is connected to an upper end of the front fork 13 in a conventional manner. The drive unit 15 is mounted at the bottom of the frame body 12 for converting pedal force into drive force. The front wheel 16 is rotatably supported at the lower end of the front fork 13. The rear wheel 17 is rotatably supported at the rear of the frame body 12.

The frame body 12 has a front triangle 20 and a rear triangle 21 disposed behind the front triangle 20. The frame 11 is basically formed by a top tube 25, a down tube 26, a head tube 27, a seat tube 28, a cylindrical hanger tube 29, a pair of seat stays 30 and a pair of chain stays 31. The tubes 25 to 29 basically form the front triangle 20, while the tubes 28 to 31 form the rear triangle 21. Thus, the seat tube 28 and the hanger tube 29 form part of both the front and rear triangles 20 and 21.

The top tube 25 is arranged generally horizontally, while the down tube 26 is arranged below the top tube 25 such that it slants obliquely downward toward the rear of the bicycle 10. The head tube 27 joins the front ends of the top tube 25 and the down tube 26 together. The seat tube 28 extends diagonally upward and joins the rear ends of the top tube 25 and the down tube 26 together with the cylindrical hanger tube 29 (FIG. 3) disposed between the seat tube 28 and the down tube 26.

The seat tube 28 has a seat post 33 with a saddle 32 fastened thereon. The seat post 33 is secured to the seat tube 28 in such a manner that its position can be adjusted up and down. The rear triangle 21 is configured from a pair of seat stays 30 that are joined at the front ends to the seat tube 28 and that extend downward at an incline as two separate prongs, and a pair of chain stays 31 that extend as two separate prongs backwards from the bottom end of the seat tube 28 and that are joined to the back ends of the seat stays 30.

A handlebar stem 35 constituting a part of the handlebar unit 14 is fastened to the top of the front fork 13 in such a manner that it can be adjusted up and down. A handlebar 36 that extends to the left and right is fastened to the top end of the handlebar stem 35. Each end of the handlebar 36 is provided with a brake lever 38 (only one shown) with gear-shifting functions.

The drive unit 15 basically has a front crankset or unit 41, a rear sprocket assembly or small rear gear unit 43, a chain 44, a front derailleur 45 and a rear derailleur 46. The front crankset (crank unit) 41 is mounted on the hanger tube 29. The rear sprocket assembly (small gear unit) 43 is mounted in a non-rotatable manner to the free hub or free wheel of the rear wheel 17. The chain 44 is arranged on the crankset (gear crank unit) 41 and the rear sprocket assembly (small gear unit) 43 so as to extend therebetween. The front derailleur 45 is coupled to the seat tube 28, while the rear derailleur 46 is coupled to the rear triangle 21. The derailleurs 45 and 46 function as devices for shifting or changing gears. The front derailleur 45 has a chain guide 45a through which the chain 44 passes.

Figure 2:
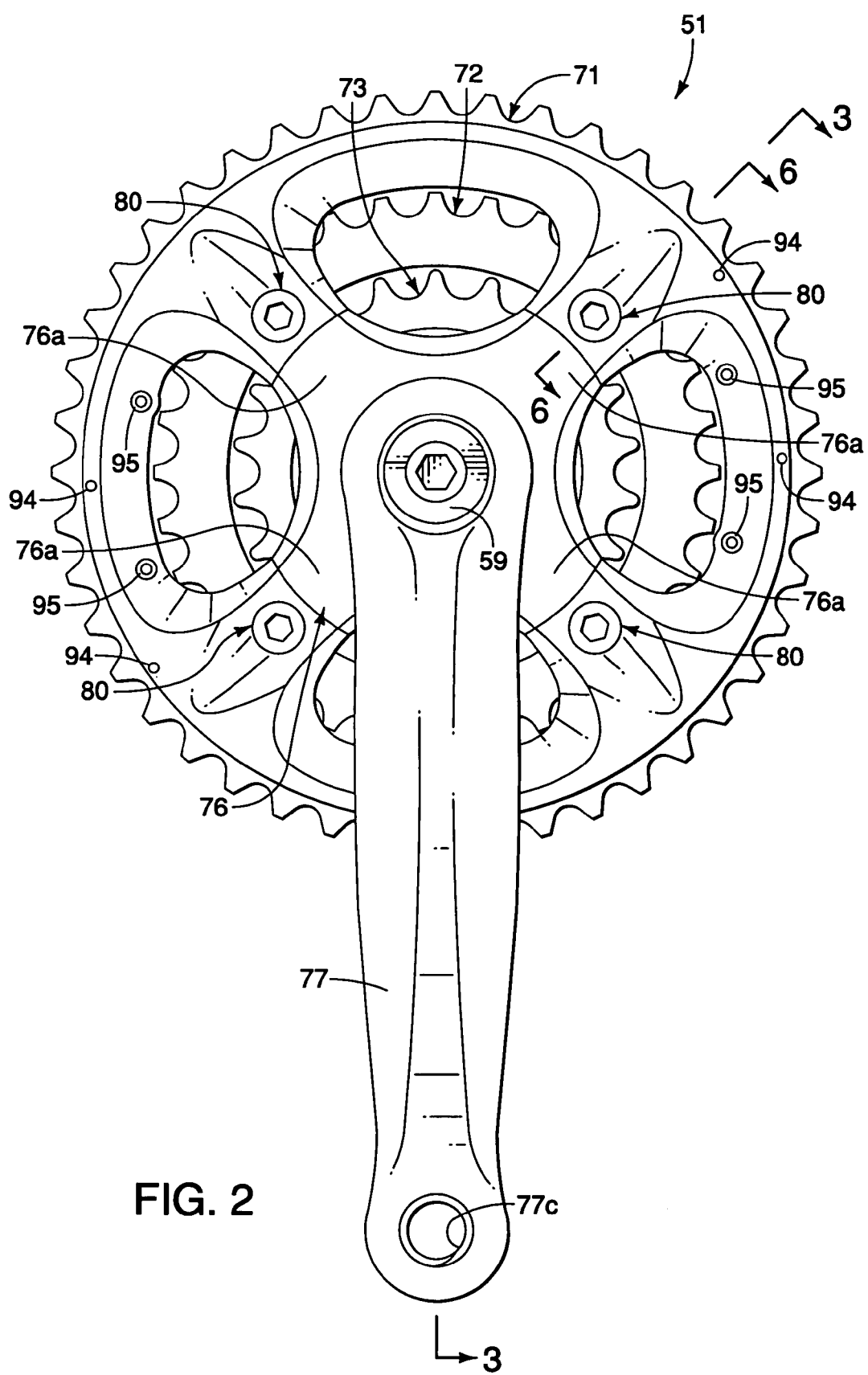
FIG. 2 is an enlarged side elevational view of the front crankset of the bicycle illustrated in FIG. 1.
Figure 3:
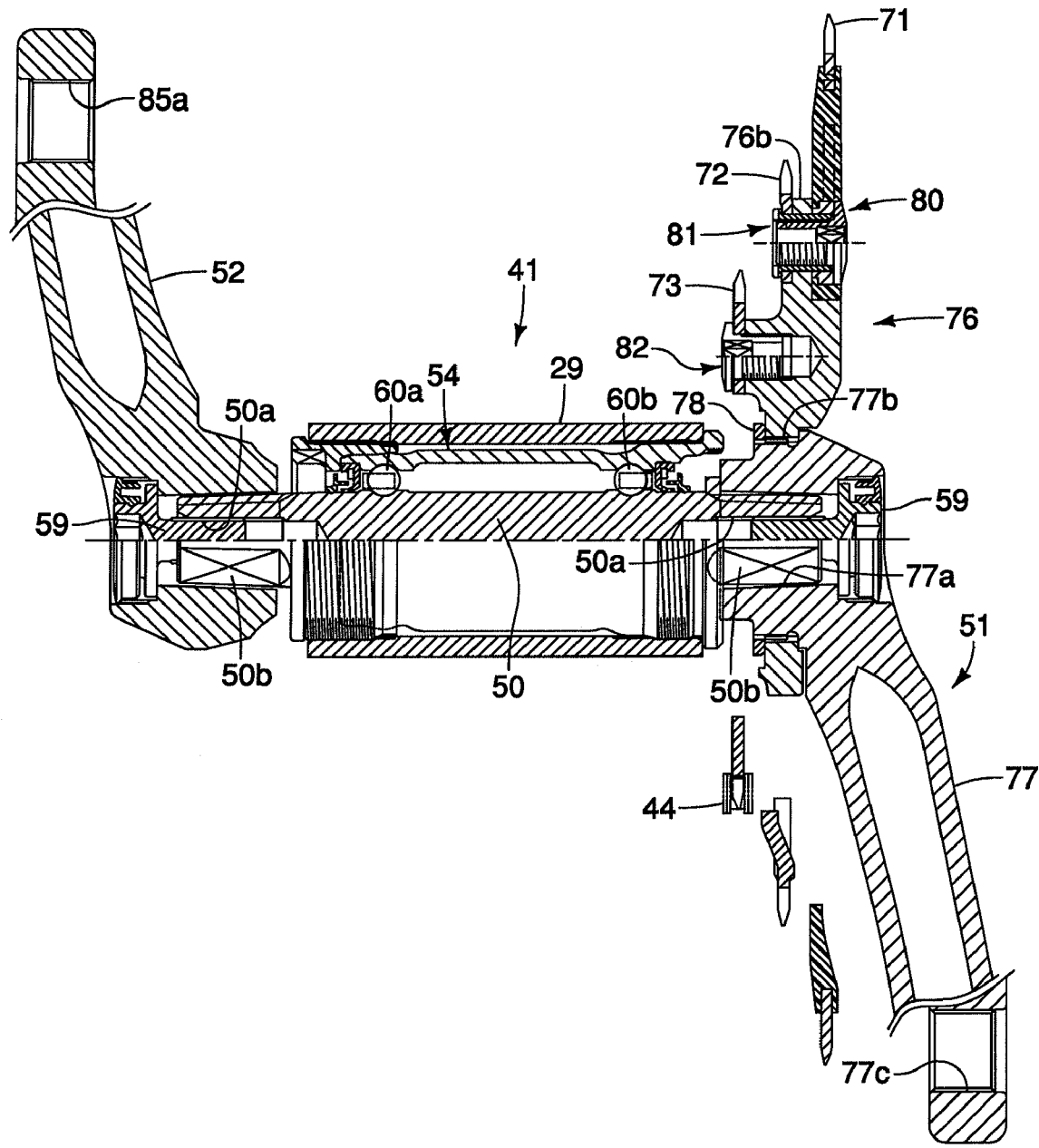
FIG. 3 is a partial, transverse, cross sectional view of the front crankset illustrated in FIGS. 1 and 2, as seen along section line 3-3 of FIG. 2.

As shown in FIGS. 1 through 3, the crank assembly (crank unit) 41 basically includes a crankshaft 50 (FIG. 3), a right crankset (gear crank) crankset 51 and a left crank arm (left crank) 52. The crankshaft 50 is supported in a freely rotatable manner in the hanger tube 29 of the frame 11. The right crankset 51 has an inner end fastened onto the right end of the crankshaft 50 by crimping and an outer or distal end with a pedal 53 (FIG. 1) mounted thereto. The left crank arm 52 (FIG. 3) is fastened in a detachable manner to the left end of the crankshaft 50 with another pedal (that is a mirror image of the pedal 53) mounted to its tip end such that the rider can provide a pedaling force to the drive train 15, as best seen in FIG. 1.

As shown in FIG. 3, the crankshaft 50 is mounted in a freely rotatable manner in the hanger tube 29 by a bottom bracket 54 mounted in the hanger tube 29. The crankshaft 50 is, for example, preferably a hollow pipe-shaped member made of a high-rigidity alloy, such as chrome-molybdenum steel or another highly rigid alloy. Each end of the crankshaft 50 has a blind bore with internal threads 50a that threadedly receives a fastening bolt 59 to fasten the crankset 51 and the crank arm 52 onto the ends of the crankshaft 50. Each end of the crankshaft 50 also has a rectangular tapered outer surface 50b for non-rotatably interlocking the crankset 51 and the crank arm 52 onto the outer peripheral surfaces of the crankshaft 50.

The bottom bracket 54 has a pair of bearing arrangements 60a and 60b disposed in the interior of the hanger tube 29 so that the crankshaft 50 is rotatably supported in the hanger tube 29 by the bearing arrangements 60a and 60b.

As shown in FIGS. 2 and 3, the crankset 51 includes three chainrings or sprockets 71-73, for example, a sprocket mounting unit 76 and a main right crank arm part 77. The sprockets 71-73 are disposed to be aligned in the axial direction so that the number of teeth increases outward in the axial direction away from the frame 11. The sprockets 71-73 are mounted to the right crankset 51 by the sprocket mounting unit 76, which is an example of a rotating drive unit. The sprocket mounting unit 76 has four crank connecting arms 76a extending in a radial pattern to fasten the three sprockets 71-73 in place. The sprocket mounting unit 76 is non-rotatably fastened on the external periphery of an inner proximal end of the main right crank arm part 77 by a lock ring 78.

Each of the crank connecting arms 76a of the sprocket mounting unit 76 has a first mounting portion 76b for mounting the sprockets 71 and 72 concentrically to the crankshaft 50. The first mounting portions 76b are formed on both sides at the distal ends of the arms 76a to form a concavity in relation to the other portions. In other words, the first mounting portions 76b are recessed on opposite axial sides thereof relative to the other portions to form outwardly facing abutment surfaces.

Figure 6:
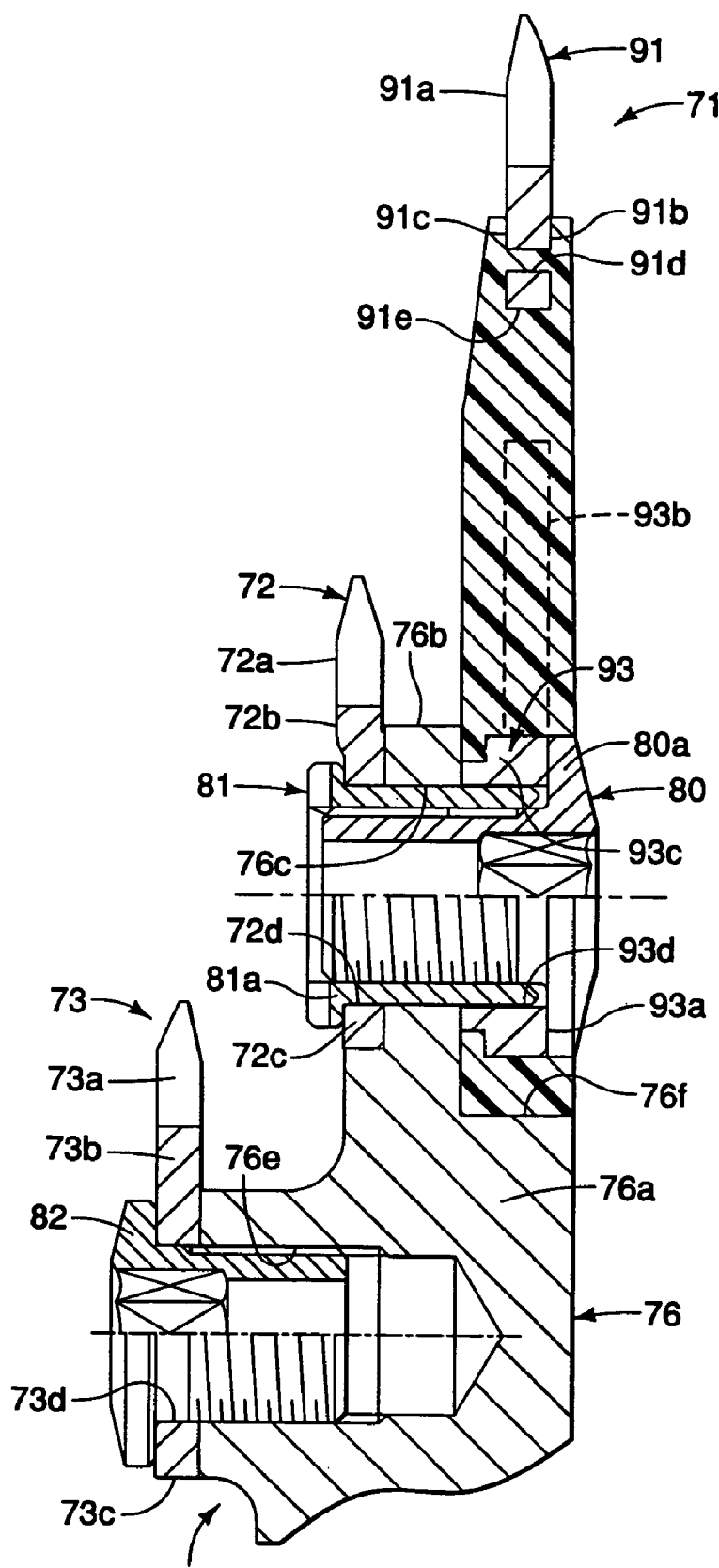
FIG. 6 is an enlarged, partial cross sectional view of the front crankset illustrated in FIG. 2, as seen along section line 6-6 in FIG. 2 in accordance with the first embodiment of the present invention.

As shown in FIG. 6, a fastening hole 76c is formed in each of the first mounting portions 76b for collectively fastening the sprockets 71 and 72 by a cylindrical chainring nut 81 that has a head 81a and a chainring bolt 80 that has a head 80a. The chainring nuts 81 are threaded over the chainring bolts 80. Thus, the sprockets 71 and 72 can be fastened simultaneously to the first mounting portions 76b with the (four) chainring bolts 80 and the (four) chainring nuts 81.

Each of the crank connecting arms 76a of the sprocket mounting unit 76 also has a second mounting portion 76d for fastening the sprocket 73 with a bolt 82. The second mounting portions 76d are formed to protrude inward on the inner sides at the middle portion of the crank connecting arms 76a (on the left side in FIG. 6). The second mounting portions 76d are each provided with a screw hole 76e through which the bolts 82 are screwed.

As shown in FIG. 3, the right main crank arm part 77 has a rectangular tapered axle mounting hole 77a that is formed at its inner or proximal end. The crankshaft 50 is non-rotatably mounted in the rectangular tapered axle mounting hole 77a.

The right main crank arm part 77 also has a plurality of serrations 77b formed on the external periphery at its inner or proximal end. The serrations 77b non-rotatably fasten the sprocket mounting unit 76 on the external periphery at the inner or proximal end of the right main crank arm part 77.

The main right crank arm part 77 extends outward in the radial direction from the inner or proximal end to the outer or distal end while slanting slightly outward in the axial direction. A threaded pedal mounting hole 77c is provided in the extended tip end of the right main crank arm part 77 for installing the pedal 53 at the outer or distal end of the main right crank arm part 77.

Figure 4:
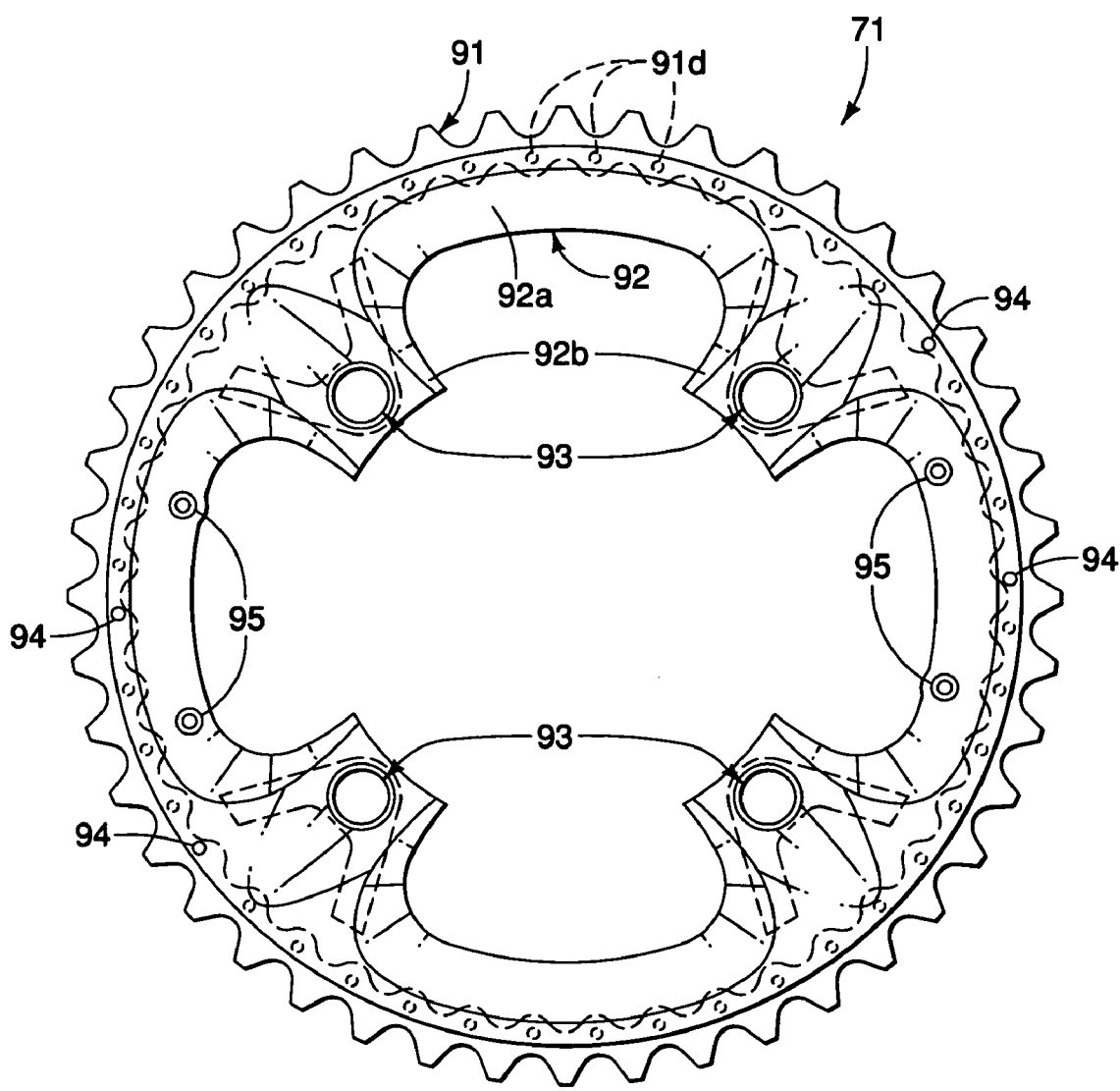
FIG. 4 is an outside elevational view of the large bicycle sprocket of the front crankset illustrated in FIGS. 1-3 in accordance with the first embodiment of the present invention, with the other parts of the crankset removed for the purpose of illustration.
Figure 5:
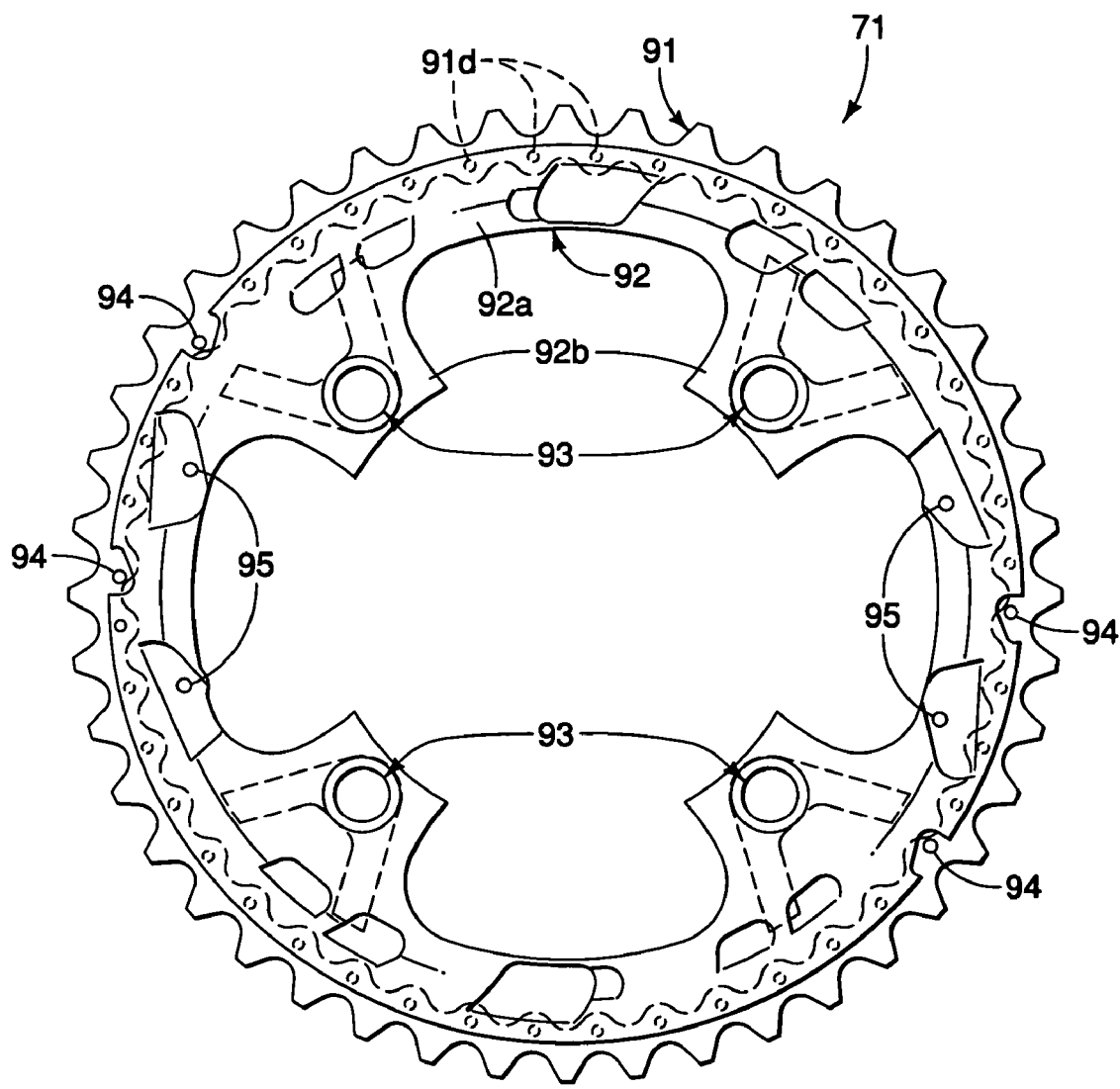
FIG. 5 is an inside elevational view of the large bicycle sprocket illustrated in FIG. 4 in accordance with the first embodiment of the present invention.

As shown in FIGS. 4-6, the sprocket 71 basically comprises a metallic sprocket ring part 91, a synthetic resin fastening part 92 and a plurality of attachment parts 93. The synthetic resin fastening part 92 is integrally molded onto the sprocket ring part 91 and the attachment parts 93 by, for example, insert molding or outsert molding. In this embodiment, the attachment parts 93 are spaced radially inward of the sprocket ring part 91 so that no direct physical contact exists between the sprocket ring part 91 and the attachment parts 93. Moreover, in this embodiment, the attachment parts 93 do not overlap in the circumferential direction with the sprocket ring part 91.

In the sprocket 71, the sprocket ring part 91 that contacts the chain 44 and the attachment parts 93 fastened to the first mounting portions 76b are all made of metal to ensure strength, rigidity, and abrasion resistance. On the other hand, the synthetic resin fastening part 92 is made from a synthetic resin to reinforce and couple the attachment parts 93 to the sprocket ring part 91 and to reduce the weight of the sprocket 71.

The sprocket ring part 91 is a metallic ring shaped member or element that is an integral, one-piece unitary member made of, for example, an aluminum alloy with an anodic oxide coating formed on the surface. The sprocket ring part 91 basically includes a plurality of sprocket teeth 91a, an outer lateral side face 91b, an inner lateral side face 91c, a plurality of through-holes 91d and an internal peripheral edge 91e. The sprocket teeth 91a are formed outer periphery of the sprocket ring part 91 for selectively receiving the chain 44. The lateral side faces 91b and 91c form two sides of the sprocket ring part 91 in which the synthetic resin fastening part is at least partially molded around both of the sides of the sprocket ring part.

As shown in FIGS. 4-7, the through-holes 91d of the sprocket ring part 91 extend between the sides (the outer and inner lateral side faces 91b and 91c) of the sprocket ring part 91 and the synthetic resin fastening part 92 extends through the through-holes 91d of the sprocket ring part 91. The through-holes 91d of the sprocket ring part 91 are formed preferably at equally spaced apart intervals in the circumferential direction of the sprocket ring part 91, except at four points where the through-holes 91d are configured and arranged to form spike fastening structures 94 (holes). These through-holes 91d act as anchor structures for facilitating the non-rotatable connection of the synthetic resin fastening part 92 to the sprocket ring part 91. The spike fastening structures 94 are each configured and arranged to receive a spike pin (not shown) that is riveted thereto. Thus, the spike fastening structures 94 are configured from four of the through-holes 91d, which are formed slightly farther inward than the through-holes 91d. In this embodiment, two adjacent ones of the spike fastening structures 94 that are spaced apart by four of the sprocket teeth 91a constitute a pair of the spike fastening structures 94. Thus, the spike fastening structures 94 are arranged to form two pairs of the spike fastening structures 94. The sprocket ring part 91 that has the spike fastening structures 94 are not covered by the synthetic resin fastening part 92 to facilitate mounting of the spike pins (not shown) in the spike fastening structures 94. Spike pins are configured and arranged to protrude outwardly in an axial direction to guide the chain 44 during a shifting operation. Since spike pins are known in the bicycle art, the spike pins that are fastened to the sprocket 71 will not be discussed or illustrated herein.

As shown in FIGS. 4-6, the synthetic resin fastening part 92 is configured and arranged to non-movably fix the attachment parts 93 to the sprocket ring part 91. The synthetic resin fastening part 92 is preferably a polyamide-based synthetic resin that is impregnated with a filler material such as carbon fibers. The synthetic resin preferably chemically reacts with diffusion layers on the sprocket ring part 91 and the attachment parts 93 to chemically bond the synthetic resin fastening part 92 to the sprocket ring part 91 and the attachment parts 93. Thus, the synthetic resin fastening part 92 is integrally molded onto the sprocket ring part 91 and the attachment parts 93. Preferably, the synthetic resin fastening part 92 is integrally formed on both of the outer and inner lateral side faces 91b and 91c of the sprocket ring part 91 and the attachment parts 93 so as to cover at least an inner peripheral portion of the sprocket ring part 91 located inward in relation to the sprocket teeth 91a and at least an outermost portion of each of the attachment parts 93.

The synthetic resin fastening part 92 includes a circular cover section 92a and a plurality of internal cover sections 92b. The circular cover section 92a is integrally formed to overlie the sprocket ring part 91 and portions of the attachment parts 93 as seen in FIGS. 4 and 5. The circular cover section 92a has a plurality of sub-spike fastening structures 95 that are configured and arranged to receive a sub-spike pin (not shown) that is riveted thereto. Sub-spike pins are configured and arranged to protrude outwardly in an axial direction to guide the chain 44 during a shifting operation. Since sub-spike pins are known in the bicycle art, the sub-spike pins that are fastened to the sprocket 71 will not be discussed or illustrated herein.

The circular cover section 92a is integrally formed to cover the internal peripheral edge 91e and the lateral side faces 91b and 91c of the sprocket ring part 91 (FIGS. 4-6) and the outermost portions of the attachment parts 93. The internal cover sections 92b are integrally formed to cover at least one of the axially facing sides of portions of the attachment parts 93 as well as both side edges of the attachment parts 93 in the direction of rotation. Thus, the internal cover sections 92b extend radially inward from the circular cover section 92a, with the internal cover sections 92b integrally formed with the circular cover section 92a to overlie the internal fastening elements 93. In this embodiment, the internal lateral side face 91c of the sprocket ring part 91 is not covered by the circular cover section 92a in the sections where the spike pins are to be mounted.

As shown in FIGS. 4-7, the attachment parts 93 are each formed as a separate member from the sprocket ring part 91 and the synthetic resin fastening part 92. The attachment parts 93 are at least partially embedded within the synthetic resin fastening part 92. In this embodiment, the attachment parts 93 are almost completely embedded within the synthetic resin fastening part 92. The attachment parts 93 are preferably one-piece, unitary members that are formed of a hard rigid material that is more rigid and/or harder than the synthetic resin fastening part 92. More preferably, the attachment parts 93 are formed of a material that is the same as the sprocket ring part 91. For example, in one preferred embodiment, the attachment parts 93 are formed of an aluminum alloy with an anodic oxide coating formed on the surface.

As best seen in FIGS. 7-10, each of the attachment parts 93 basically includes a connecting portion 93a and a radial projecting portion 93b. The radial projecting portion 93b extends outwardly from the connecting portion 93a to space the connecting portion 93b radially inward of the sprocket ring part 91. Each of the connecting portions 93a of the attachment parts 93 acts as a fastening point for securing the sprocket 71 to the sprocket mounting unit 76. The radial projecting portions 93b act as reinforcements for the synthetic resin fastening part 92. As mentioned above, the attachment parts 93 are preferably constructed as one-piece, unitary members from a metallic material.

The connecting portion 93a includes a step shaped tubular member 93c surrounding a fastener hole 93d. The step shaped tubular member 93c extends in an axial direction relative to the central rotation axis of the sprocket ring part 91 such that an overall axial thickness of the connecting portion 93a of the attachment part 93 is greater than an overall axial thickness of the radial projecting portion 93b of the attachment part 93. The fastener holes 93d each receive one of the bolts 80 and one of the nuts 81 to fasten the sprocket 71 to the first mounting portions 76b of the crank connecting arms 76a of the sprocket mounting unit 76.

As seen in FIG. 6, the tubular member 93c is connected to radial projecting portions 93b. The tubular member 93c is arranged such that its inner facing side (the left side in FIG. 6) is flush with the inner lateral side face of the synthetic resin fastening part 92 as shown or protrudes slightly past the inner lateral side face of the synthetic resin fastening part 92. Thus, the tubular member 93c is thicker in the axial direction than the sprocket ring part 91 and the radial projecting portion 93b. The outer facing side (the right side in FIG. 6) is recesses from with the outer lateral side face of the synthetic resin fastening part 92. Thus, the outer facing sides of the radial projecting portions 93b are in contact with the heads 80a of the bolts 80, while the inner facing sides of the tubular member 93c are in contact with the outer facing sides of the first mounting portions 76b. Therefore, the synthetic resin fastening part 92 is formed in this section so as to expose the outer and inner facing sides of the tubular member 93c. The fastener holes 93d have substantially the same diameter as the fastening holes 76c formed in the first mounting portions 76b. Thus, the fastener holes 93d are disposed to allow communication with the fastening holes 76c.

The radial projecting portion 93b preferably includes at least two arms 93e that extend outwardly from the connecting portion 93a towards the sprocket ring part 91. Each of the arms 93e of the radial projecting portion 93b has a free end that is cantilevered relative to the connecting portion 93a. The free ends of the arms 93e of the radial projecting portion 93b are spaced radially inward of the inner periphery of the sprocket ring part 91 with the synthetic resin fastening part 92 disposed therebetween in a radial direction. In this embodiment, the arms 93e of the radial projecting portion 93b are configured and arranged to define a V-shape relative to the connecting portion 93a.

Figure 7:
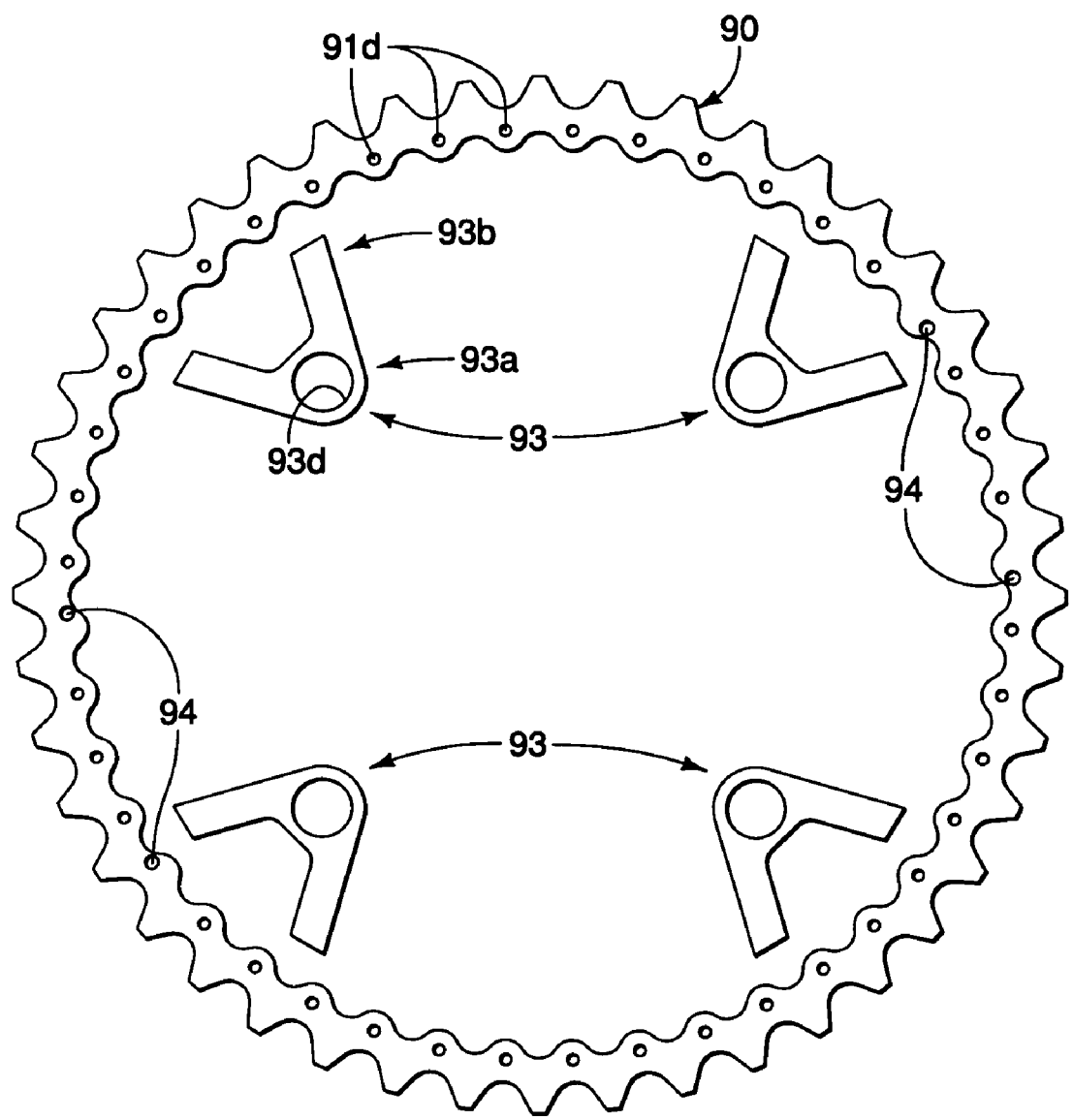
FIG. 7 is an outside elevational view of the sprocket ring part and the attachment parts of the large bicycle sprocket shown in FIGS. 2-6 with the synthetic resin fastening part removed.
Figure 8:
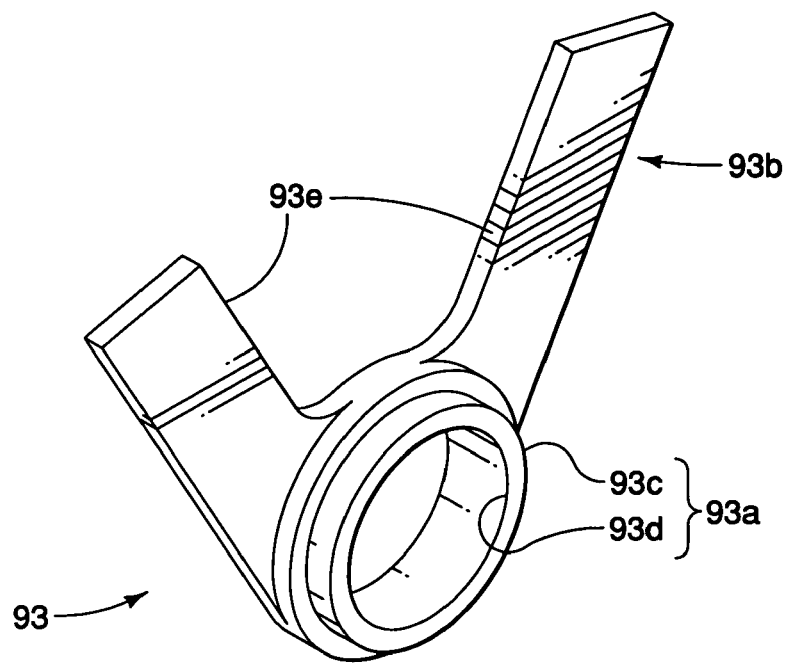
FIG. 8 is an inside perspective view of one of the attachment parts of the large bicycle sprocket shown in FIG. 7 in accordance with the first embodiment of the present invention.
Figures 9, 10:
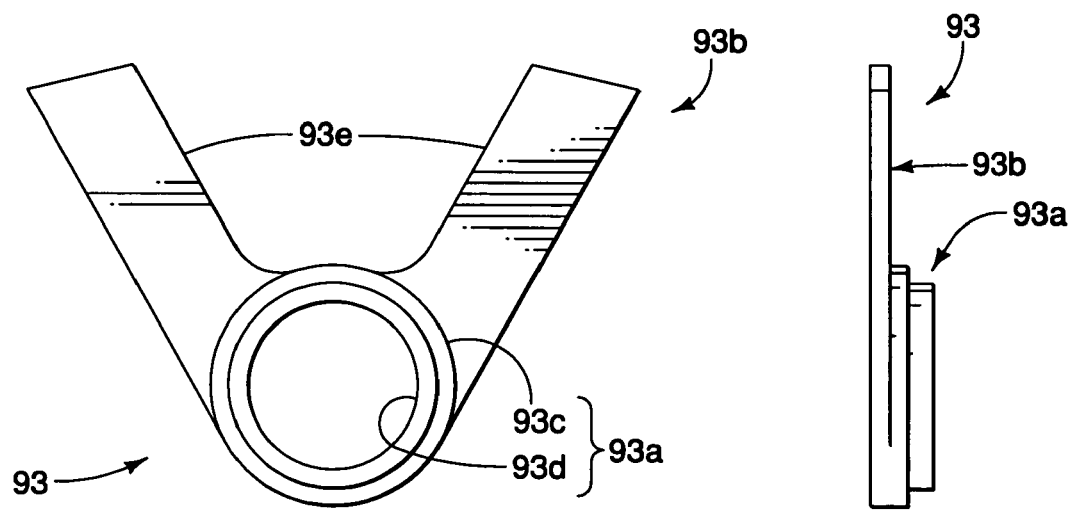
FIG. 9 is an inside elevational view of the attachment part shown in FIG. 8 for the large bicycle sprocket shown in FIGS. 2-6 in accordance with the first embodiment of the present invention.
FIG. 10 is a circumferential edge elevational view of the attachment part shown in FIGS. 8 and 9 for the large bicycle sprocket shown in FIGS. 2-6 in accordance with the first embodiment of the present invention.
Figure 11:
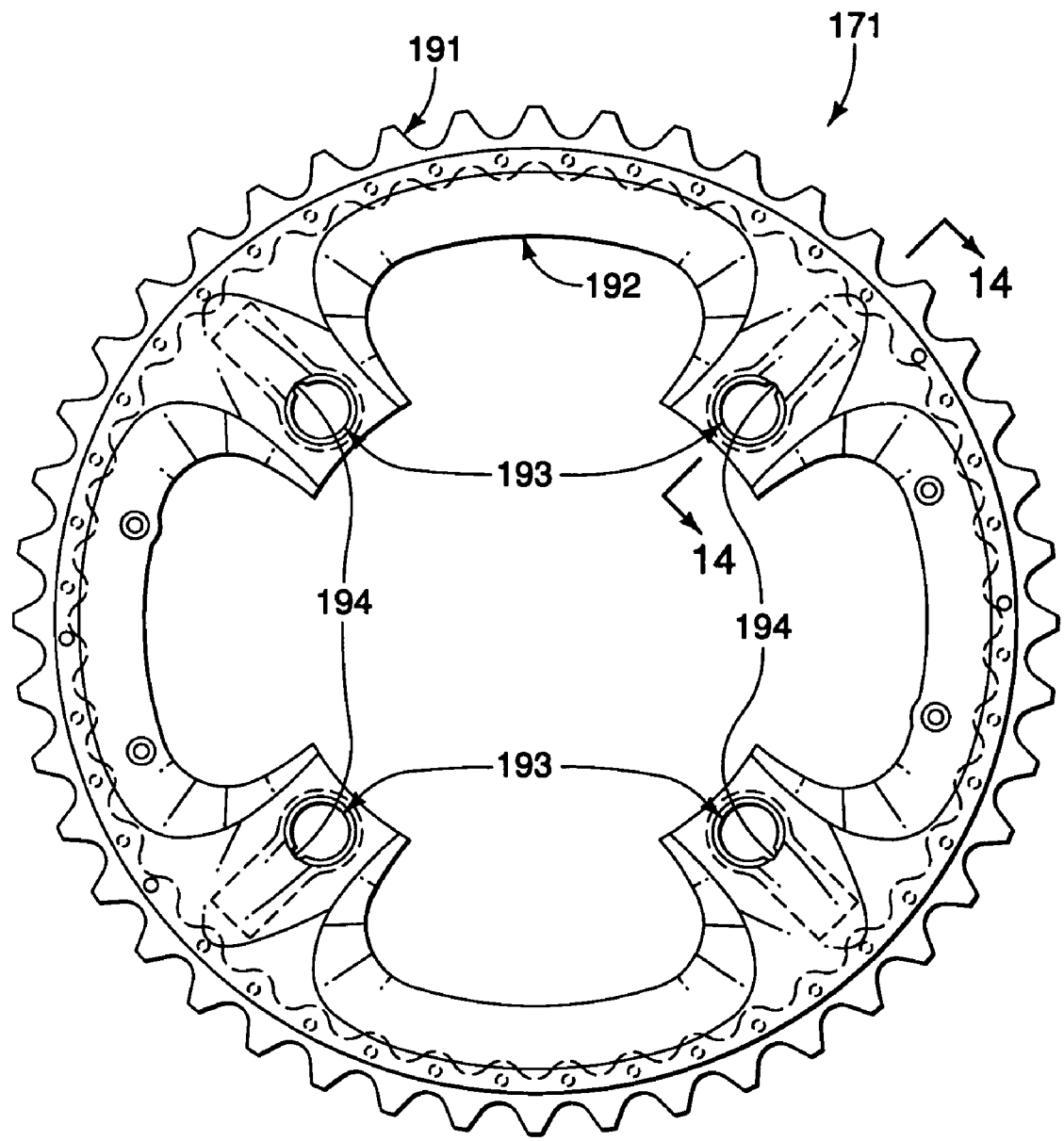
FIG. 11 is an outside elevational view of a large bicycle sprocket in accordance with a second embodiment of the present invention that is used in the crankset of the bicycle of FIG. 1.
Figure 12:
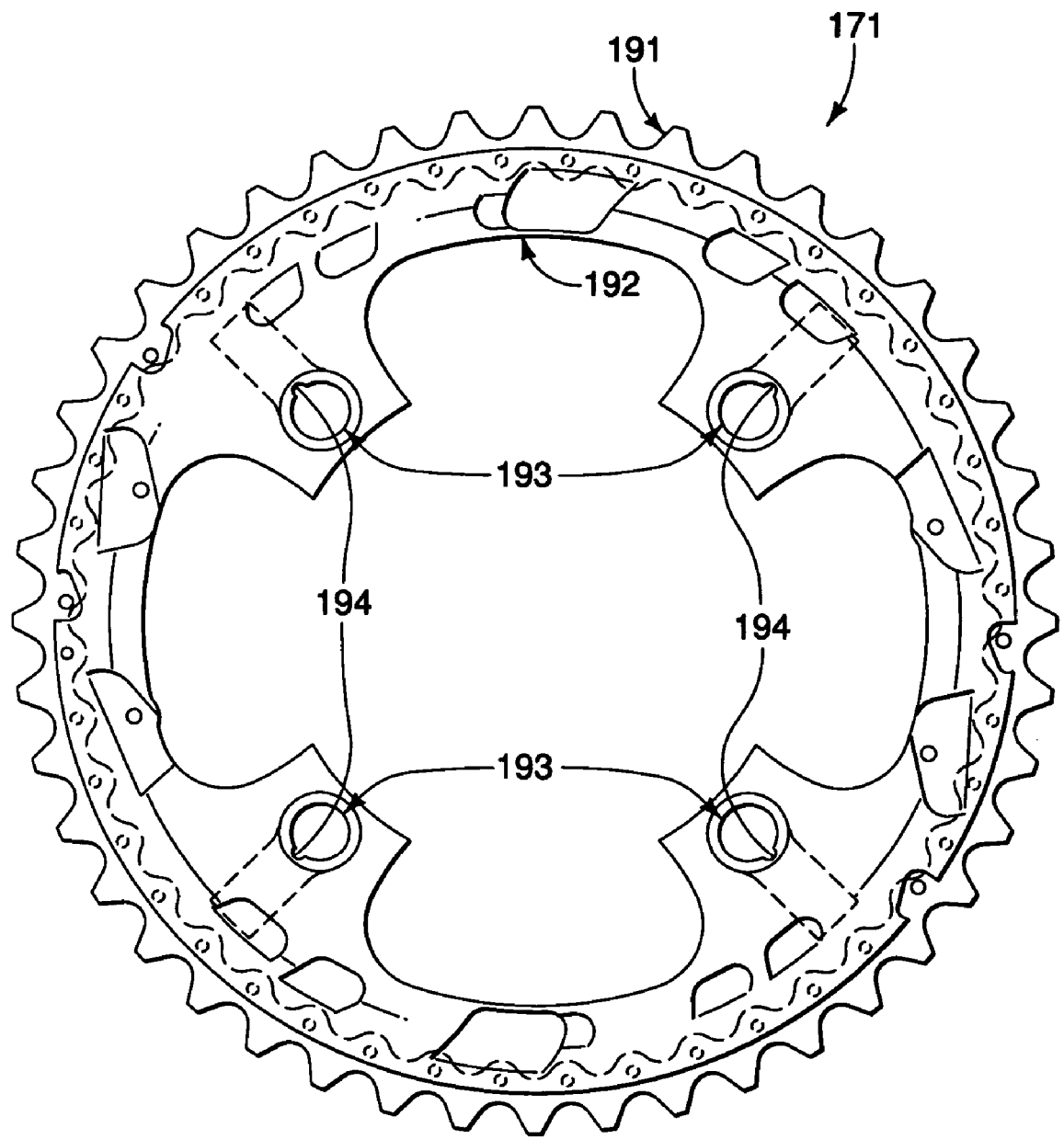
FIG. 12 is an inside elevational view of the large bicycle sprocket illustrated in FIG. 11 in accordance with the second embodiment of the present invention.

The sprocket 71 with the above mentioned configuration is preferably manufactured by, first, subjecting an aluminum plate to press punching operation to obtain the sprocket ring part 91 with a shape such as shown in FIG. 7. Then, a circular diffusion layer is formed on the lateral side faces 91b and 91c and the internal peripheral edge 91e of the sprocket ring part 91. The circular diffusion layer is formed by using a fine powder of triazine thiol that is diffused by electrodeposition plating. Likewise, a circular diffusion layer is formed on the surfaces of the attachment parts 93 that are to be covered by the synthetic resin fastening part 92 by using a fine powder of triazine thiol that is diffused by electrodeposition plating. When the sprocket ring part 91 and the attachment parts 93 are mounted, the metal molds are closed up. Then, the spaces inside of the molds are filled with a melt of a polyamide-based synthetic resin impregnated with a filler material made of carbon fibers. The synthetic resin chemically reacts with the diffusion layer to chemically bond the synthetic resin fastening part 92 to the sprocket ring part 91 and the attachment parts 93. The sprocket 71 having a fastening part 92 integrally formed on the sprocket ring part 91 is thus completed by such insert molding.

According to the present invention, because the attachment part 93 includes the radial projecting portion 93*b* in addition to the connecting portion 93*a*, a larger surface area for chemically bonding the attachment part 93 to the synthetic resin fastening part 92 can be obtained. Therefore, the rigidity of the resultant sprocket 71 can be enhanced effectively.

Further, according to the present invention, after the above-mentioned punching operation, a remaining aluminum plate is formed that can be used for producing another smaller sprocket, such as the sprocket 72, since the sprocket ring part 91 does not have an integrally-formed, projecting portion extending radially inwardly therefrom.

Alternatively, instead of using the above-mentioned process for manufacturing the sprocket ring part 91 according to the present invention, an alternative manufacturing process can also be used that comprises the steps of: (i) providing a round-bar shaped, metallic material; (ii) bending the round-bar shaped, metallic material into a ring shape; (iii) bonding both ends of the metallic material together to form a continuous ring; (iv) pressing the continuous ring formed from the metallic material into a flat-ring shape; and (v) die punching (or cutting) the flat-ring shape to form sprocket teeth arranged on the outer periphery thereof.

The left crank arm 52 is an arm-shaped member in which a pedal mounting hole 85*a* is formed for the pedal 53 to be threaded into the distal end, as shown in FIG. 3.

When the crank unit 41 configured in this manner is mounted on the bottom bracket 54, the sprockets 71-73 are first mounted on the crankset 51. When the sprockets 71 and 72 are mounted on the crankset 51, the sprockets 71 and 72 are placed on both sides of the concave portions of the first mounting portions 76*b* so that the fastener holes 93*d* and the mounting hole 72*d* face the fastening holes 76*c*. At this time, the internal peripheries of the internal fastening elements 93 are centered while in contact with the stepped portions 76*f* of the first mounting portions 76*b*. The bolts 80 are then mounted from one side to engage the sprocket 71, while the nuts 81 are mounted from the other side to engage the sprocket 71. The bolts 80 are turned with an Allen wrench while the nuts 81 are tightened with a special tool to mount the sprockets 71 and 72. The sprocket 73 is then fastened in to the second mounting portions 76*d* with the bolts 82.

When mounting of the sprockets 71-73 is complete, the sprocket mounting unit 76 is fastened to the main right crank arm part 77 by the lock ring 78, and the main right crank arm part 77 is fastened to the right end of the crankshaft 50 by the fastening bolts 59. Mounting of the crank unit 41 onto the bottom bracket 54 is thereby completed.

Second Embodiment

Referring now to FIGS. 11-14, a sprocket 171 is illustrated in accordance with a second embodiment. The sprocket 171 basically includes a metallic sprocket ring part 191, a synthetic resin fastening part 192 and a plurality of attachment parts 193 with a connecting portion 193*a* and a radial projecting portion 193*b*. The sprocket 171 is configured and arranged to replace the sprocket 71 in the crankset 51 of the first embodiment. The sprocket 171 is identical to the sprocket 71, as discussed above, except that the attachment parts 193 have been modified in comparison to the attachment parts 93. In view of the similarity between the first and second embodiment, the descriptions of the parts of the second embodiment that are identical to the parts of the first embodiment may be omitted for the sake of brevity. Thus, unless otherwise specified or illustrated, the descriptions of the parts of the first embodiment applies to the corresponding part of the second embodiment.

Figure 13:
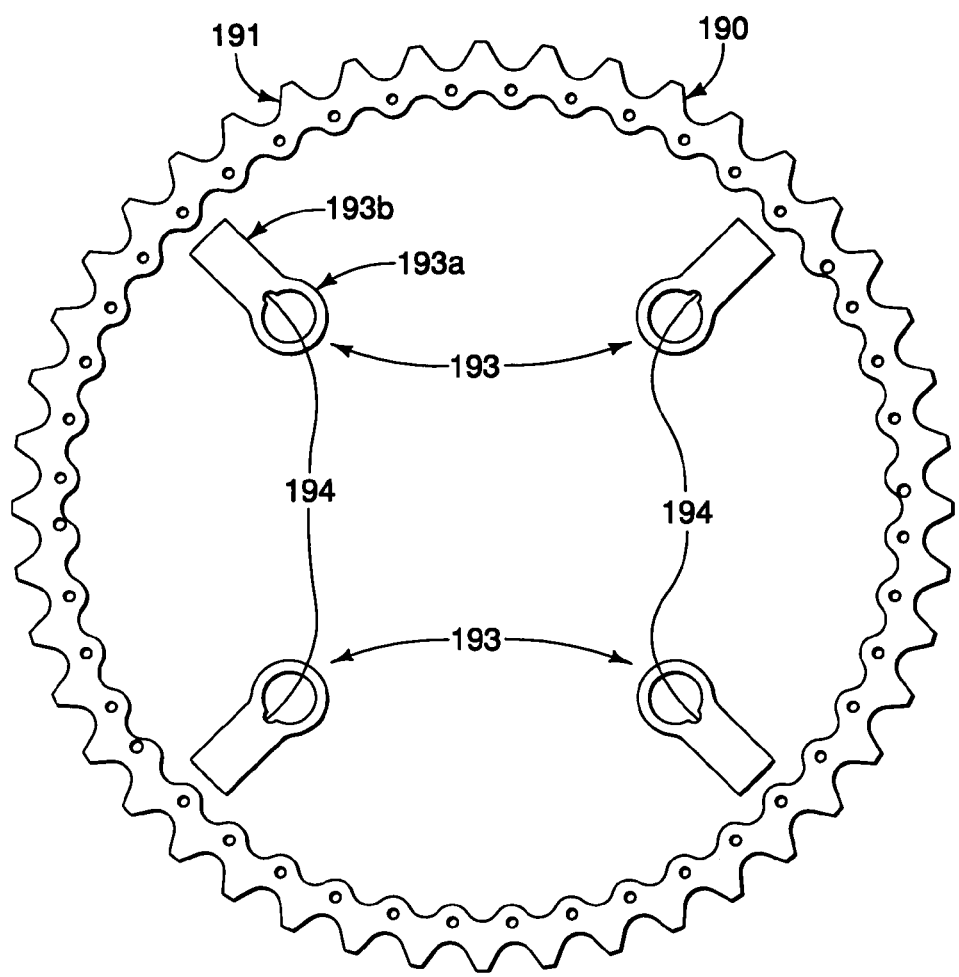
FIG. 13 is an outside elevational view of the sprocket ring part and the attachment parts of the large bicycle sprocket shown in FIGS. 11 and 12 with the synthetic resin fastening part removed.
Figure 14:
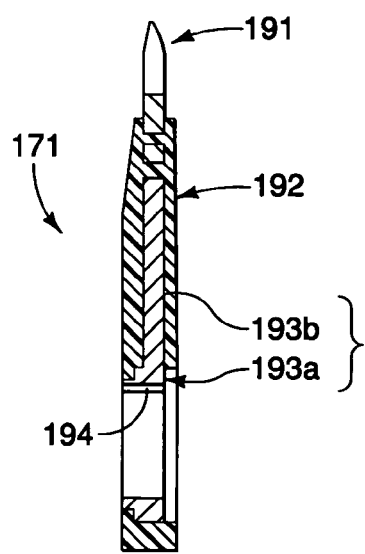
FIG. 14 is an enlarged, partial cross sectional view of the large bicycle sprocket illustrated in FIGS. 11-13 as seen along section line 14-14 in FIG. 11 in accordance with the second embodiment of the present invention.

In this embodiment, as best seen in FIGS. 13 and 14, the connecting portions 193*a* of the attachment parts 193 include an alignment notch 194 in a peripheral surface that defines the fastener hole. The alignment notches 194 aid in the manufacturing process by providing the correct orientation of the attachment parts 193 relative to the metallic sprocket ring part 191. Thus, positioning pins with corresponding projections engage the alignment notches 194 in the manufacturing process to provide for the correct orientation of the attachment parts 193 relative to the metallic sprocket ring part 191. Also, in this embodiment, the radial projecting portions 193*b* of the attachment parts 193 are each merely a single arm that extends in a radial direction from the connecting portions 193*a*, respectively.

Third Embodiment

Figure 15:
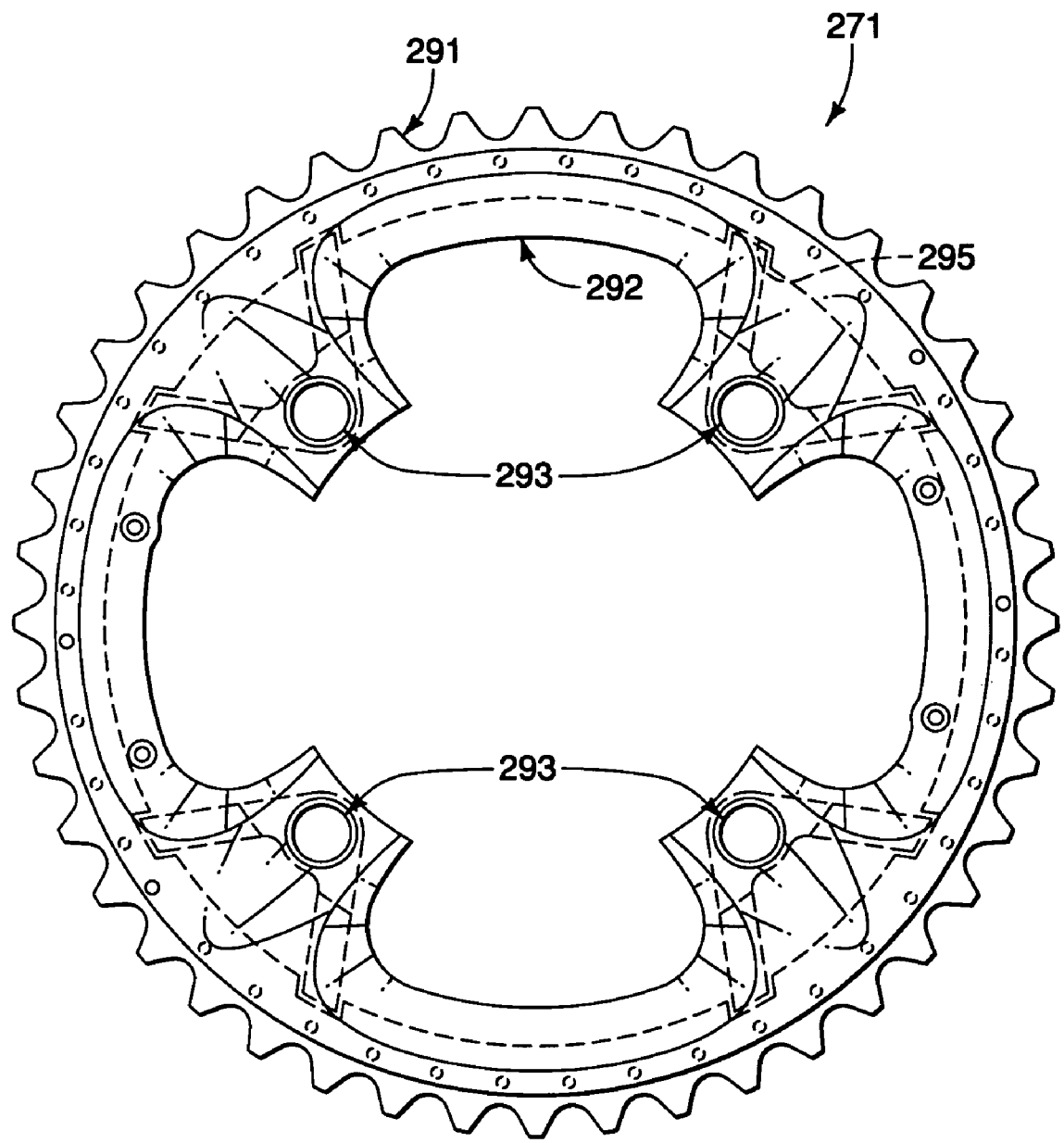
FIG. 15 is an outside elevational view of a large bicycle sprocket in accordance with a third embodiment of the present invention that is used in the crankset of the bicycle of FIG. 1.
Figure 16:
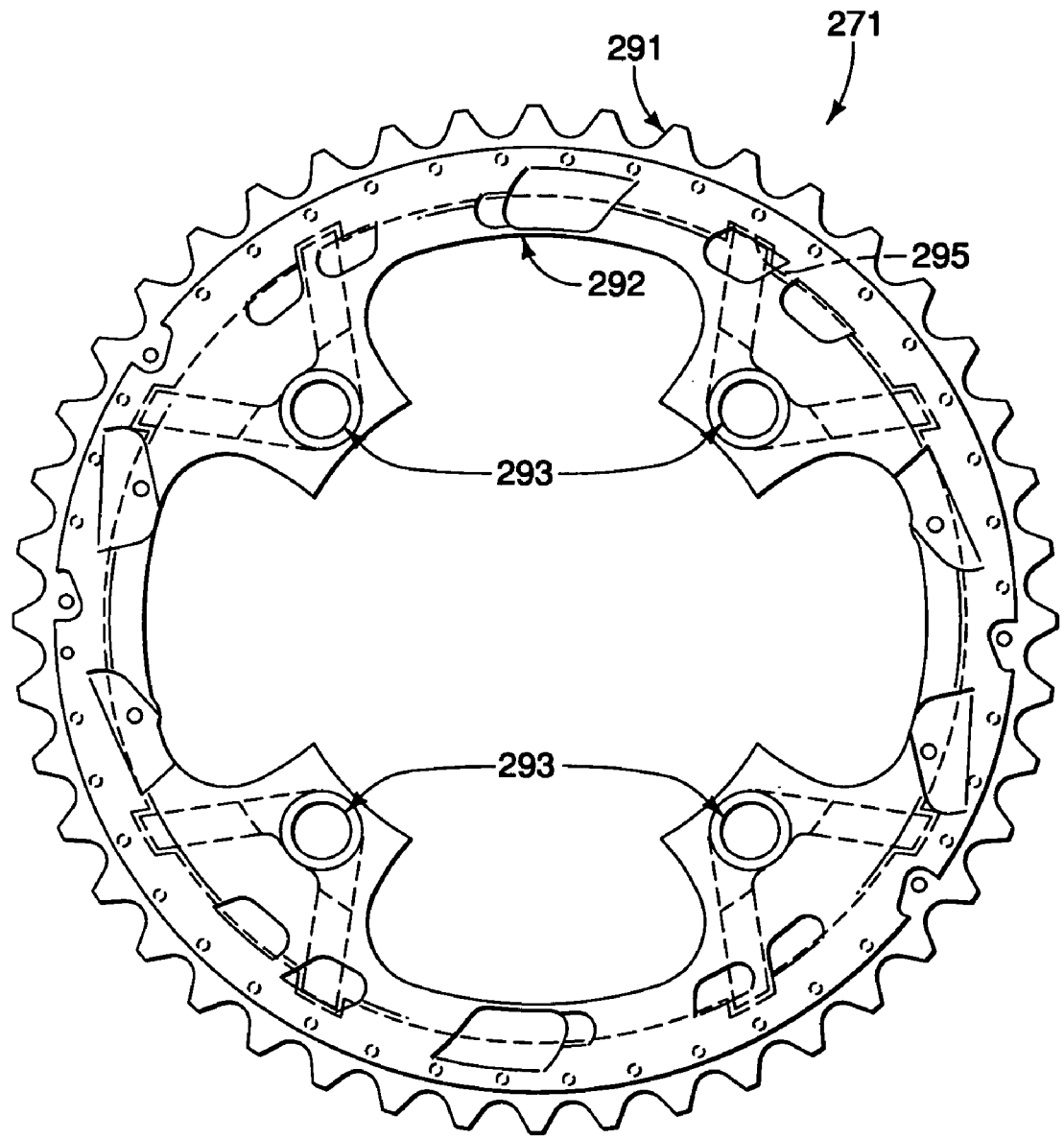
FIG. 16 is an inside elevational view of the large bicycle sprocket illustrated in FIG. 15 in accordance with the third embodiment of the present invention.
Figure 17:
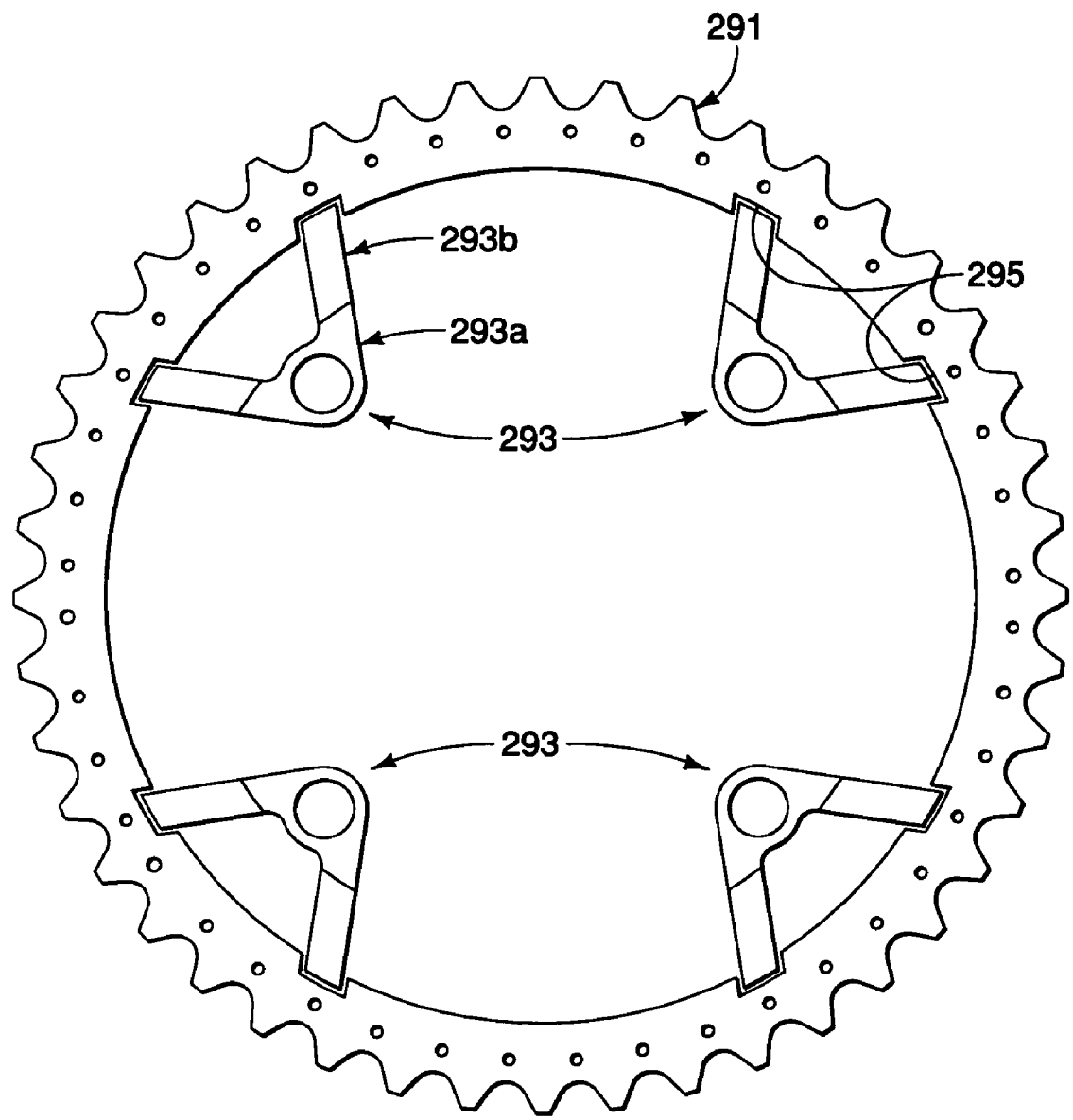
FIG. 17 is an outside elevational view of the sprocket ring part and the attachment parts of the large bicycle sprocket shown in FIGS. 15 and 16 with the synthetic resin fastening part removed.

Referring now to FIGS. 15-17, a sprocket 271 is illustrated in accordance with a third embodiment. The sprocket 271 basically includes a metallic sprocket ring part 291, a synthetic resin fastening part 292 and a plurality of attachment parts 293 with a connecting portion 293*a* and a radial projecting portion 293*b*. The sprocket 271 is configured and arranged to replace the sprocket 71 in the crankset 51 of the first embodiment. The sprocket 271 is identical to the sprocket 71, as discussed above, except that the inner peripheral edge of the metallic sprocket ring part 291 and the radial projecting portion 293*b* of the attachment parts 293 have been modified. In view of the similarity between this embodiment and the prior embodiments, the descriptions of the parts of this embodiment that are identical to the parts of the prior embodiments may be omitted for the sake of brevity. Thus, unless otherwise specified or illustrated, the descriptions of the parts of the prior embodiments apply to the corresponding parts of this embodiment.

In this embodiment, the free ends of the arms of the radial projecting portions 293*b* are disposed so that the free ends of the arms of the radial projecting portions 293*b* overlap with the inner periphery of the sprocket ring part 291 as viewed in a circumferential direction relative to the rotation axis. In particular, the free ends of the arms of the radial projecting portions 293*b* are disposed in notches 295 that are formed in the inner periphery of the sprocket ring part 291. Since the free ends of the arms of the attachment parts 293 are disposed in the notches 295 of the inner periphery of the sprocket ring part 291, the free ends of the arms of the attachment parts 293 overlap with the sprocket ring part 291 in a circumferential direction. The notches 295 of the inner periphery of the sprocket ring part 291 are configured relative to the free ends of the arms of the attachment parts 293 to limit relative circumferential movement between the attachment parts 293 and the sprocket ring part 291. Thus, the gaps between the free ends of the arms of the attachment parts 293 and the surfaces of the notches 295 are preferably as minimal as manufacturing tolerances allow to limit relative circumferential movement between the attachment parts 293 and the sprocket ring part 291.

Fourth Embodiment

Figure 18:
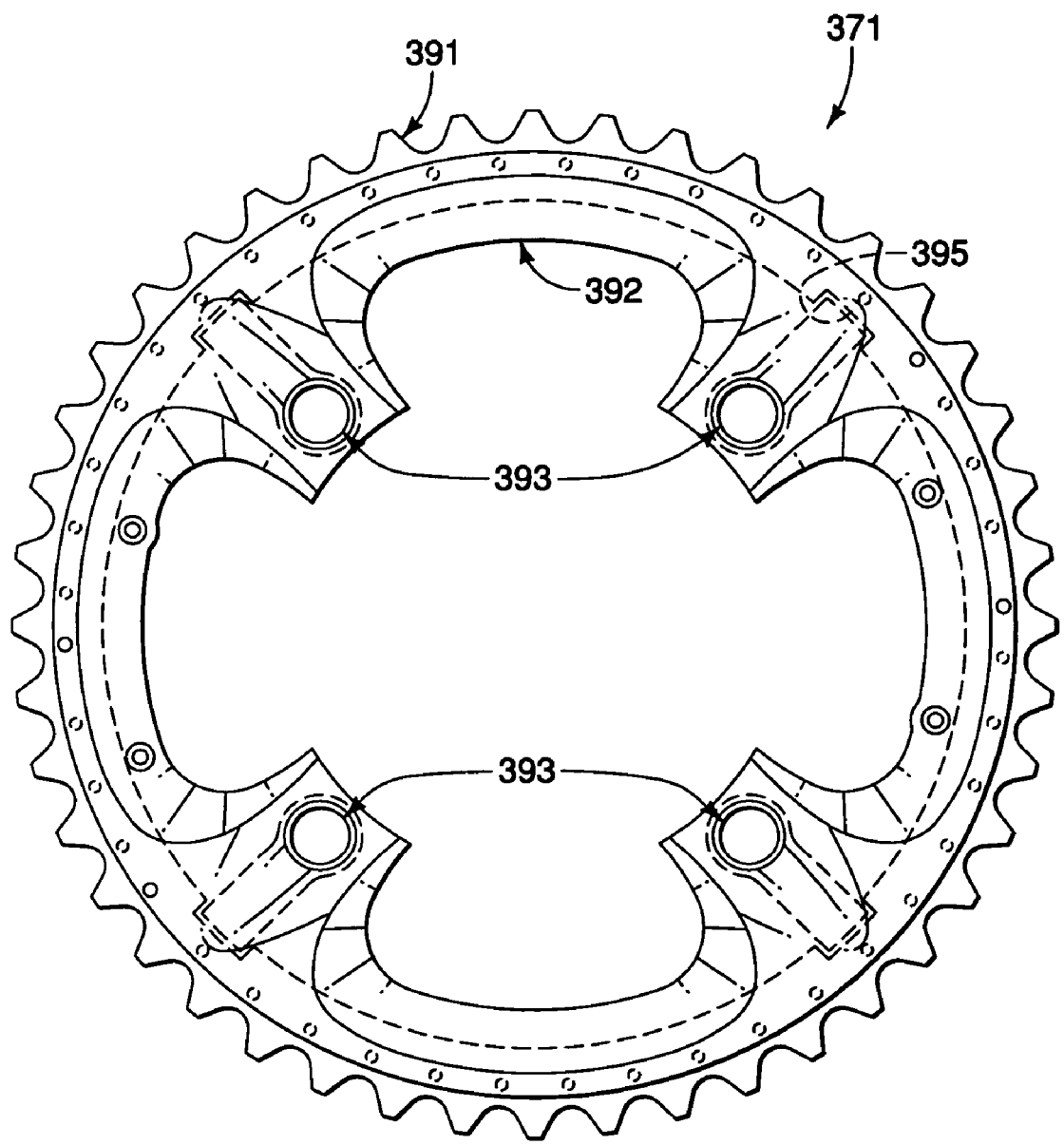
FIG. 18 is an outside elevational view of a large bicycle sprocket in accordance with a fourth embodiment of the present invention that is used in the crankset of the bicycle of FIG. 1.
Figure 19:
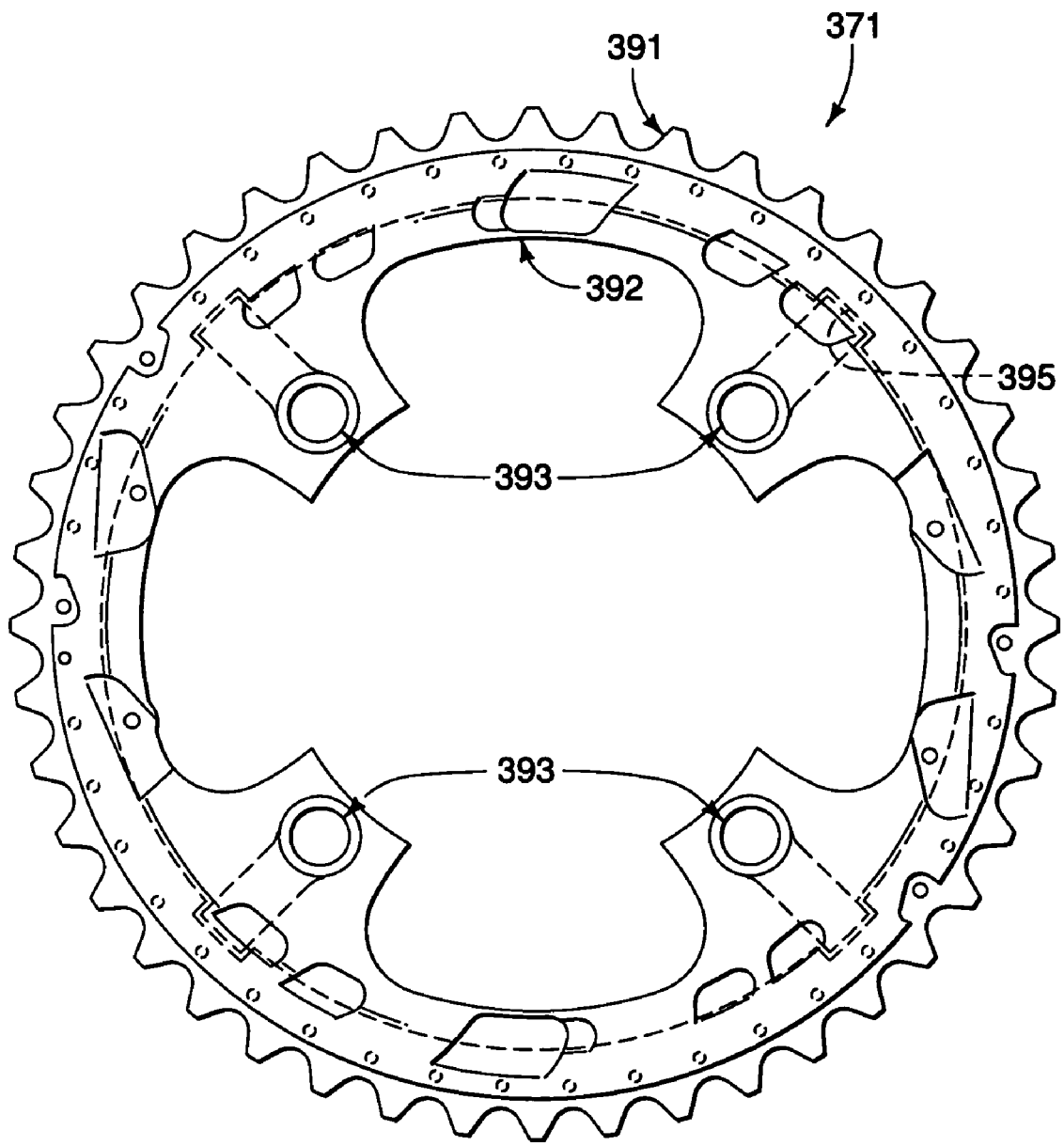
FIG. 19 is an inside elevational view of the large bicycle sprocket illustrated in FIG. 18 in accordance with the fourth embodiment of the present invention.
Figure 20:
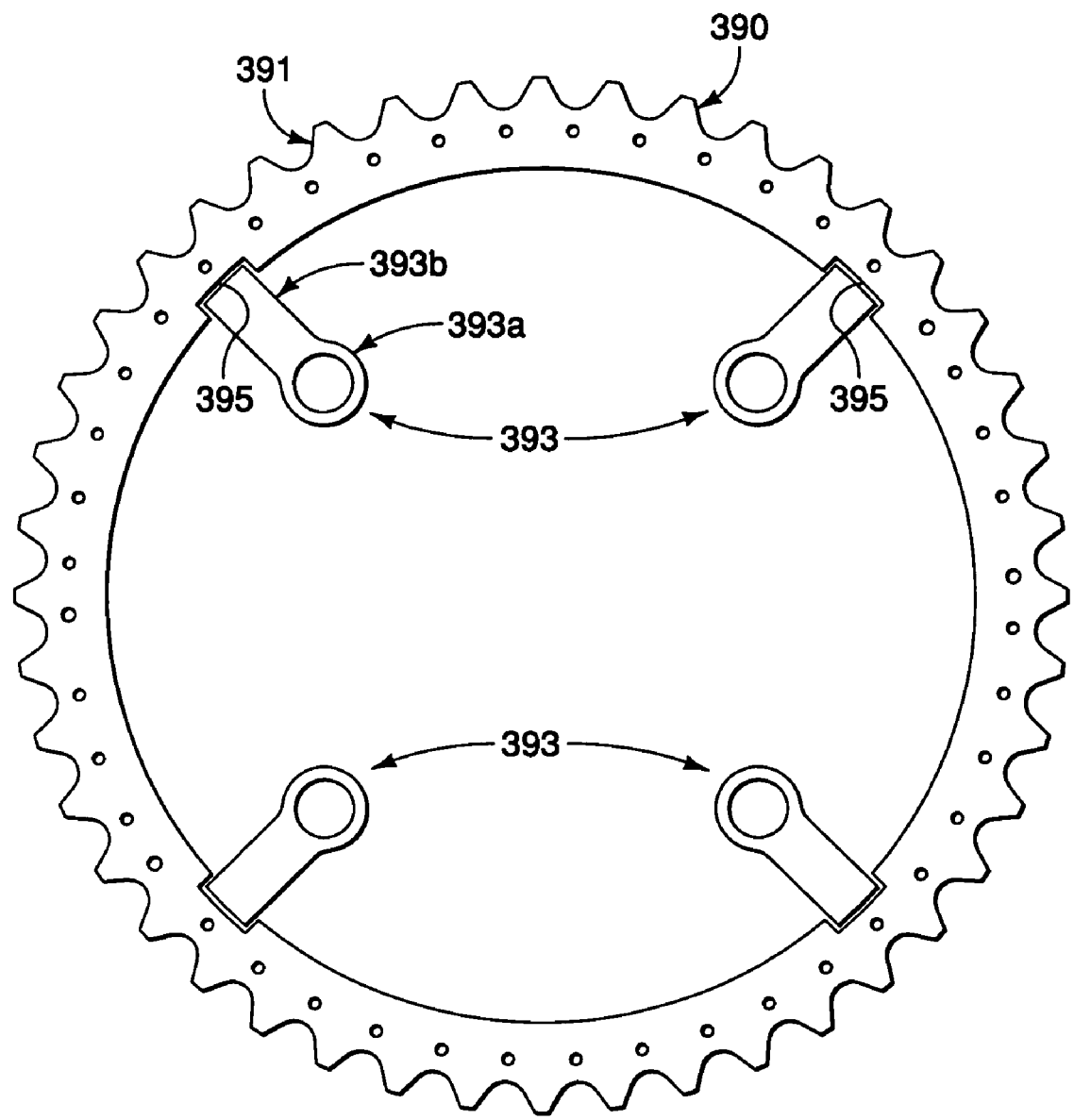
FIG. 20 is an outside elevational view of the sprocket ring part and the attachment parts of the large bicycle sprocket shown in FIGS. 18 and 19 with the synthetic resin fastening part removed.

Referring now to FIGS. 18-20, a sprocket 371 is illustrated in accordance with a fourth embodiment. The sprocket 371 basically includes a metallic sprocket ring part 391, a synthetic resin fastening part 392 and a plurality of attachment parts 393 with a connecting portion 393a and a radial projecting portion 393b. The sprocket 371 is configured and arranged to replace the sprocket 71 in the crankset 51 of the first embodiment. The sprocket 371 is identical to the sprocket 71, as discussed above, except that the inner peripheral edge of the metallic sprocket ring part 391 and the radial projecting portion 393b of the attachment parts 393 have been modified. In view of the similarity between this embodiment and the prior embodiments, the descriptions of the parts of this embodiment that are identical to the parts of the prior embodiments may be omitted for the sake of brevity. Thus, unless otherwise specified or illustrated, the descriptions of the parts of the prior embodiments apply to the corresponding parts of this embodiment.

In this embodiment, the free ends of the radial projecting portions 393b are disposed so that the free ends the radial projecting portions 393b overlap with the inner periphery of the sprocket ring part 391 as viewed in a circumferential direction relative to the rotation axis. In particular, the free ends of the radial projecting portions 393b are disposed in notches 395 that are formed in the inner periphery of the sprocket ring part 391. Since the free ends of the arms of the attachment parts 393 are disposed in the notches 395 of the inner periphery of the sprocket ring part 391, the free ends of the arms of the attachment parts 393 overlap with the sprocket ring part 391 in a circumferential direction. The notches 395 of the inner periphery of the sprocket ring part 391 are configured relative to the free ends of the arms of the attachment parts 393 to limit relative circumferential movement between the attachment parts 393 and the sprocket ring part 391. Thus, the gaps between the free ends of the arms of the attachment parts 393 and the surfaces of the notches 395 are preferably as minimal as manufacturing tolerances allow to limit relative circumferential movement between the attachment parts 393 and the sprocket ring part 391.

Fifth Embodiment

Figure 21:
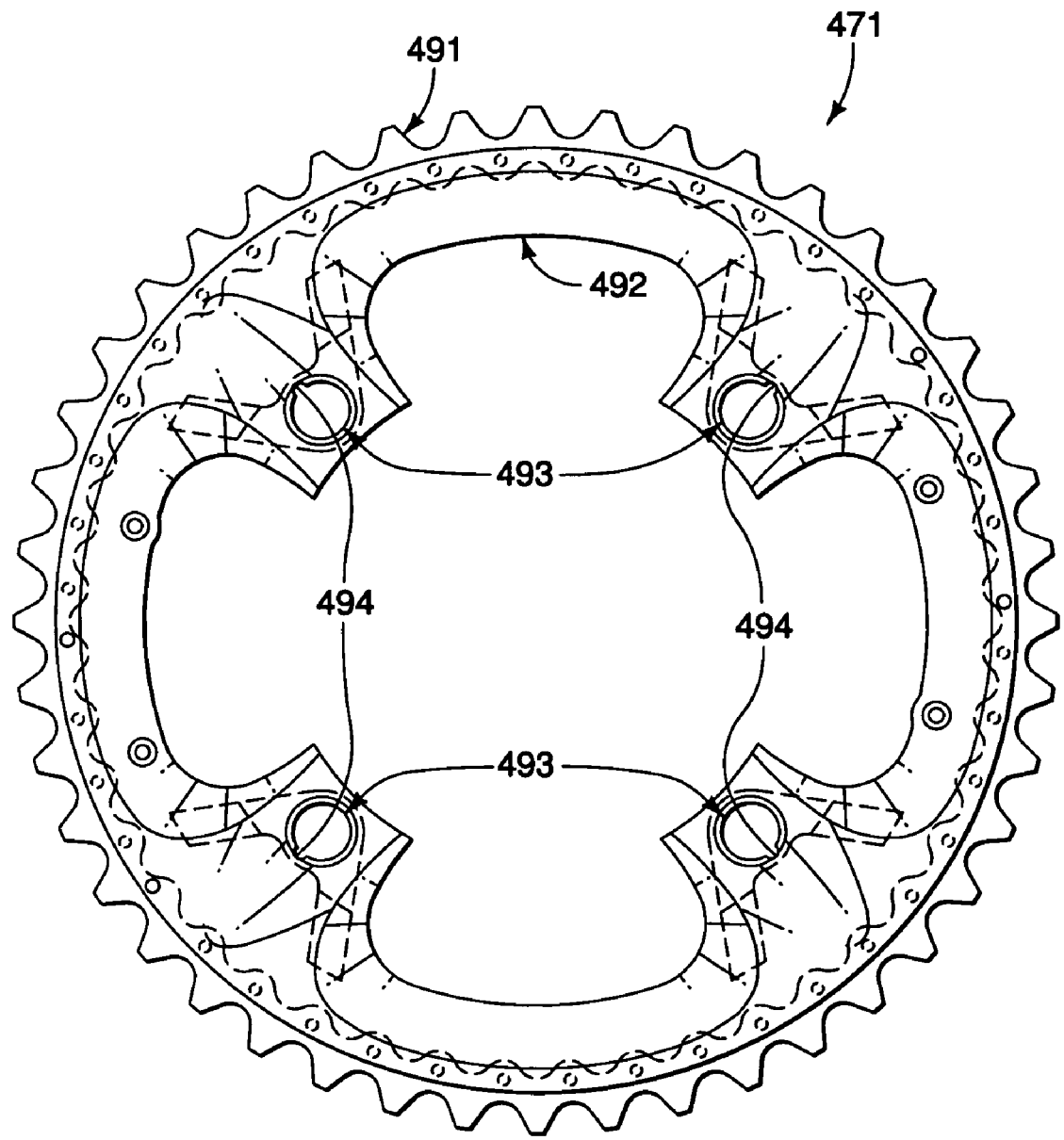
FIG. 21 is an outside elevational view of a large bicycle sprocket in accordance with a fifth embodiment of the present invention that is used in the crankset of the bicycle of FIG. 1.
Figure 22:
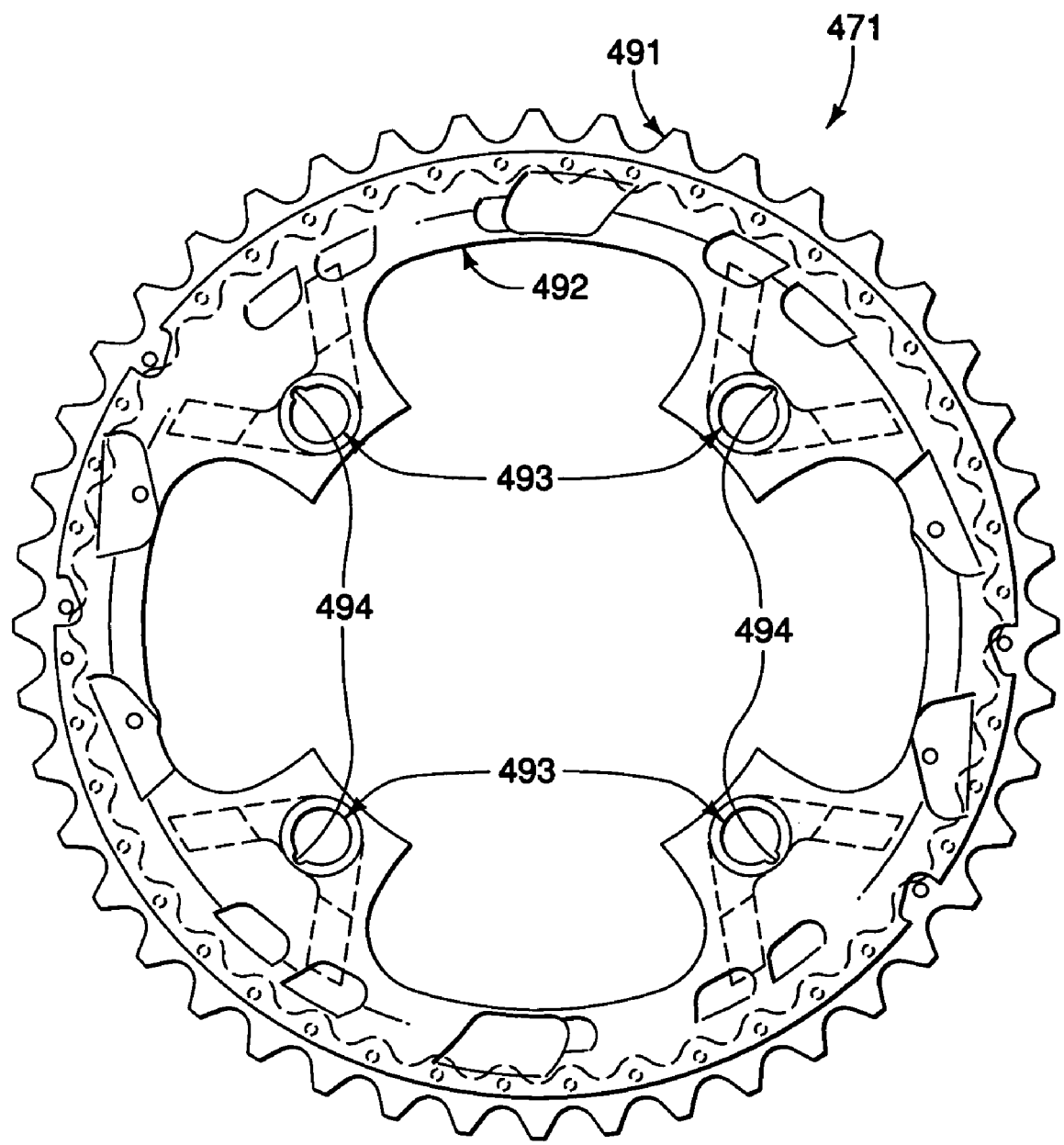
FIG. 22 is an inside elevational view of the large bicycle sprocket illustrated in FIG. 21 in accordance with the fifth embodiment of the present invention.
Figure 23:
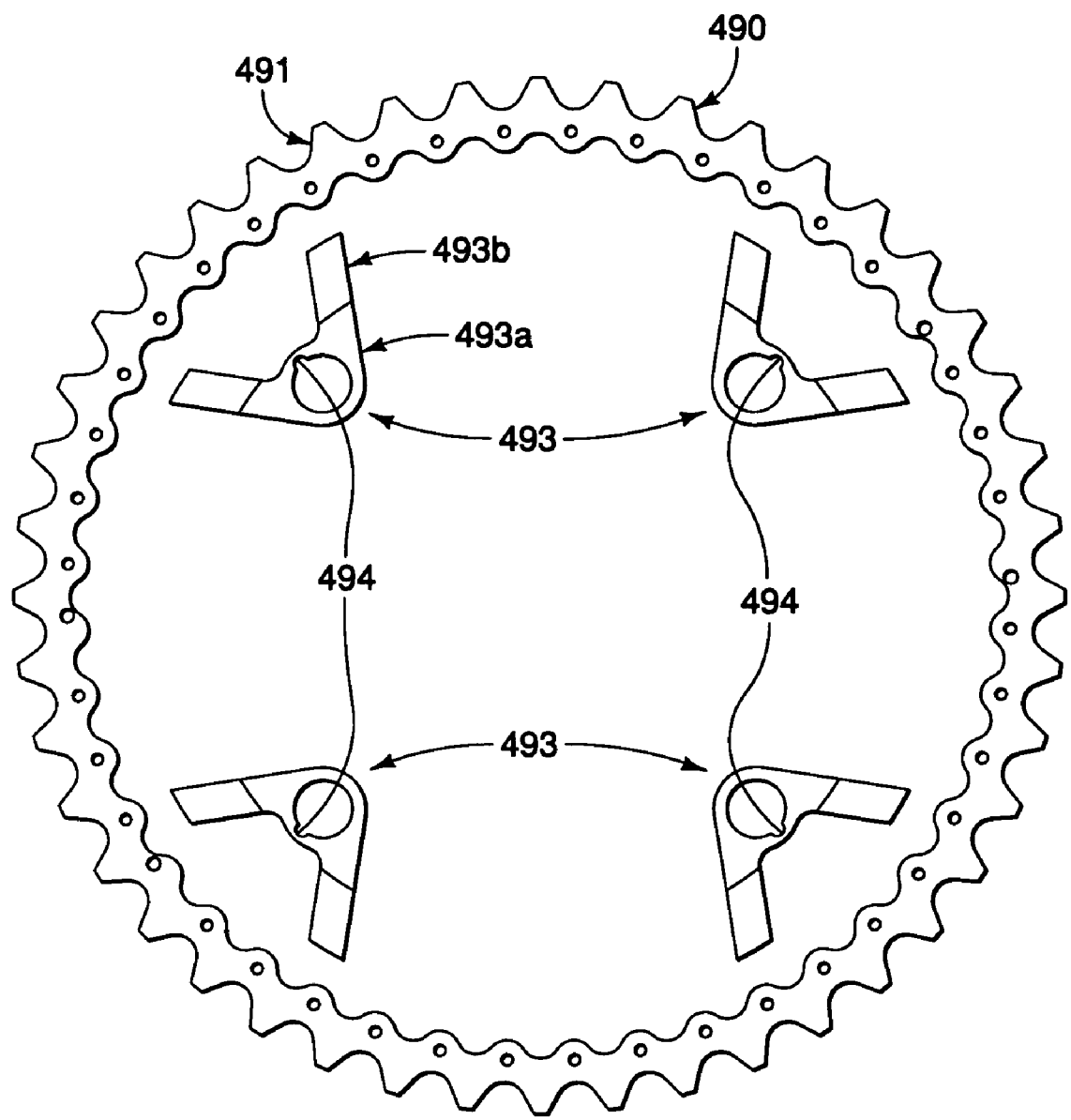
FIG. 23 is an outside elevational view of the sprocket ring part and the attachment parts of the large bicycle sprocket shown in FIGS. 21 and 22 with the synthetic resin fastening part removed.

Referring now to FIGS. 21-23, a sprocket 471 is illustrated in accordance with a fifth embodiment. The sprocket 471 basically includes a metallic sprocket ring part 491, a synthetic resin fastening part 492 and a plurality of attachment parts 493 with a connecting portion 493a and a radial projecting portion 493b. The sprocket 471 is configured and arranged to replace the sprocket 71 in the crankset 51 of the first embodiment. The sprocket 471 is identical to the sprocket 71, as discussed above, except that the connecting portion 493a of the attachment parts 493 have been modified. In view of the similarity between this embodiment and the prior embodiments, the descriptions of the parts of this embodiment that are identical to the parts of the prior embodiments may be omitted for the sake of brevity. Thus, unless otherwise specified or illustrated, the descriptions of the parts of the prior embodiments apply to the corresponding parts of this embodiment.

In this embodiment, the connecting portions 493a of the attachment parts 493 include an alignment notch 494 in a peripheral surface that defines the fastener hole. The alignment notches 494 aid in the manufacturing process by providing the correct orientation of the attachment parts 493 relative to the metallic sprocket ring part 491. Thus, positioning pins with corresponding projections engage the alignment notches 494 in the manufacturing process to provide for the correct orientation of the attachment parts 493 relative to the metallic sprocket ring part 491.

Sixth Embodiment

Figure 24:
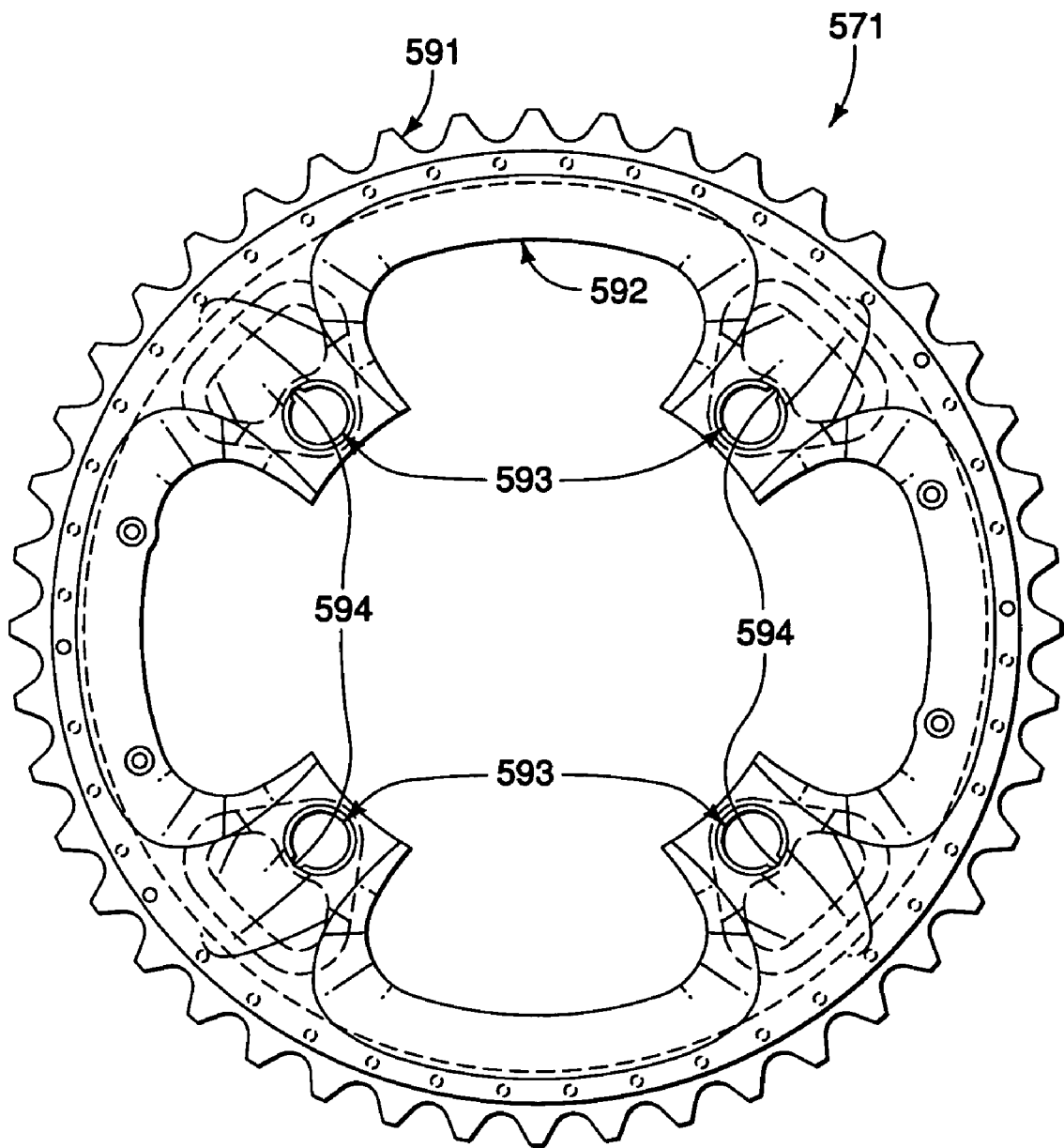
FIG. 24 is an outside elevational view of a large bicycle sprocket in accordance with a sixth embodiment of the present invention that is used in the crankset of the bicycle of FIG. 1.
Figure 25:
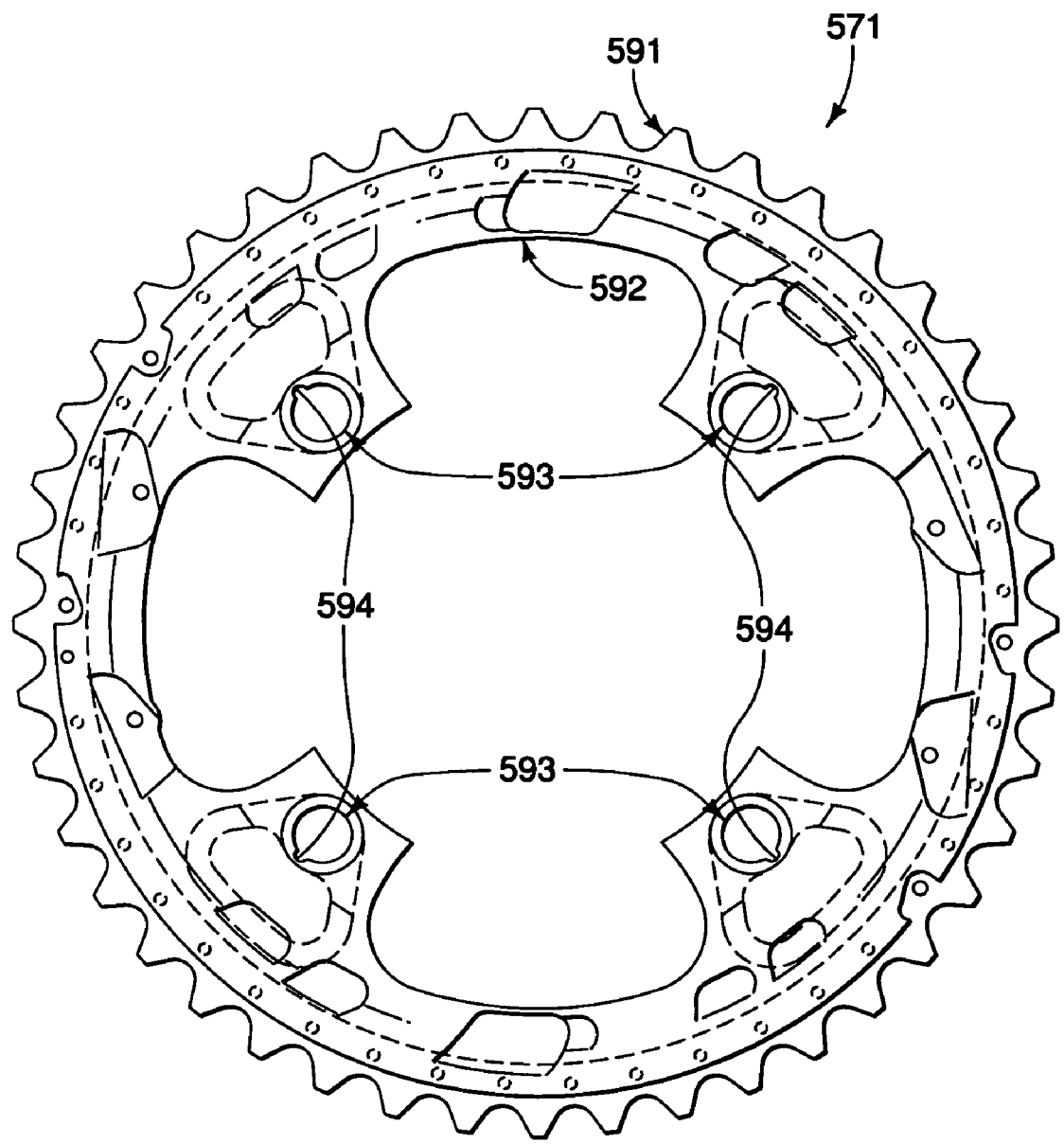
FIG. 25 is an inside elevational view of the large bicycle sprocket illustrated in FIG. 24 in accordance with the sixth embodiment of the present invention.
Figure 26:
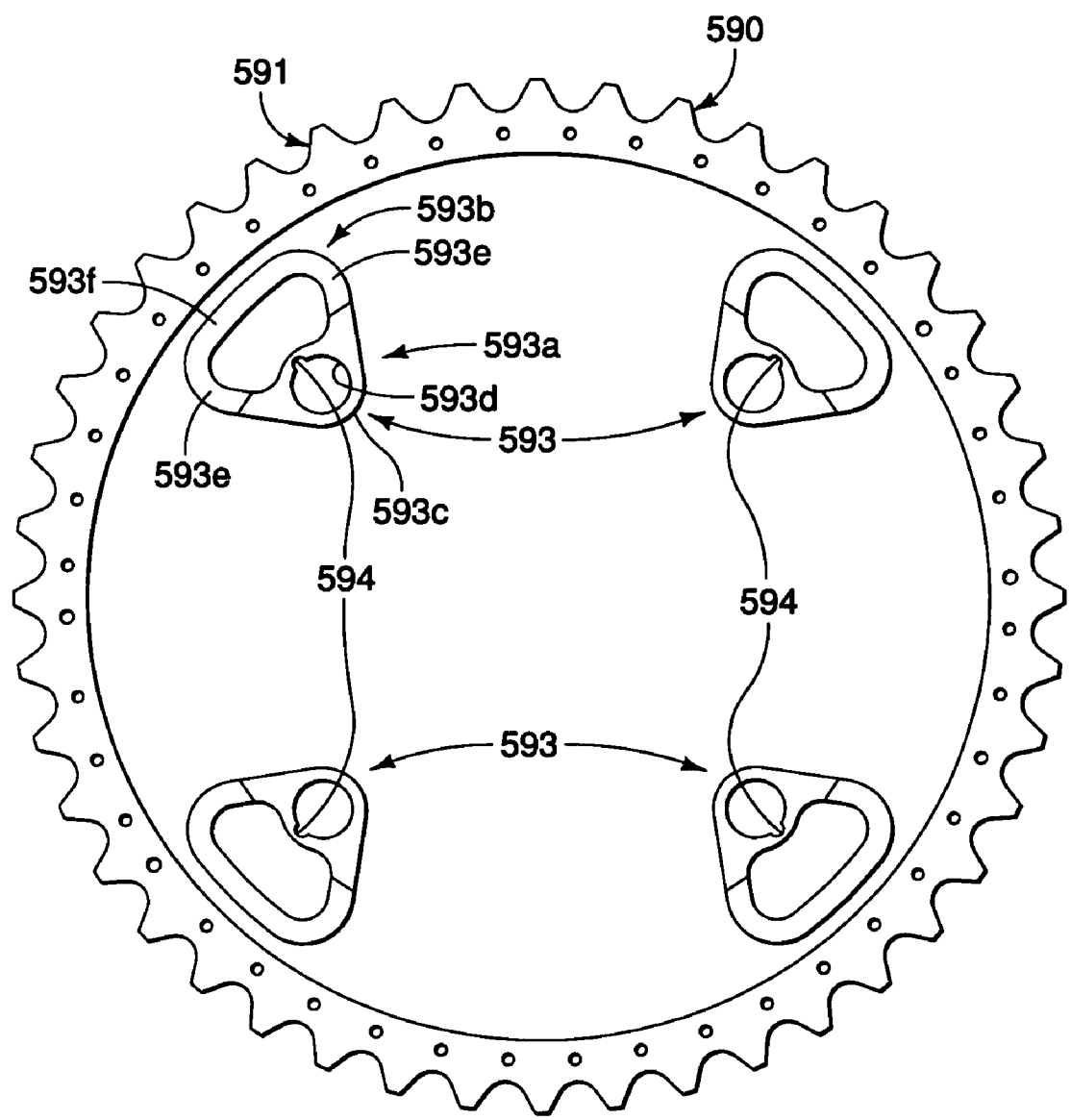
FIG. 26 is an outside elevational view of the sprocket ring part and the attachment parts of the large bicycle sprocket shown in FIGS. 24 and 25 with the synthetic resin fastening part removed.

Referring now to FIGS. 24-26, a sprocket 571 is illustrated in accordance with a sixth embodiment. The sprocket 571 basically includes a metallic sprocket ring part 591, a synthetic resin fastening part 592 and a plurality of attachment parts 593 with a connecting portion 593a and a radial projecting portion 593b. The sprocket 571 is configured and arranged to replace the sprocket 71 in the crankset 51 of the first embodiment. The sprocket 571 is identical to the sprocket 71, as discussed above, except that the inner peripheral edge of the metallic sprocket ring part 591 and the radial projecting portion 593b of the attachment parts 593 have been modified. In view of the similarity between this embodiment and the prior embodiments, the descriptions of the parts of this embodiment that are identical to the parts of the prior embodiments may be omitted for the sake of brevity. Thus, unless otherwise specified or illustrated, the descriptions of the parts of the prior embodiments apply to the corresponding parts of this embodiment.

In this embodiment, the metallic sprocket ring part 591 is identical to the metallic sprocket ring part 91, as discussed above, except that the inner peripheral edge of the metallic sprocket ring part 591 is a smooth cylindrical surface. Also in this embodiment, the connecting portions 593a of the attachment parts 593 include a step shaped tubular member 593c surrounding a fastener hole 593d. The connecting portions 593a is identical to the connecting portions 93a, as discussed above, except that an alignment notch 594 in a peripheral surface that defines the fastener hole 593d has been added similar to the fifth embodiment.

Also, in this embodiment, the radial projecting portion 593b includes at least two arms 593e that extend outwardly from the connecting portion 593a towards the sprocket ring part 591, and a connected element 593f extending between the arms 593e. The arms 593e and the connected element 593f form a closed loop relative to the connecting portion 593a with the synthetic resin fastening part 592 disposed therein. This loop of the radial projecting portion 593b is cantilevered relative to the connecting portion 593a, and spaced radially inward of the inner periphery of the sprocket ring part 591 with the synthetic resin fastening part 592 disposed therebetween in a radial direction.

Seventh Embodiment

Figure 27:
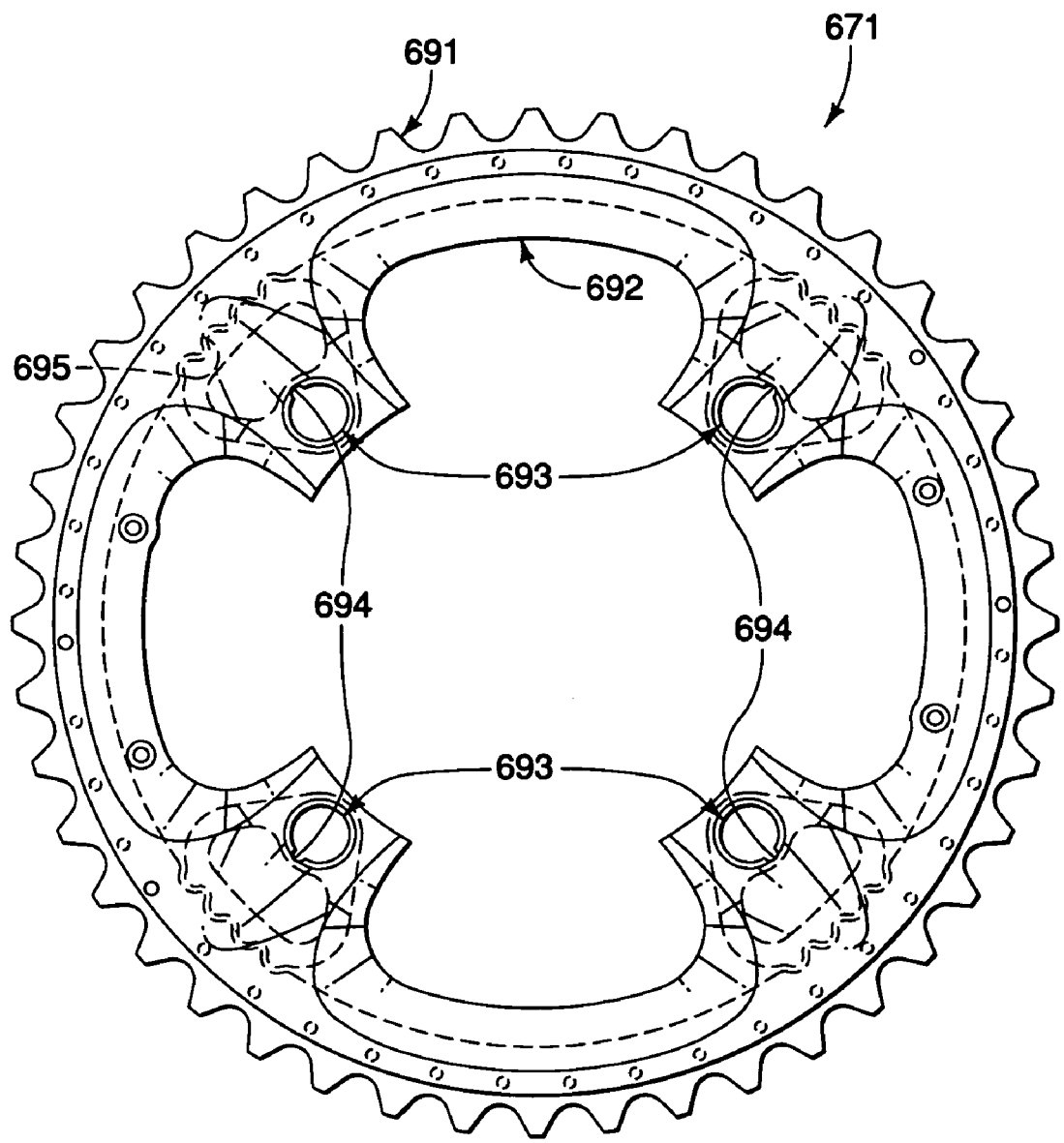
FIG. 27 is an outside elevational view of a large bicycle sprocket in accordance with a seventh embodiment of the present invention that is used in the crankset of the bicycle of FIG. 1.
Figure 28:
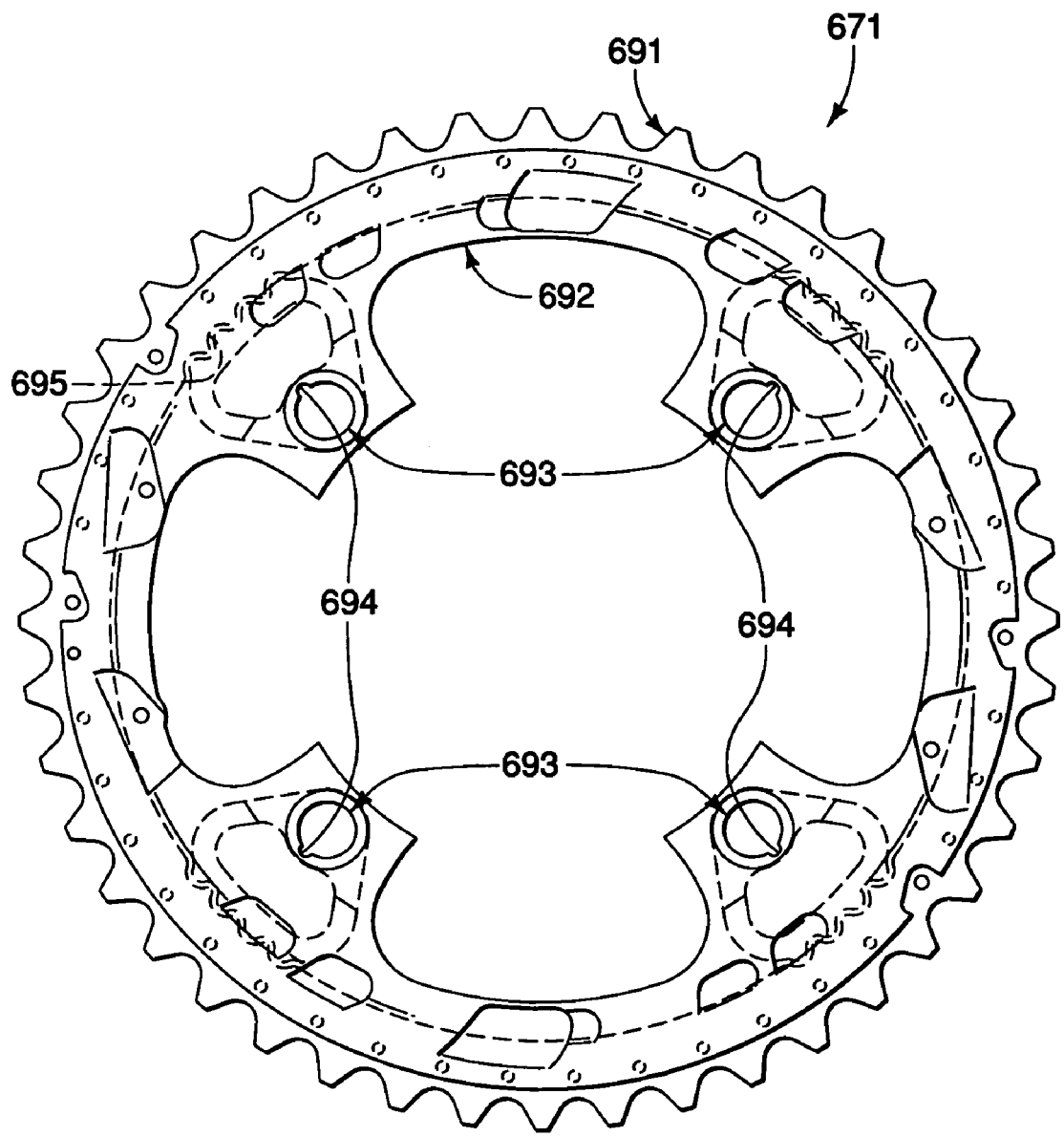
FIG. 28 is an inside elevational view of the large bicycle sprocket illustrated in FIG. 27 in accordance with the seventh embodiment of the present invention.
Figure 29:
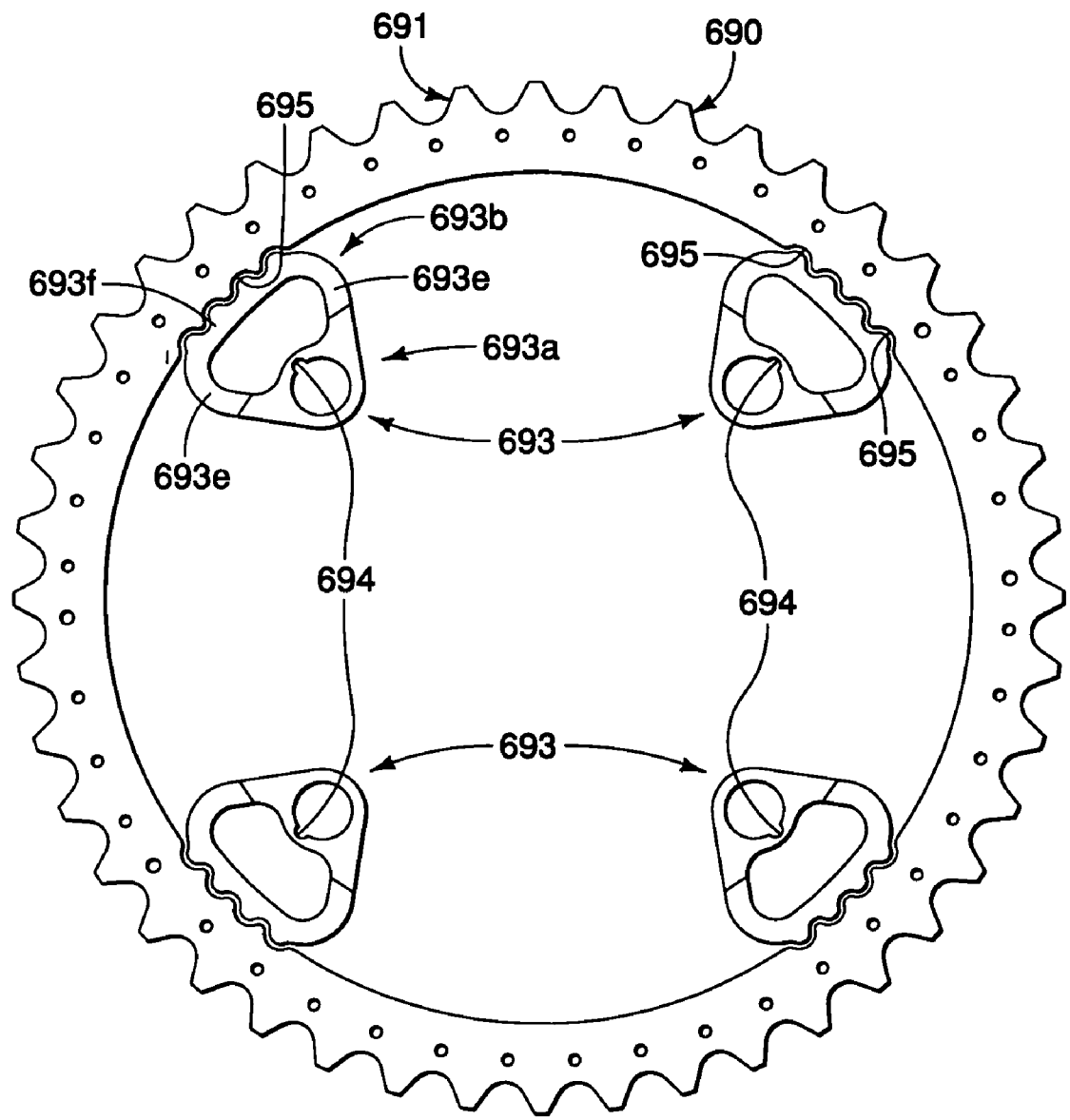
FIG. 29 is an outside elevational view of the sprocket ring part and the attachment parts of the large bicycle sprocket shown in FIGS. 27 and 28 with the synthetic resin fastening part removed.
Figure 30:
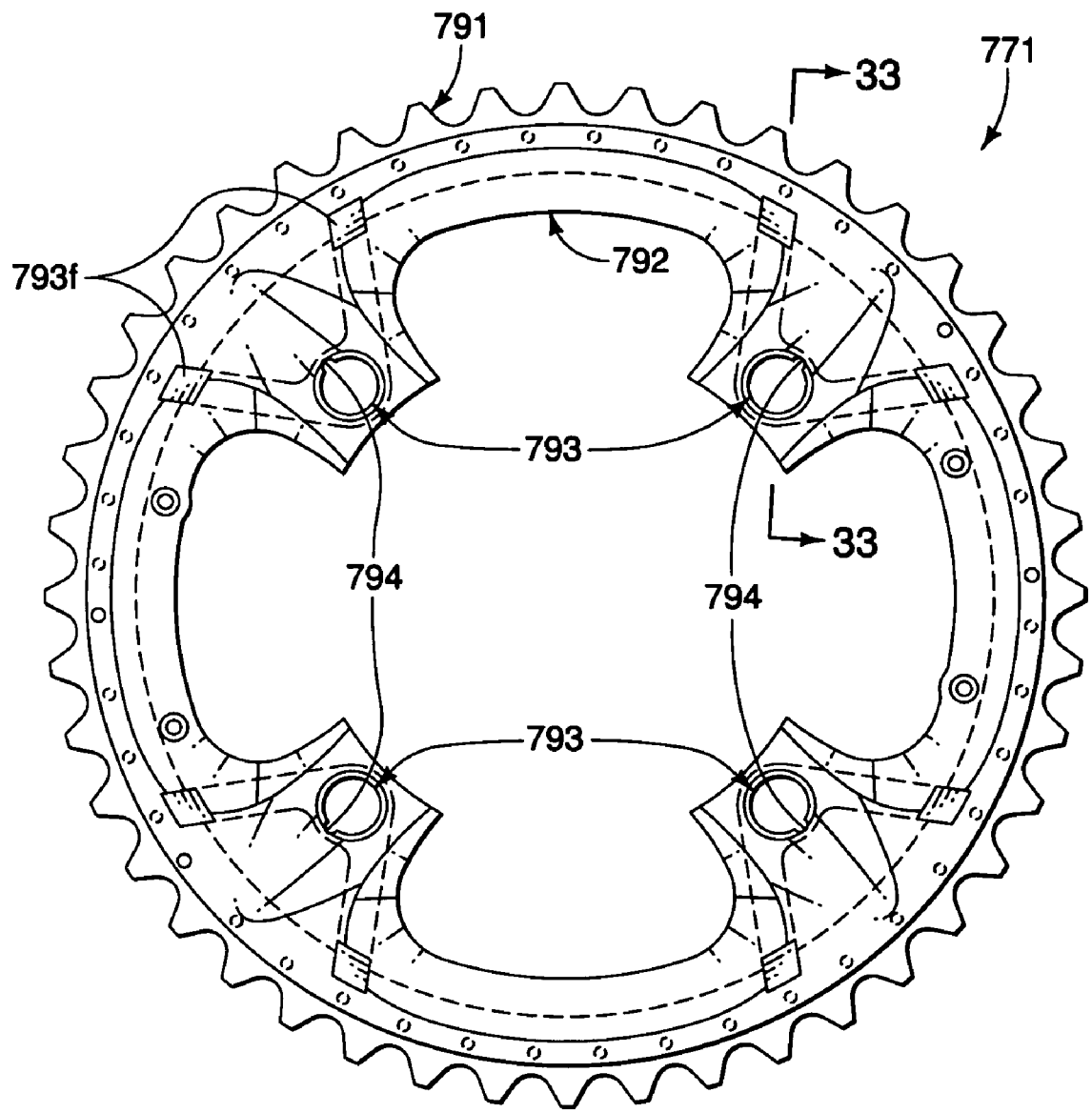
FIG. 30 is an outside elevational view of a large bicycle sprocket in accordance with an eighth embodiment of the present invention that is used in the crankset of the bicycle of FIG. 1.
Figure 31:
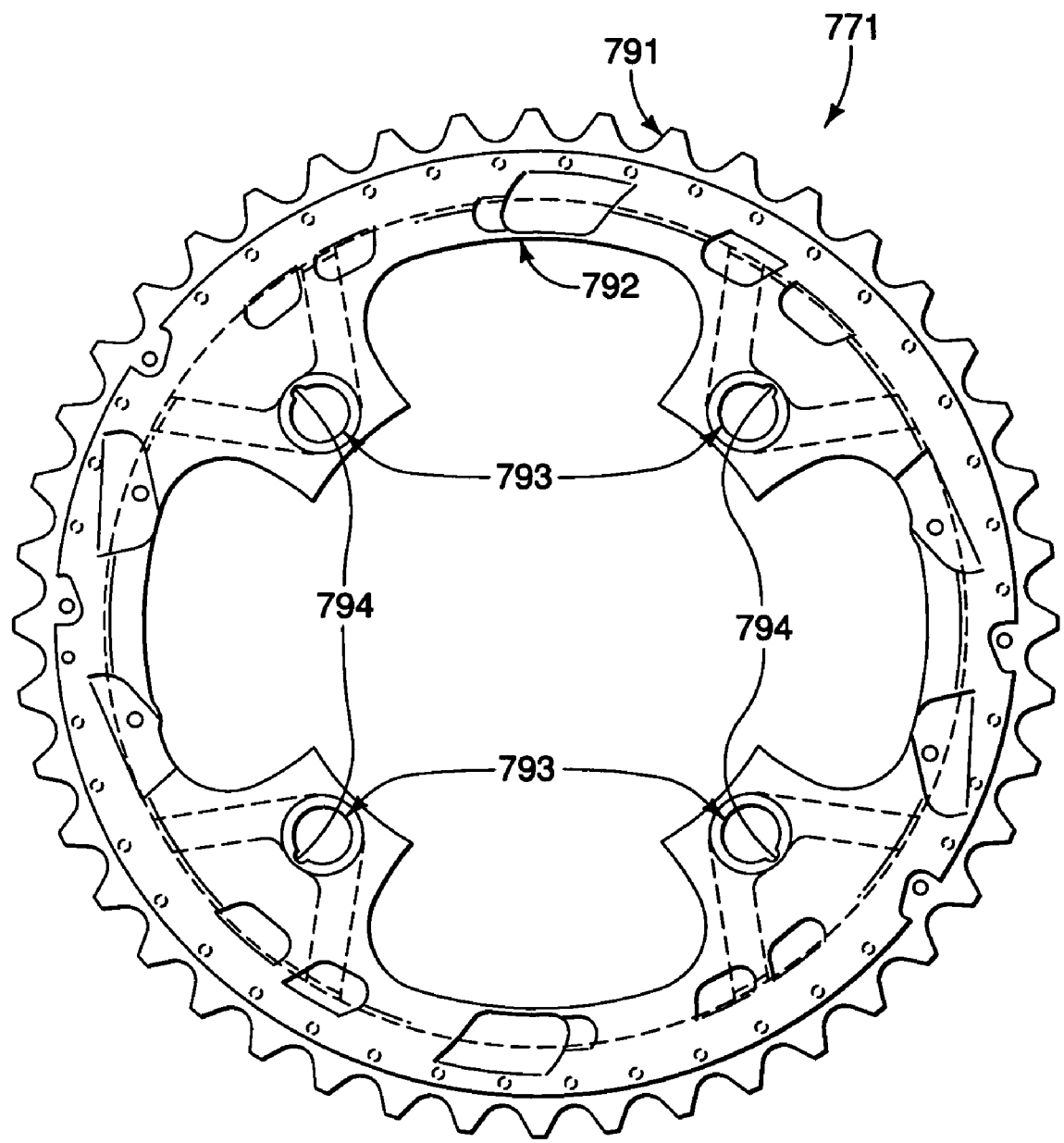
FIG. 31 is an inside elevational view of the large bicycle sprocket illustrated in FIG. 30 in accordance with the eighth embodiment of the present invention.
Figure 32:
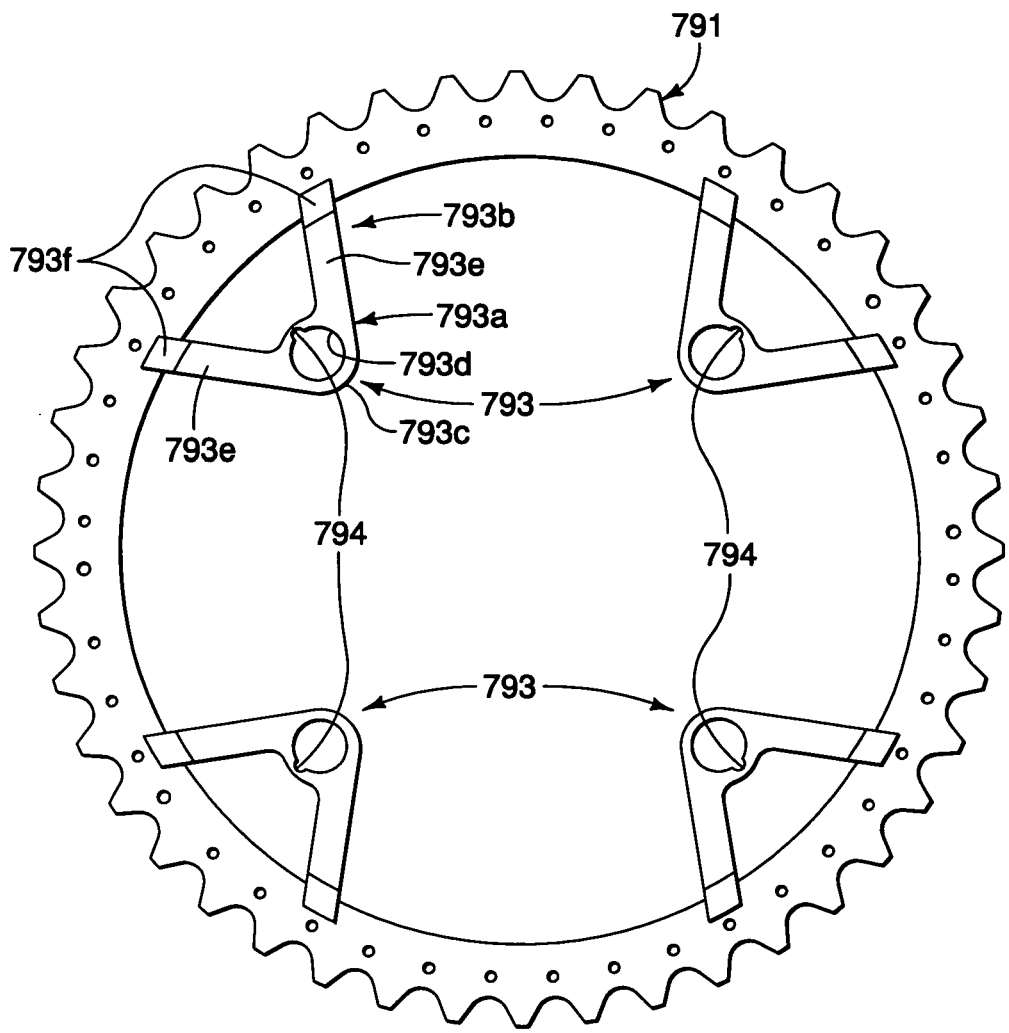
FIG. 32 is an outside elevational view of the sprocket ring part and the attachment parts of the large bicycle sprocket shown in FIGS. 30 and 31 with the synthetic resin fastening part removed.
Figure 33:
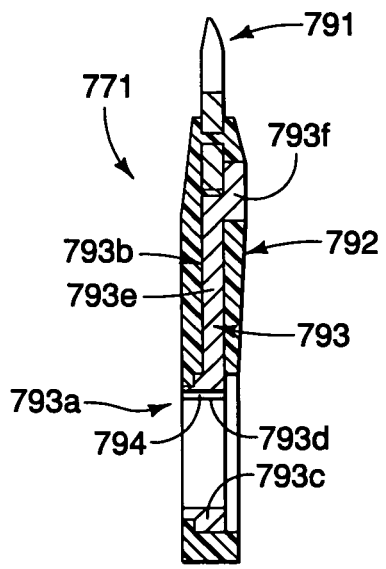
FIG. 33 is an enlarged, partial cross sectional view of the large bicycle sprocket illustrated in FIGS. 30-32 as seen along section line 33-33 in FIG. 30 in accordance with the eighth embodiment of the present invention.
Figure 34:
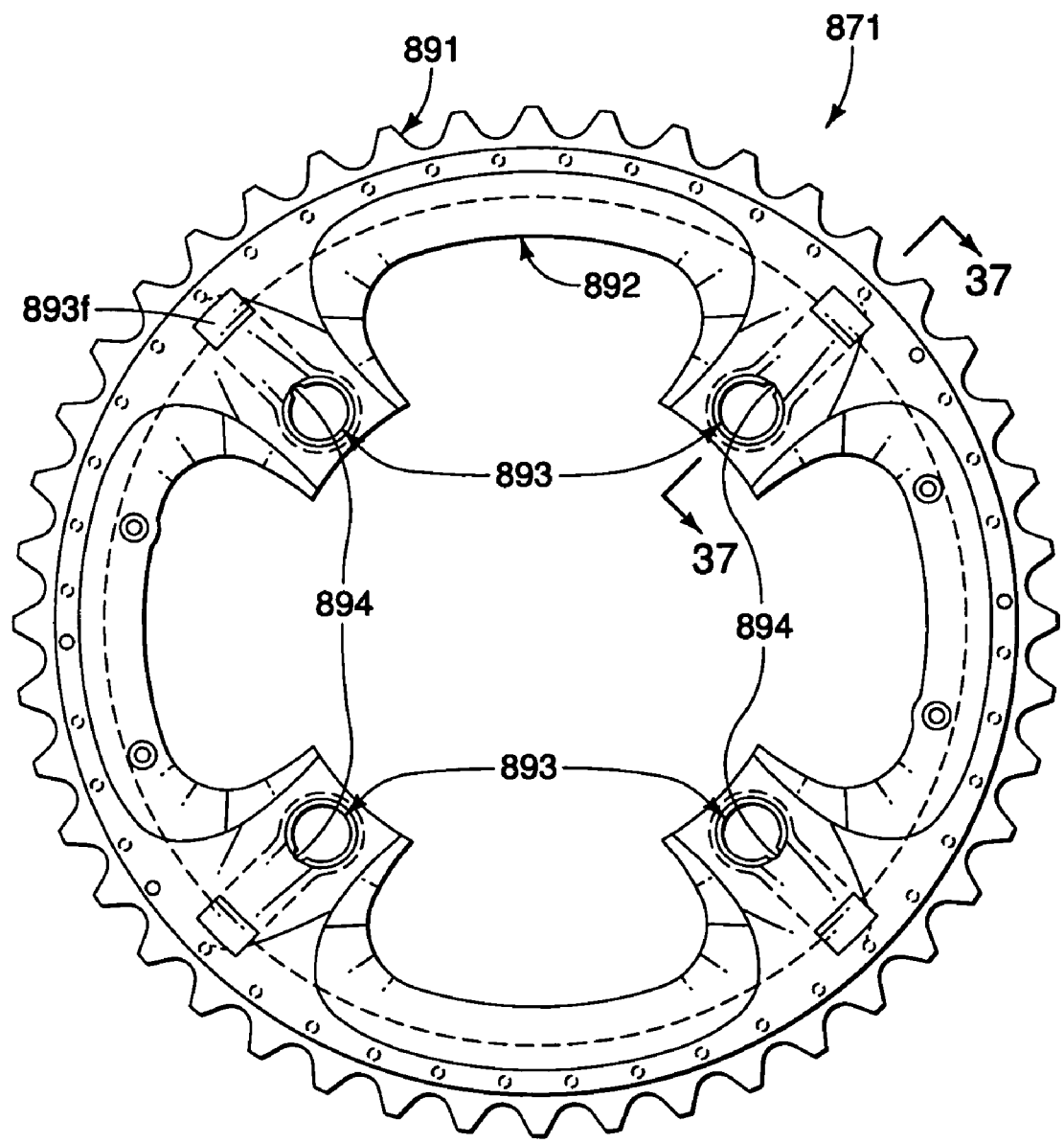
FIG. 34 is an outside elevational view of a large bicycle sprocket in accordance with a ninth embodiment of the present invention that is used in the crankset of the bicycle of FIG. 1.
Figure 35:
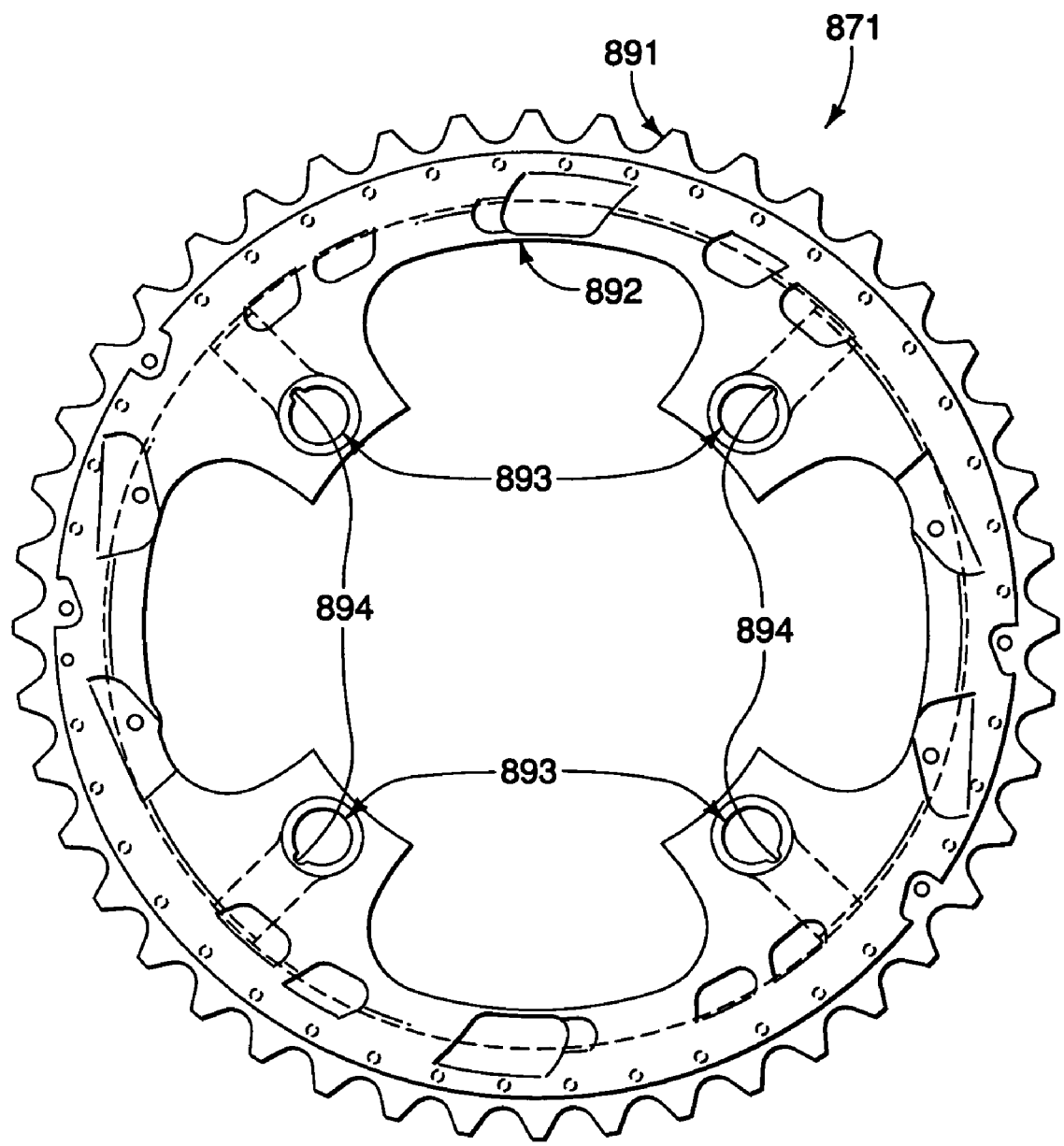
FIG. 35 is an inside elevational view of the large bicycle sprocket illustrated in FIG. 34 in accordance with the ninth embodiment of the present invention.
Figure 36:
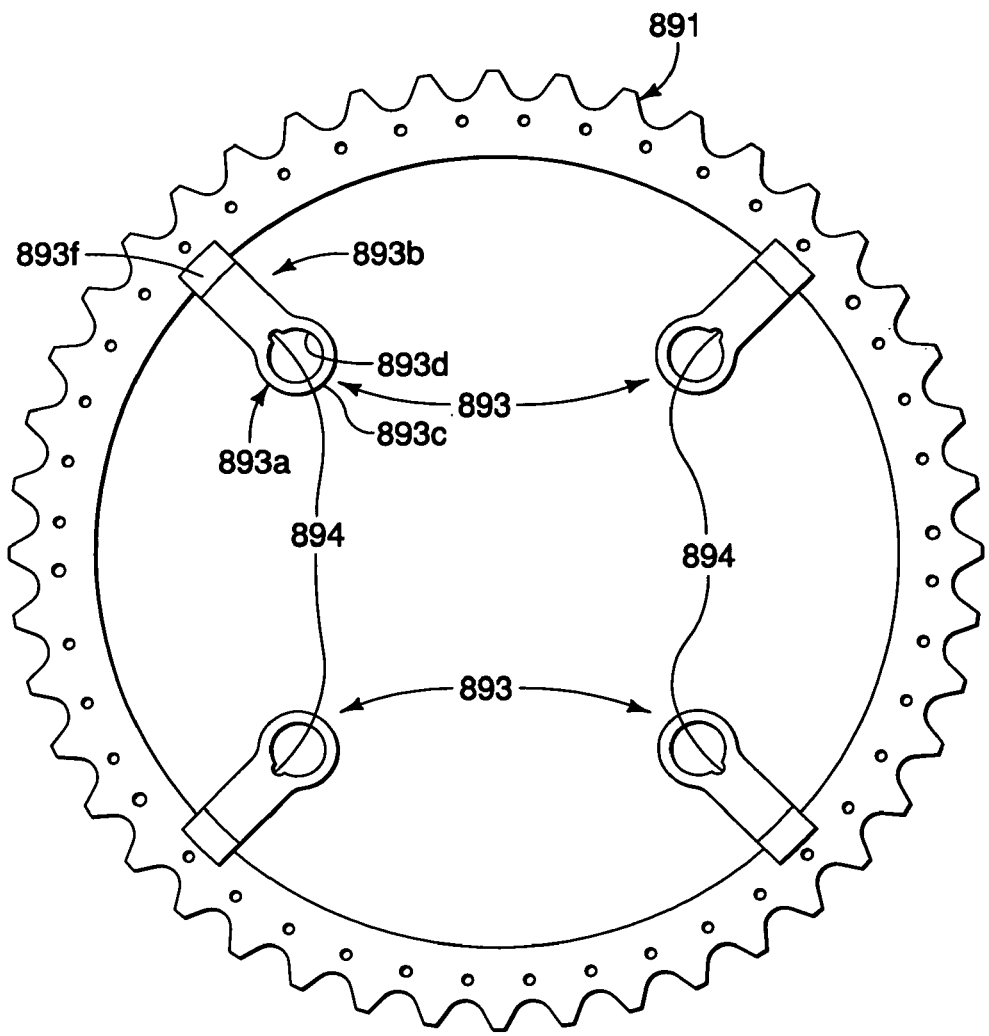
FIG. 36 is an outside elevational view of the sprocket ring part and the attachment parts of the large bicycle sprocket shown in FIGS. 34 and 35 with the synthetic resin fastening part removed.
Figure 37:
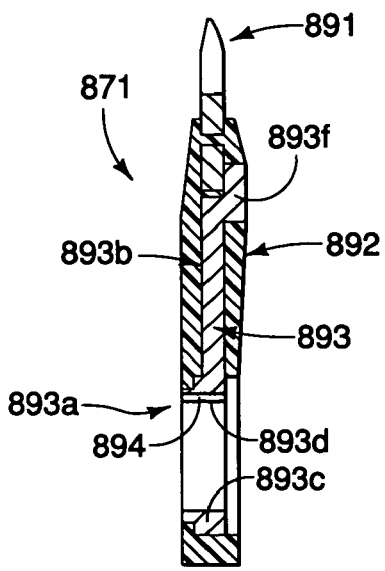
FIG. 37 is an enlarged, partial cross sectional view of the large bicycle sprocket illustrated in FIGS. 34-36 as seen along section line 37-37 in FIG. 34 in accordance with the ninth embodiment of the present invention.
Figure 38:
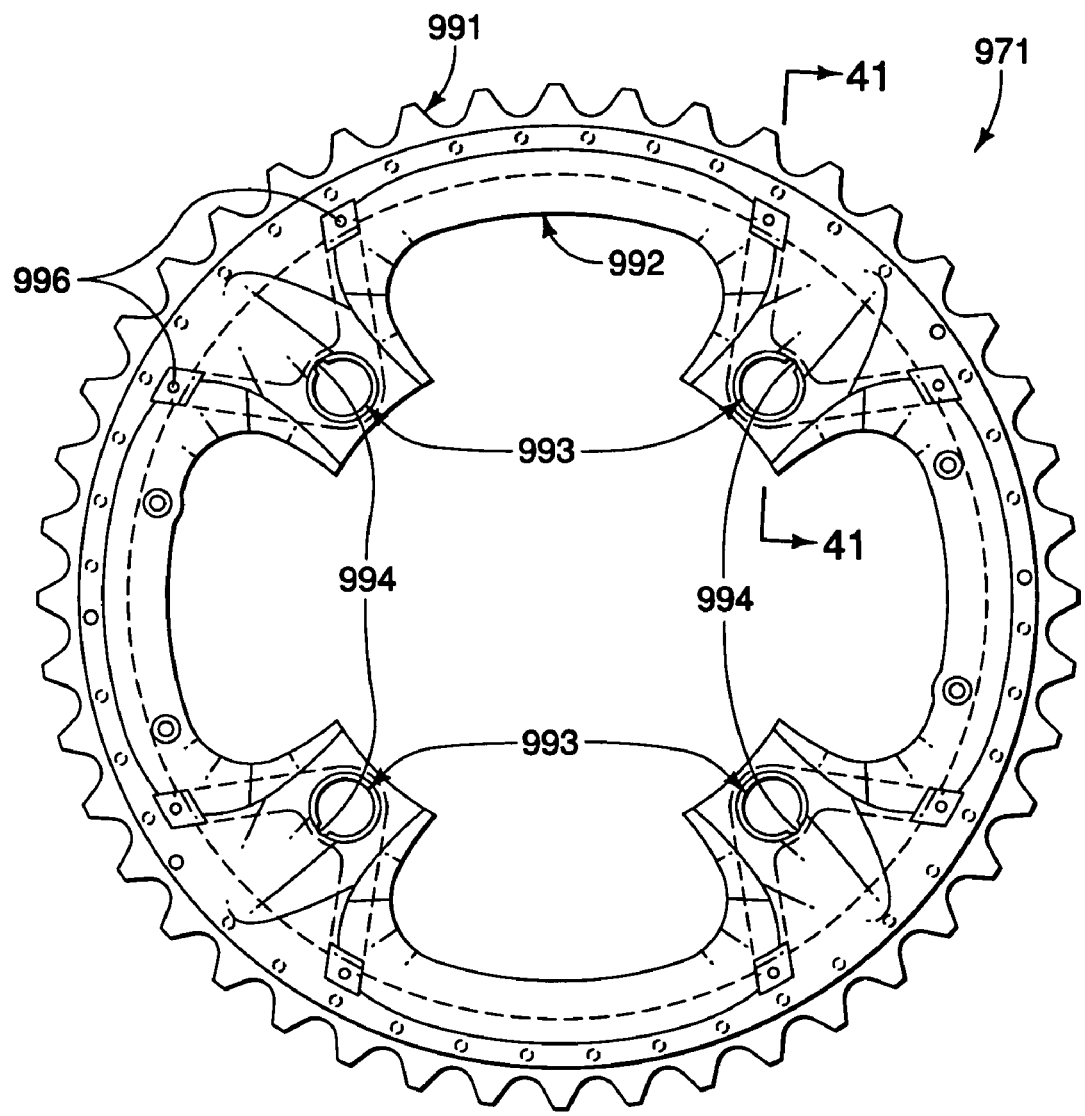
FIG. 38 is an outside elevational view of a large bicycle sprocket in accordance with a tenth embodiment of the present invention that is used in the crankset of the bicycle of FIG. 1.
Figure 39:
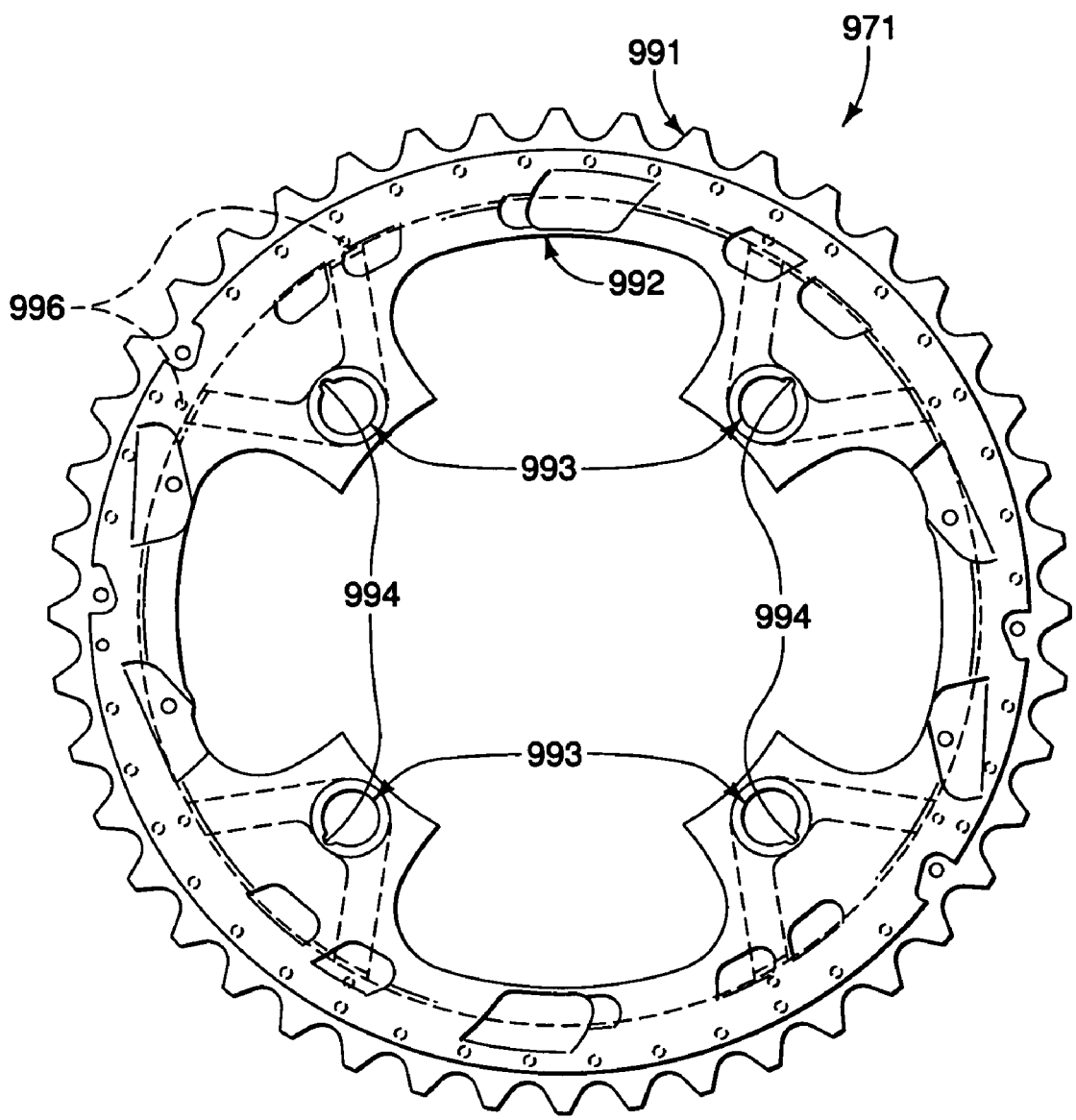
FIG. 39 is an inside elevational view of the large bicycle sprocket illustrated in FIG. 38 in accordance with the tenth embodiment of the present invention.
Figure 40:
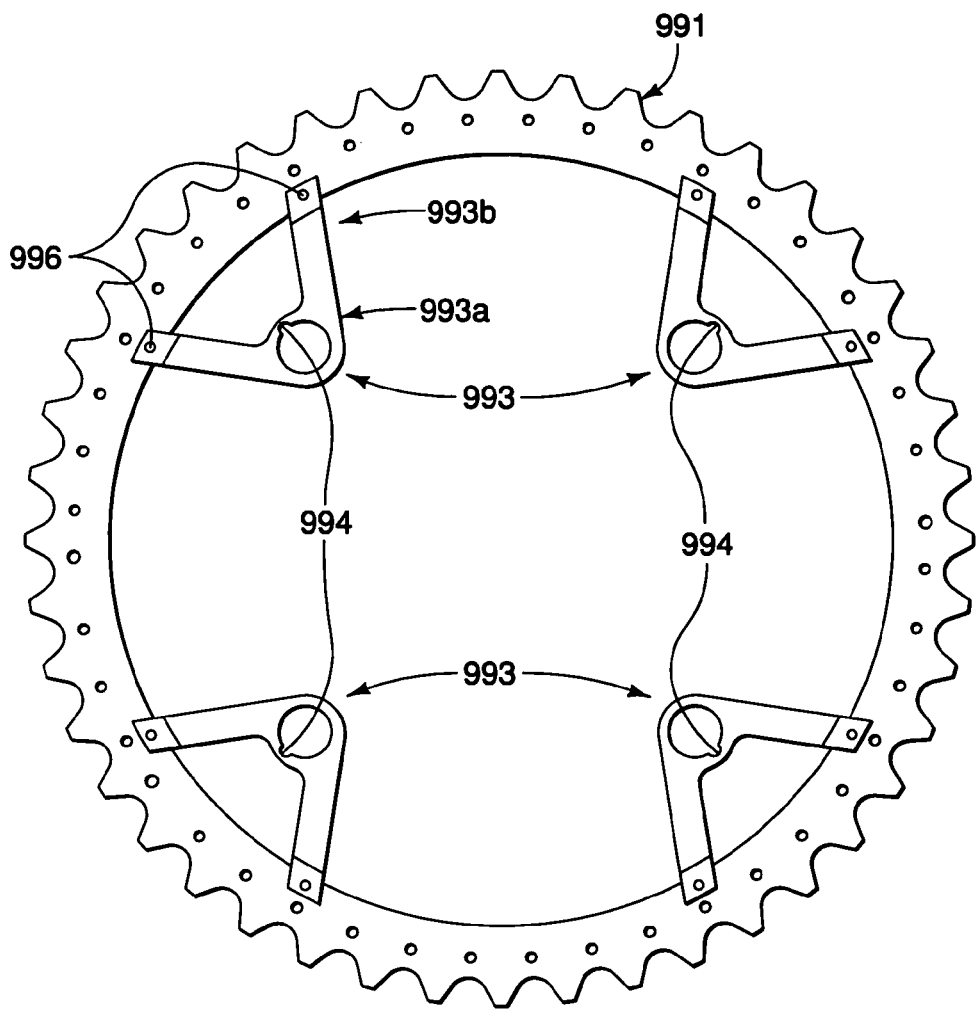
FIG. 40 is an outside elevational view of the sprocket ring part and the attachment parts of the large bicycle sprocket shown in FIGS. 38 and 39 with the synthetic resin fastening part removed.
Figure 41:
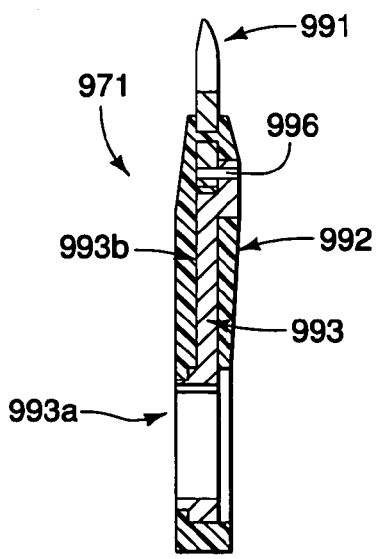
FIG. 41 is an enlarged, partial cross sectional view of the large bicycle sprocket illustrated in FIGS. 38-40 as seen along section line 41-41 in FIG. 38 in accordance with the tenth embodiment of the present invention.
Figure 42:
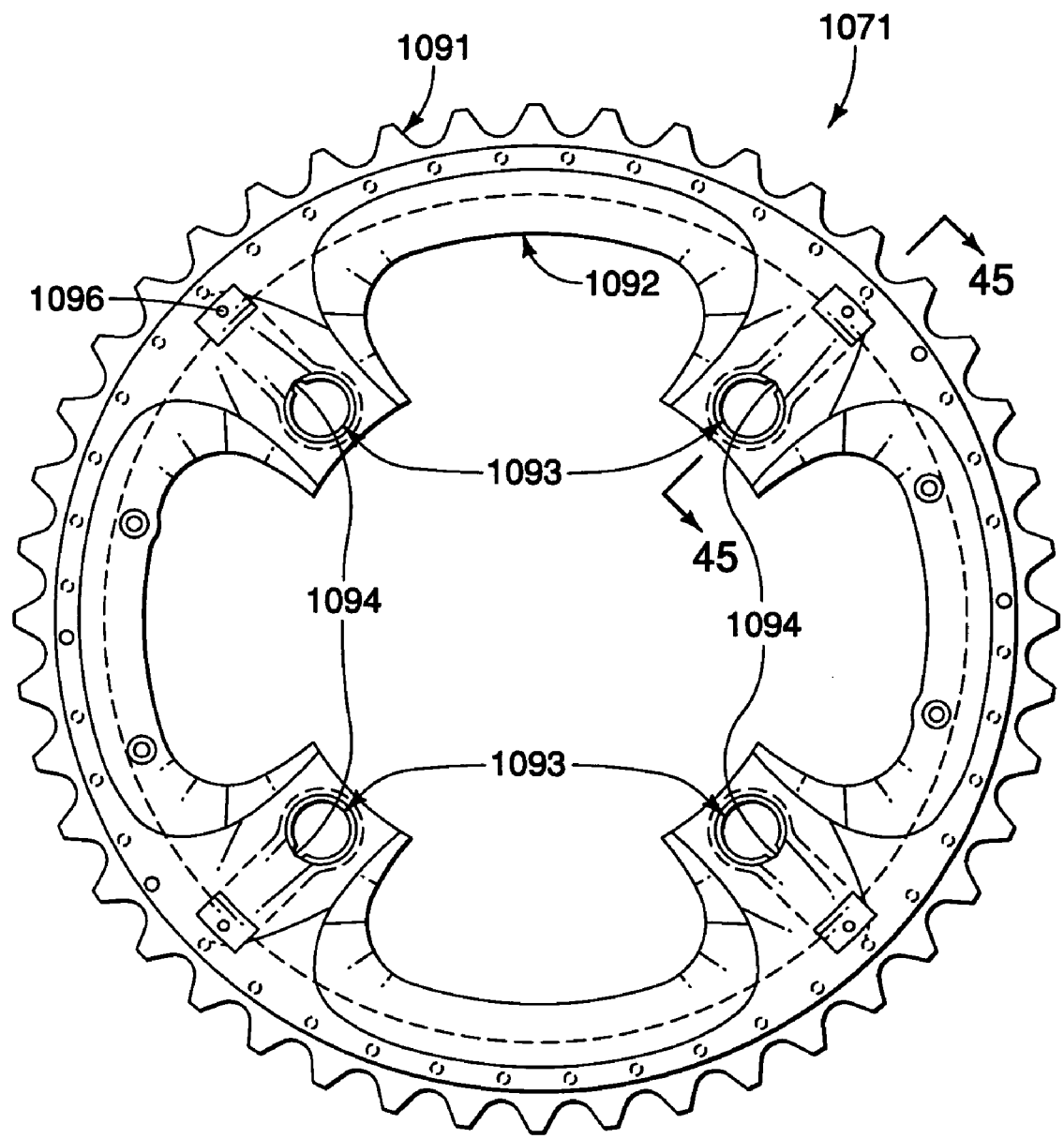
FIG. 42 is an outside elevational view of a large bicycle sprocket in accordance with an eleventh embodiment of the present invention that is used in the crankset of the bicycle of FIG. 1.
Figure 43:
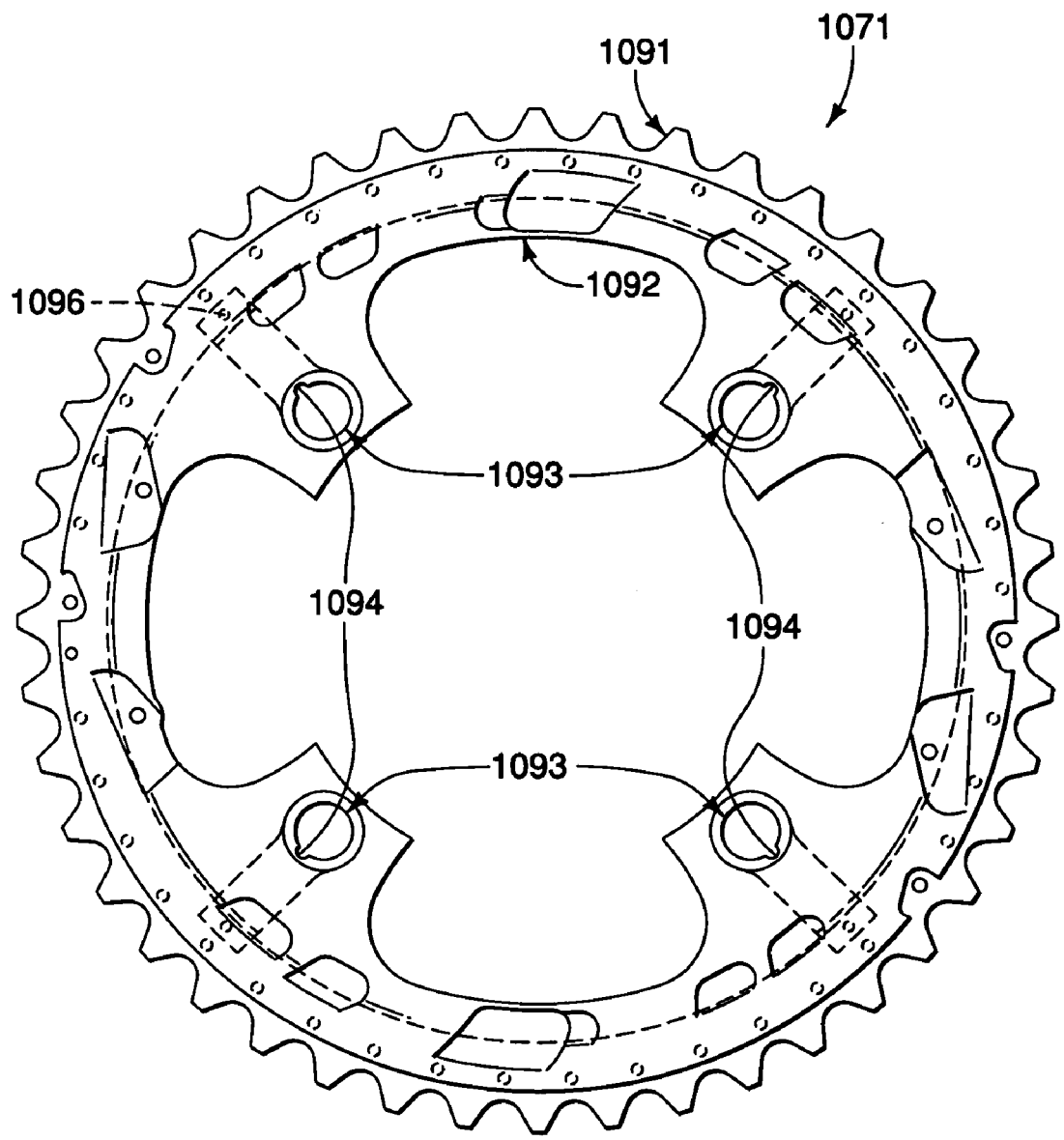
FIG. 43 is an inside elevational view of the large bicycle sprocket illustrated in FIG. 42 in accordance with the eleventh embodiment of the present invention.
Figure 44:
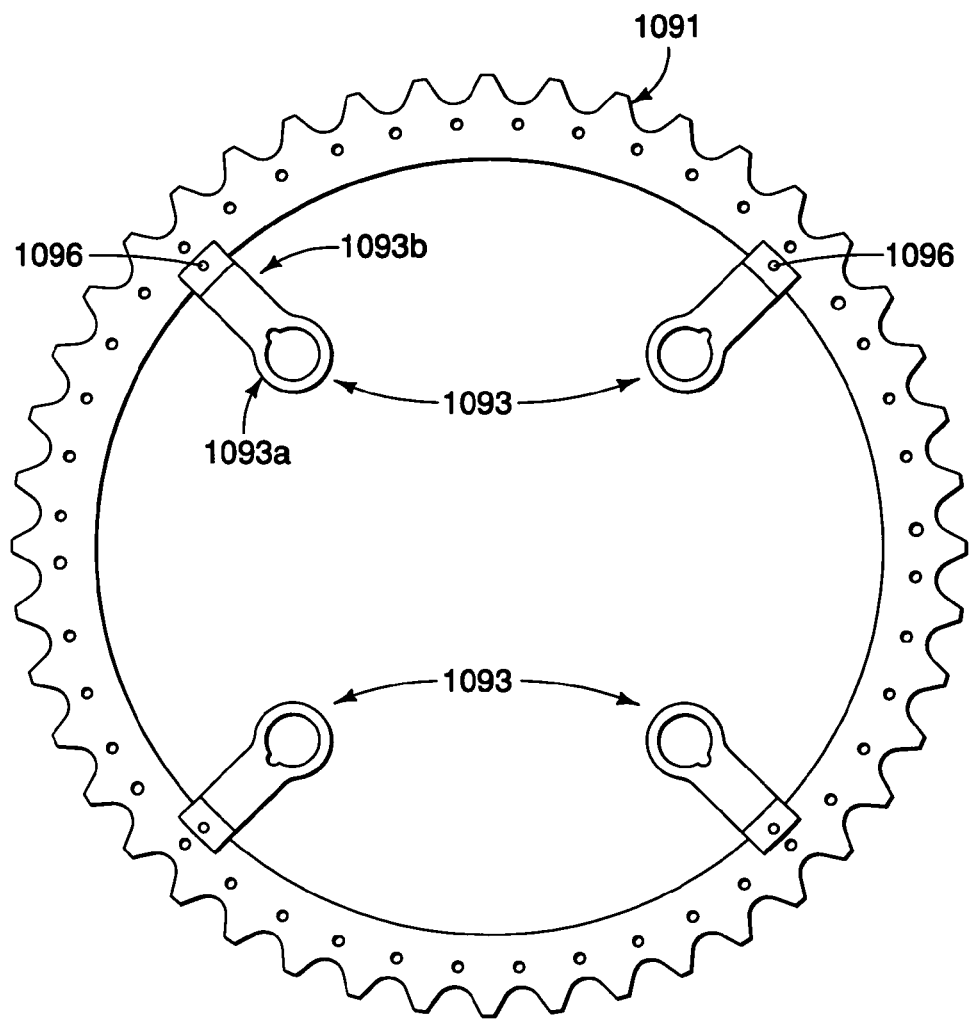
FIG. 44 is an outside elevational view of the sprocket ring part and the attachment parts of the large bicycle sprocket shown in FIGS. 42 and 43 with the synthetic resin fastening part removed.
Figure 45:
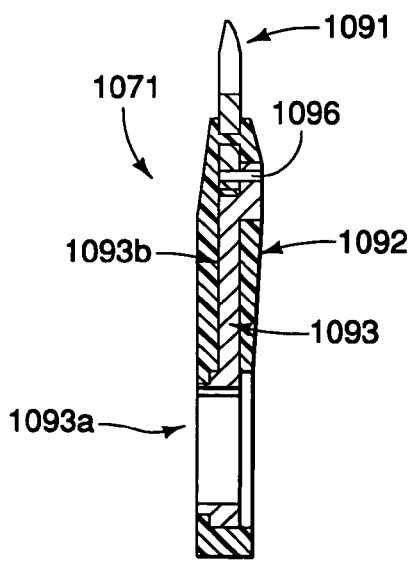
FIG. 45 is an enlarged, partial cross sectional view of the large bicycle sprocket illustrated in FIGS. 42-44 as seen along section line 45-45 in FIG. 42 in accordance with the eleventh embodiment of the present invention.

Referring now to FIGS. 27-29, a sprocket 671 is illustrated in accordance with a seventh embodiment. The sprocket 671 basically includes a metallic sprocket ring part 691, a synthetic resin fastening part 692 and a plurality of attachment parts 693 with a connecting portion 693a and a radial projecting portion 693b. The sprocket 671 is configured and arranged to replace the sprocket 71 in the crankset 51 of the first embodiment. The sprocket 671 is identical to the sprocket 71, as discussed above, except that the inner peripheral edge of the metallic sprocket ring part 691 and the radial projecting portion 693b of the attachment parts 693 have been modified. In view of the similarity between this embodiment and the prior embodiments, the descriptions of the parts of this embodiment that are identical to the parts of the prior embodiments may be omitted for the sake of brevity. Thus, unless otherwise specified or illustrated, the descriptions of the parts of the prior embodiments apply to the corresponding parts of this embodiment.

This embodiment is identical to the sixth embodiment, except that the radial projecting portions 693b overlap with the inner periphery of the sprocket ring part 691 as viewed in a circumferential direction relative to the rotation axis to limit relative circumferential movement between the attachment parts 693 and the sprocket ring part 691. Thus, in this embodiment, the radial projecting portion 693b includes at least two arms 693e that extend outwardly from the connecting portion 693a towards the sprocket ring part 691, and a connected element 693f extending between the arms 693e. The connected element 693f has a mating surface that engage notches 695 that are formed in the inner periphery of the sprocket ring part 691. Thus, the connected elements 693f are disposed so that they overlap with the inner periphery of the sprocket ring part 691 as viewed in a circumferential direction relative to the rotation axis. Preferably, the gaps between the connected element 693f of the attachment parts 693 and the surfaces of the notches 695 are as minimal as manufacturing tolerances allow to limit relative circumferential movement between the attachment parts 693 and the sprocket ring part 691.

Eighth Embodiment

Referring now to FIGS. 30-33, a sprocket 771 is illustrated in accordance with an eighth embodiment. The sprocket 771 basically includes a metallic sprocket ring part 791, a synthetic resin fastening part 792 and a plurality of attachment parts 793 with a connecting portion 793a and a radial projecting portion 793b. The sprocket 771 is configured and arranged to replace the sprocket 71 in the crankset 51 of the first embodiment. The sprocket 771 is identical to the sprocket 71, as discussed above, except that the inner peripheral edge of the metallic sprocket ring part 791 and the radial projecting portion 793b of the attachment parts 793 have been modified. In view of the similarity between this embodiment and the prior embodiments, the descriptions of the parts of this embodiment that are identical to the parts of the prior embodiments may be omitted for the sake of brevity. Thus, unless otherwise specified or illustrated, the descriptions of the parts of the prior embodiments apply to the corresponding parts of this embodiment.

In this embodiment, the metallic sprocket ring part 791 is identical to the metallic sprocket ring part 91, as discussed above, except that the inner peripheral edge of the metallic sprocket ring part 791 is a smooth cylindrical surface. Also in this embodiment, the connecting portions 793a of the attachment parts 793 include a step shaped tubular member 793c surrounding a fastener hole 793d. The connecting portions 793a is identical to the connecting portions 93a, as discussed above, except that an alignment notch 794 in a peripheral surface that defines the fastener hole 793d has been added similar to the fifth embodiment.

Also, in this embodiment, the radial projecting portion 793b includes at least two arms 793e that extend outwardly from the connecting portion 793a towards the sprocket ring part 791 with offset free ends 793f. The offset free ends 793f overlie the inner periphery of the sprocket ring part 791. In this embodiment, no fastener is used to attach the attachment parts 793 to the sprocket ring part 791, expect for the synthetic resin fastening part 792. The synthetic resin fastening part 792 may not overlap the offset free ends 793f such that they are exposed when looking in the axial direction from the outer lateral face of the sprocket 771. Alternatively, the sprocket 771 can be designed so that the synthetic resin fastening part 792 entirely overlaps the attachment parts 793.

Ninth Embodiment

Referring now to FIGS. 34-47, a sprocket 871 is illustrated in accordance with a ninth embodiment. The sprocket 871 basically includes a metallic sprocket ring part 891, a synthetic resin fastening part 892 and a plurality of attachment parts 893 with a connecting portion 893a and a radial projecting portion 893b. The sprocket 871 is configured and arranged to replace the sprocket 71 in the crankset 51 of the first embodiment. The sprocket 871 is identical to the sprocket 71, as discussed above, except that the inner peripheral edge of the metallic sprocket ring part 891 and the radial projecting portion 893b of the attachment parts 893 have been modified. In view of the similarity between this embodiment and the prior embodiments, the descriptions of the parts of this embodiment that are identical to the parts of the prior embodiments may be omitted for the sake of brevity. Thus, unless otherwise specified or illustrated, the descriptions of the parts of the prior embodiments apply to the corresponding parts of this embodiment.

This embodiment is identical to the second embodiment (FIGS. 11-14), except that the radial projecting portions 893b overlap with the inner periphery of the sprocket ring part 891 as in the eighth embodiment (FIGS. 30-33). Thus, in this embodiment, the metallic sprocket ring part 891 is identical to the metallic sprocket ring part 191, as discussed above, except that the inner peripheral edge of the metallic sprocket ring part 891 is a smooth cylindrical surface. Also in this embodiment, the connecting portions 893a of the attachment parts 893 include a step shaped tubular member 893c surrounding a fastener hole 893d with a notch 894, similar to the second embodiment. The connecting portions 893a are identical to the connecting portions 193a, as discussed above. The radial projecting portions 893b of the attachment parts 893 are each merely a single arm that extends in a radial direction from the connecting portions 893a, respectively, similar to the second embodiment. However, the radial projecting portions 893b are configured with offset free ends 893f that overlie the inner periphery of the sprocket ring part 891. In this embodiment, no fastener is used to attach the attachment parts 893 to the sprocket ring part 891, expect for the synthetic resin fastening part 892. The synthetic resin fastening part 892 may not overlap the offset free ends 893f such that they are exposed when looking in the axial direction from the outer lateral face of the sprocket 871. Alternatively, the sprocket 871 can be designed so that the synthetic resin fastening part 892 entirely overlaps the attachment parts 893.

Tenth Embodiment

Referring now to FIGS. 38-41, a sprocket 971 is illustrated in accordance with a tenth embodiment. The sprocket 971 basically includes a metallic sprocket ring part 991, a synthetic resin fastening part 992 and a plurality of attachment parts 993 with a connecting portion 993a and a radial projecting portion 993b. The sprocket 971 is configured and arranged to replace the sprocket 71 in the crankset 51 of the first embodiment. This embodiment is identical to the eighth embodiment (FIGS. 30-33), except that fasteners (rivets) 996 secure the sprocket ring part 991 to the radial projecting portions 993b. Thus, the sprocket 971 is identical to the sprocket 771, as discussed above, except that the fasteners (rivets) 996 have been added. In view of the similarity between this embodiment and the prior embodiments, the descriptions of the parts of this embodiment that are identical to the parts of the prior embodiments may be omitted for the sake of brevity. Thus, unless otherwise specified or illustrated, the descriptions of the parts of the prior embodiments apply to the corresponding parts of this embodiment. In this embodiment, since the attachment parts 993 are secured to the sprocket ring part 991 by the fasteners 996, the sprocket 971 can be designed so that each attachment part 993 is entirely exposed so as not to be embedded by the synthetic resin fastening part 992.

Eleventh Embodiment

Referring now to FIGS. 42-45, a sprocket 1071 is illustrated in accordance with an eleventh embodiment. The sprocket 1071 basically includes a metallic sprocket ring part 1091, a synthetic resin fastening part 1092 and a plurality of attachment parts 1093 with a connecting portion 1093a and a radial projecting portion 1093b. The sprocket 1071 is configured and arranged to replace the sprocket 71 in the crankset 51 of the first embodiment. This embodiment is identical to the ninth embodiment (FIGS. 34-47), except that fasteners (rivets) 1096 secure the sprocket ring part 1091 to the radial projecting portions 1093b. Thus, the sprocket 1071 is identical to the sprocket 871, as discussed above, except that the fasteners (rivets) 1096 have been added. In view of the similarity between this embodiment and the prior embodiments, the descriptions of the parts of this embodiment that are identical to the parts of the prior embodiments may be omitted for the sake of brevity. Thus, unless otherwise specified or illustrated, the descriptions of the parts of the prior embodiments apply to the corresponding parts of this embodiment. In this embodiment, since the attachment parts 1093 are secured to the sprocket ring part 1091 by the fasteners 1096, the sprocket 1071 can be designed so that each attachment part 1093 is entirely exposed so as not to be embedded by the synthetic resin fastening part 1092.

Rear Sprocket Assembly

Figure 46:
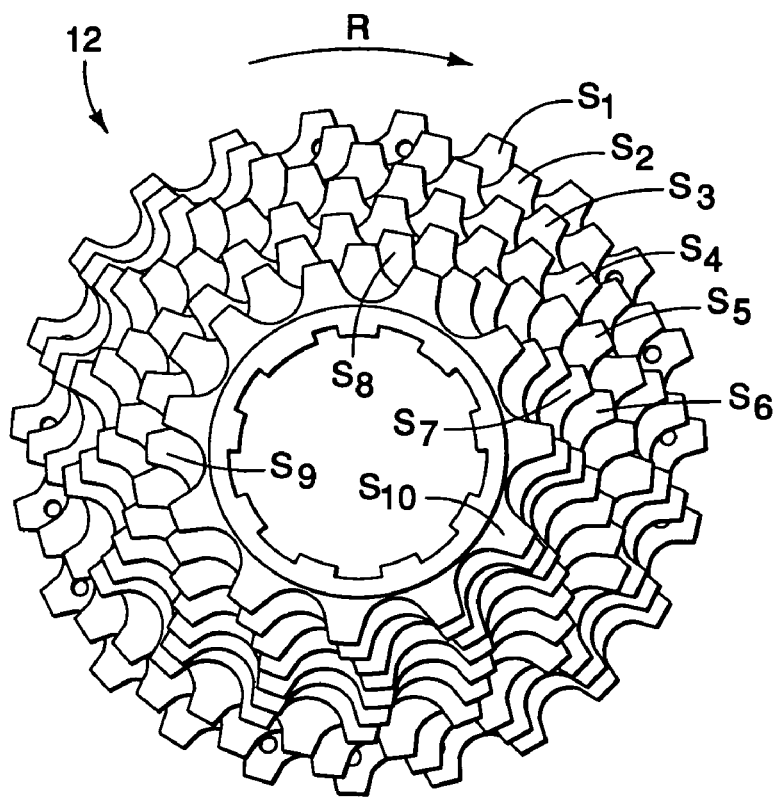
FIG. 46 is an outside elevational view of the rear cassette sprockets in accordance with the present invention that is to be installed on the rear hub of the bicycle of FIG. 1.
Figure 47:
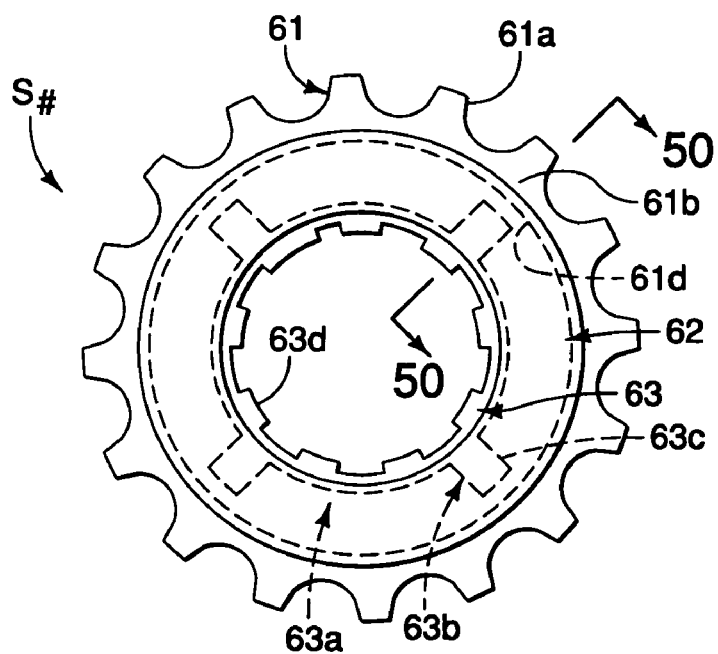
FIG. 47 is an outside elevational view of one the rear cassette sprockets in accordance with the present invention.
Figure 48:
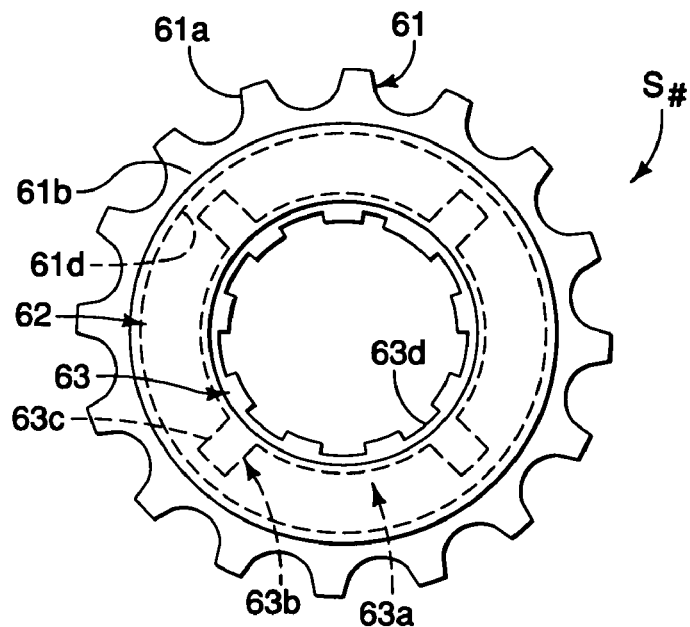
FIG. 48 is an inside elevational view of the rear cassette sprocket illustrated in FIG. 47 in accordance with the present invention.

As shown in FIG. 46, the rear sprocket assembly or small rear gear unit 43 includes a plurality of gears or sprockets S1 to S10. Each of the rear sprockets S1 to S10 is identical in construction, except for the diameter and number of teeth. Thus, only one rear sprocket $S_\#$ will be generically illustrated and discussed herein, as seen in FIGS. 47-50.

Basically, as seen in FIGS. 47-50, each rear sprocket $S_\#$ comprises a metallic sprocket ring part 61, a synthetic resin fastening part 62 and an attachment part 63. The synthetic resin fastening part 62 is integrally molded onto the sprocket ring part 61 and the attachment parts 63 by, for example, insert molding or outsert molding. In this embodiment, the attachment parts 63 are spaced radially inward of the sprocket ring part 61 so that no direct physical contact exists between the sprocket ring part 61 and the attachment parts 63. Moreover, in this embodiment, the attachment parts 63 do not overlap in the circumferential direction with the sprocket ring part 61.

The sprocket ring part 61 is a metallic ring shaped member or element that is an integral, one-piece unitary member made of, for example, an aluminum alloy with an anodic oxide coating formed on the surface. The sprocket ring part 61 basically includes a plurality of sprocket teeth 61a, an outer lateral side face 61b, an inner lateral side face 61c and the internal peripheral edge 61d. The sprocket teeth 61a are formed outer periphery of the sprocket ring part 61 for selectively receiving the chain 44. The lateral side faces 61b and 61c form two sides of the sprocket ring part 61 in which the synthetic resin fastening part 62 is at least partially molded around both of the sides of the sprocket ring part 61. Optionally, a plurality of through-holes are provided in the sprocket ring part 61 such that the extend between the sides (the outer and inner lateral side faces 61b and 61c) of the sprocket ring part 61 and the synthetic resin fastening part 62 extends through the through-holes of the sprocket ring part 61.

The synthetic resin fastening part 62 is configured and arranged to non-movably fix the attachment parts 63 to the sprocket ring part 61. The synthetic resin fastening part 62 is preferably a polyamide-based synthetic resin that is impregnated with a filler material such as carbon fibers. The synthetic resin preferably chemically reacts with diffusion layers on the sprocket ring part 61 and the attachment parts 63 to chemically bond the synthetic resin fastening part 62 to the sprocket ring part 61 and the attachment parts 63. Thus, the synthetic resin fastening part 62 is integrally molded onto the sprocket ring part 61 and the attachment parts 63. Preferably, the synthetic resin fastening part 62 is integrally formed on both of the outer and inner lateral side faces 61b and 61c of the sprocket ring part 61 and the attachment parts 63 so as to cover at least an inner peripheral portion of the sprocket ring part 61 located inward in relation to the sprocket teeth 61a and at least an outermost portion of each of the attachment parts 63.

The attachment part 63 is formed as a separate member from the sprocket ring part 61 and the synthetic resin fastening part 62. The attachment part 63 is at least partially embedded within the synthetic resin fastening part 62. The attachment part 63 is preferably one-piece, unitary member that is formed of a hard rigid material that is more rigid and/or harder than the synthetic resin fastening part 62. More preferably, the attachment part 63 is formed of a material that is the same as the sprocket ring part 61. For example, in one preferred embodiment, the attachment part 63 is formed of an aluminum alloy with an anodic oxide coating formed on the surface.

Figure 49:
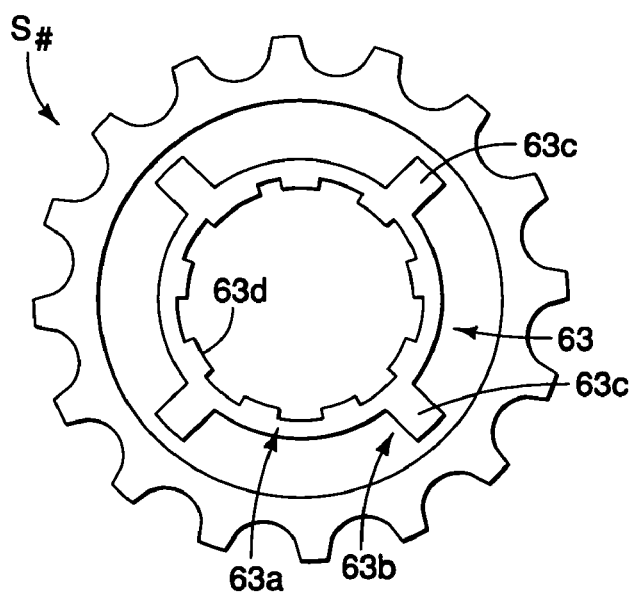
FIG. 49 is an outside elevational view of the rear cassette sprocket shown in FIGS. 47 and 48 with the synthetic resin fastening part removed.
Figure 50:
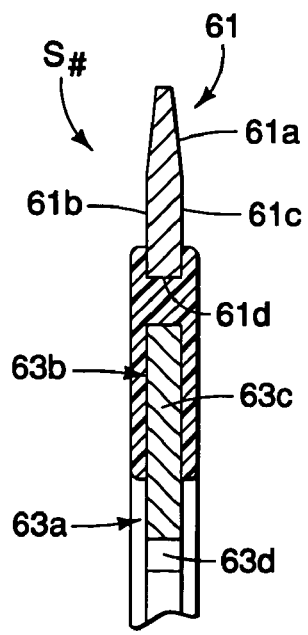
FIG. 50 is an enlarged, partial cross sectional view of the rear cassette sprocket illustrated in FIGS. 47-49 as seen along section line 50-50 in FIG. 47 in accordance with the present invention.
Figure 51:
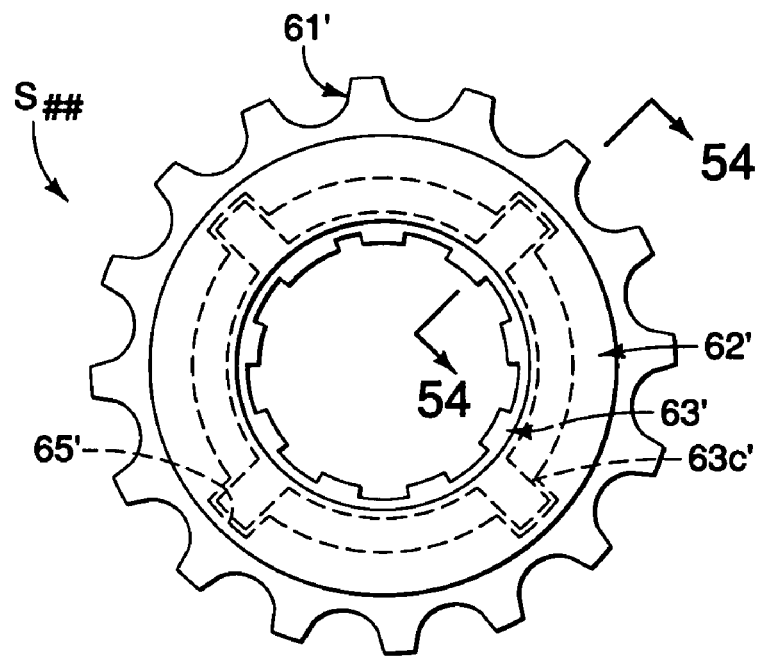
FIG. 51 is an outside elevational view of a rear cassette sprocket in accordance with an alternate embodiment of the present invention.
Figure 52:
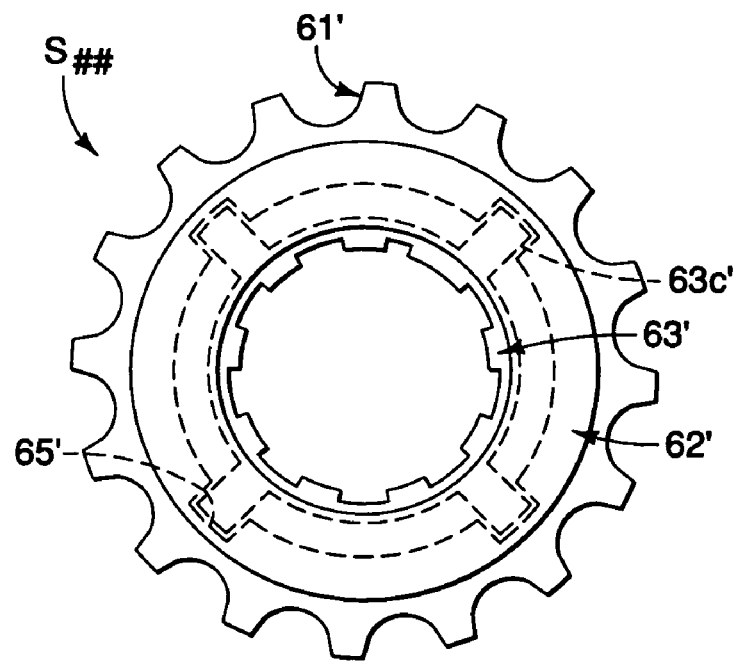
FIG. 52 is an inside elevational view of the rear cassette sprocket illustrated in FIG. 51 in accordance with the present invention.
Figure 53:
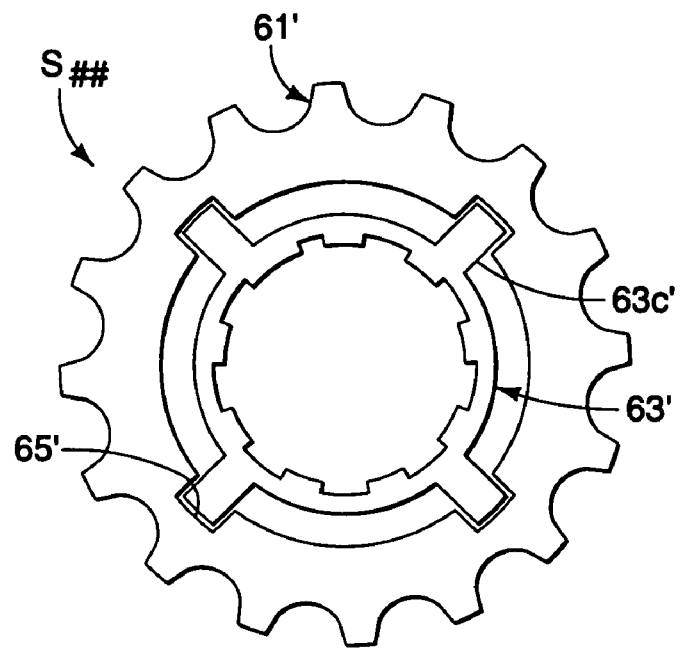
FIG. 53 is an outside elevational view of the rear cassette sprocket shown in FIGS. 51 and 52 with the synthetic resin fastening part removed.
Figure 54:
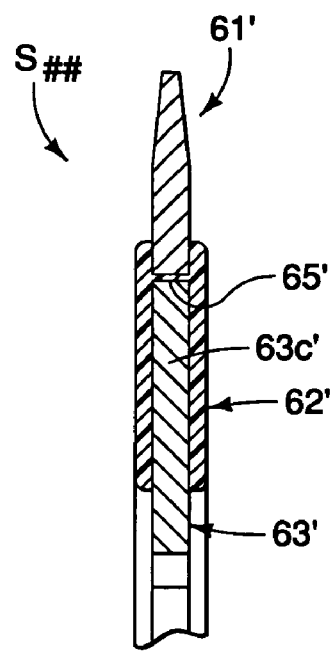
FIG. 54 is an enlarged, partial cross sectional view of the rear cassette sprocket illustrated in FIGS. 51-53 as seen along section line 54-54 in FIG. 51 in accordance with the present invention.

As best seen in FIG. 49, the attachment part 63 basically includes a connecting portion 63a and a radial projecting portion 63b formed of four radial arms 63c. The connecting portion 63a includes a splined inner peripheral surface 63d. The radial arms 63c extends outwardly from the connecting portion 63a to space the connecting portion 63a radially inward of the sprocket ring part 61. The connecting portion 93a acts as a fastening point for securing the sprocket to the rear hub. The radial arms 63c act as reinforcements for the synthetic resin fastening part 62.

As shown in FIGS. 51-54, the gears or sprockets $S_\#$ of the rear sprocket assembly or small rear gear unit 43 can be substituted with modified gears or sprockets $S_{\#\#}$ that include a metallic sprocket ring part 61', a synthetic resin fastening part 62' and an attachment part 63'. The only difference between sprockets $S_\#$ and sprockets $S_{\#\#}$ is that the radial arms 63c' of the attachment part 63' overlap with the sprocket ring part 61' in a circumferential direction to limit relative circumferential movement between the attachment part 63' and the sprocket ring part 61'. Thus, the free ends of the radial arms 63c' are disposed in the notches 65' of the inner periphery of the sprocket ring part 61' so that the free ends the radial arms 63c' overlap with the inner periphery of the sprocket ring part 61' as viewed in a circumferential direction relative to the rotation axis. The notches 65' of the inner periphery of the sprocket ring part 61' are configured relative to the free ends of the radial arms 63c' to limit relative circumferential movement between attachment part 63' and the sprocket ring part 61'. Thus, the gaps between the free ends of the radial arms 63c' and the surfaces of the notches 65' are preferably as minimal as manufacturing tolerances allow to limit relative circumferential movement between attachment part 63' and the sprocket ring part 61'.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle sprocket comprising:
   a sprocket ring part including an inner periphery and an outer periphery with a plurality of sprocket teeth arranged on the outer periphery, the sprocket ring part extending around a central rotation axis;
   a synthetic resin fastening part non-movably coupled to the sprocket ring part at a location radially inward of the sprocket teeth relative to the rotation axis; and
   a first attachment part at least partially embedded within the synthetic resin fastening part, the first attachment part including a connecting portion and a radial projecting portion extending outwardly from the connecting portion, the first attachment part being formed as a separate member from the sprocket ring part and the synthetic resin fastening part, and the synthetic resin fastening part overlying opposite axial faces of the radial projecting portion of the first attachment part with respect to the central rotation axis; and
   a second attachment part at least partially embedded within the synthetic resin fastening part, the second attachment part including a connecting portion and a radial projecting portion extending outwardly from the connecting portion to space the connecting portion radially inward of the sprocket ring part, the second attachment part being formed as a separate member from the sprocket ring part and the synthetic resin fastening part, and the synthetic resin fastening part overlying opposite axial faces of the radial projecting portion of the second attachment part with respect to the central rotation axis, the first and second attachment parts being separate members which are spaced relative to each other about the central rotation axis.

2. The bicycle sprocket as recited in claim 1, wherein the connecting portions of the first and second attachment parts each includes a fastener hole.

3. The bicycle sprocket as recited in claim 2, wherein the connecting portions of the first and second attachment parts each includes an alignment notch in a peripheral surface that defines the fastener hole of a respective one of the first and second attachment parts.

4. The bicycle sprocket as recited in claim 1, wherein each of the radial projecting portions has a free end that is cantilevered relative to a respective one of the connecting portions.

5. The bicycle sprocket as recited in claim 4, wherein the free end of each of the radial projecting portions is disposed so that the free end of each of the radial projecting portions overlaps with the inner periphery of the sprocket ring part axially relative to the rotation axis.

6. The bicycle sprocket as recited in claim 4, wherein the free end of each of the radial projecting portions is disposed in a notch of the inner periphery of the sprocket ring part.

7. The bicycle sprocket as recited in claim 1, wherein the first and second attachment parts are each constructed as one-piece, unitary members from a metallic material.

8. The bicycle sprocket as recited in claim 7, wherein the first and second attachment parts are each constructed of an aluminum alloy.

9. The bicycle sprocket as recited in claim 1, wherein the radial projecting portions of the first and second attachment parts each includes at least two arms extending outwardly from a respective one of the connecting portions towards the sprocket ring part.

10. The bicycle sprocket as recited in claim 8, wherein each of the arms of the radial projecting portions of the first and second attachment parts has a free end that is cantilevered relative to the connecting portions.

11. The bicycle sprocket as recited in claim 10, wherein the free ends of the arms of the attachment parts are disposed in notches of the inner periphery of the sprocket ring part so that the free ends of the arms of the attachment parts overlap the inner periphery of the sprocket ring part in a circumferential direction.

12. The bicycle sprocket as recited in claim 11, wherein the notches of the inner periphery of the sprocket ring part are configured relative to the free ends of the arms of the attachment parts to limit relative circumferential movement between the attachment parts and the sprocket ring part.

13. The bicycle sprocket as recited in claim 9, wherein the arms of the radial projecting portions of each of the attachment parts are connected by a connected element to form a closed loop relative to each of the connecting portions with the synthetic resin fastening part disposed therein.

14. The bicycle sprocket as recited in claim 1, wherein the sprocket ring part is constructed of a metallic material.

15. The bicycle sprocket as recited in claim 1, wherein the sprocket ring part is constructed of an aluminum alloy.

16. The bicycle sprocket as recited in claim 1, wherein the sprocket ring part includes a pair of sides and the synthetic resin fastening part is at least partially molded around both of the sides of the sprocket ring part.

17. The bicycle sprocket as recited in claim 16, wherein the sprocket ring part includes a plurality of holes extending between the sides of the sprocket ring part and the synthetic resin fastening part extends through the holes of the sprocket ring part.

18. The bicycle sprocket as recited in claim 1, wherein
the synthetic resin fastening part is constructed of a polyamide based synthetic resin with a carbon fiber filler impregnated therein.

19. The bicycle sprocket as recited in claim 1, wherein
the radial projecting portions of the first and second attachment parts extend a majority of a radial distance with respect to the central rotation axis between the connecting portions of the first and second attachment parts, respectively, and the sprocket ring part.

20. The bicycle sprocket as recited in claim 1, wherein
the connecting portions of the first and second attachment parts each includes a fastener hole having a predetermined inner diameter, with the radial projecting portions of the first and second attachment parts each extending farther in a radial outward direction with respect to the central rotation axis from the connecting portions of the first and second attachment parts, respectively, by a radial distance that is larger than the predetermined inner diameter.

21. A bicycle sprocket comprising:
a sprocket ring part including an inner periphery and an outer periphery with a plurality of sprocket teeth arranged on the outer periphery, the sprocket ring part extending around a central rotation axis;
a synthetic resin fastening part non-movably coupled to the sprocket ring part at a location radially inwardly of the sprocket teeth relative to the rotation axis; and
a pair of attachment parts at least partially embedded within the synthetic resin fastening part, the attachment parts being separate members which are spaced relative to each other about the central rotation axis the attachment parts each including a connecting portion and a radial projecting portion extending outwardly from the connecting portion, the attachment parts each being formed as a separate member from the sprocket ring part and the synthetic resin fastening part,
the radial projecting portions of the attachment parts each including at least two arms extending outwardly from a respective one of the connecting portions towards the sprocket ring part, each of the arms having a free end that is cantilevered relative to a respective one of the connecting portions, with the arms of the radial projecting portion of each of the attachment parts being spaced radially inward of the inner periphery of the sprocket ring part with the synthetic resin fastening part disposed therebetween in a radial direction, and with the arms of the radial projecting portion of each of the attachment parts being completely disposed in an axial direction between opposite axial faces of the synthetic resin fastening part with respect to the central rotation axis.

22. A bicycle sprocket comprising:
a sprocket ring part including an inner periphery and an outer periphery with a plurality of sprocket teeth arranged on the outer periphery, the sprocket ring part extending around a central rotation axis;
a synthetic resin fastening part non-movably coupled to the sprocket ring part at a location radially inwardly of the sprocket teeth relative to the rotation axis; and
a pair of attachment parts at least partially embedded within the synthetic resin fastening part, the attachment parts being separate members which are spaced relative to each other about the central rotation axis, the attachment parts each including a connecting portion and a radial projecting portion extending outwardly from the connecting portion to space the connecting portion radially inward of the sprocket ring part, the attachment parts each being formed as a separate member from the sprocket ring part and the synthetic resin fastening part,
the radial projecting portions of the attachment parts each including at least two arms extending outwardly from a respective one of the connecting portions towards the sprocket ring part, each of the arms of the radial projecting portion of each of the attachment parts having a free end that is cantilevered relative to a respective one of the connecting portions, with the arms of the radial projecting portion of each of the attachment parts being configured and arranged to define a V-shape relative to a respective one of the connecting portions.

23. A bicycle sprocket comprising:
a sprocket ring part including an inner periphery and an outer periphery with a plurality of sprocket teeth arranged on the outer periphery, the sprocket ring part extending around a central rotation axis;
a synthetic resin fastening part non-movably coupled to the sprocket ring part at a location radially inwardly of the sprocket teeth relative to the rotation axis; and
a pair of attachment parts at least partially embedded within the synthetic resin fastening part, the attachment parts being separate members which are spaced relative to each other about the central rotation axis, the attachment parts each including a connecting portion with a fastener hole, and a radial projecting portion extending outwardly from the connecting portion, the attachment parts each being formed as a separate member from the sprocket ring part and the synthetic resin fastening part, and the synthetic resin fastening part overlying opposite axial faces of the radial projecting portion of each of the attachment parts with respect to the central rotation axis,
the connecting portions of the attachment parts each including a tubular member surrounding the fastener hole and extending in an axial direction relative to the central rotation axis of the sprocket ring part such that an overall axial thickness of each of the connecting portions is greater than an overall axial thickness of each of the radial projecting portions of the attachment parts.

24. A bicycle sprocket comprising:
a sprocket ring part including an inner periphery and an outer periphery with a plurality of sprocket teeth arranged on the outer periphery, the sprocket ring part extending around a central rotation axis;
a synthetic resin fastening part non-movably coupled to the sprocket ring part at a location radially inwardly of the sprocket teeth relative to the rotation axis; and
a first attachment part at least partially embedded within the synthetic resin fastening part, the first attachment part including a connecting portion and a radial projecting portion extending outwardly from the connecting portion, the first attachment part being formed as a separate member from the sprocket ring part and the synthetic resin fastening part,
a second attachment part at least partially embedded within the synthetic resin fastening part, the first and second attachment parts being separate members which are spaced relative to each other about the central rotation axis, the second attachment part including a connecting portion and a radial projecting portion extending outwardly from the connecting portion to space the connecting portion radially inward of the sprocket ring part, the second attachment part being formed as a separate member from the sprocket ring part and the synthetic resin fastening part,
the radial projecting portions of the first and second attachment parts each including at least two arms extending outwardly from a respective one of the connecting portions towards the sprocket ring part, each of the radial projecting portions having a free end that is cantilevered relative to a respective one of the connecting portions, with the arms of the first and second attachment parts being spaced radially inward of the inner periphery of the sprocket ring part with the synthetic resin fastening part disposed therebetween in a radial direction, and with the arms of the first and second attachment parts being completely disposed in an axial direction between opposite axial faces of the synthetic resin fastening part with respect to the central rotation axis.

25. A bicycle sprocket comprising:

a sprocket ring part including an inner periphery and an outer periphery with a plurality of sprocket teeth arranged on the outer periphery, the sprocket ring part extending around a central rotation axis;

a synthetic resin fastening part non-movably coupled to the sprocket ring part at a location radially inwardly of the sprocket teeth relative to the rotation axis; and a first attachment part at least partially embedded within the synthetic resin fastening part, the first attachment part including a connecting portion and a radial projecting portion extending outwardly from the connecting portion, the first attachment part being formed as a separate member from the sprocket ring part and the synthetic resin fastening part; and a second attachment part at least partially embedded within the synthetic resin fastening part, the first and second attachment parts being separate members which are spaced relative to each other about the central rotation axis, the second attachment part including a connecting portion and a radial projecting portion extending outwardly from the connecting portion to space the connecting portion radially inward of the sprocket ring part, the second attachment part being formed as a separate member from the sprocket ring part and the synthetic resin fastening part, the radial projecting portions of the first and second attachment parts each including at least two arms extending outwardly from a respective one of the connecting portions towards the sprocket ring part, each of the radial projecting portions having a free end that is cantilevered relative to a respective one of the connecting portions, with the arms of the first and second attachment parts each being configured and arranged to define a V-shape relative to the connecting portions of the first and second attachment parts, respectively.

26. A bicycle sprocket comprising:

a sprocket ring part including an inner periphery and an outer periphery with a plurality of sprocket teeth arranged on the outer periphery, the sprocket ring part extending around a central rotation axis;

a synthetic resin fastening part non-movably coupled to the sprocket ring part at a location radially inwardly of the sprocket teeth relative to the rotation axis; and a first attachment part at least partially embedded within the synthetic resin fastening part, the first attachment part including a connecting portion with a fastener hole, and a radial projecting portion extending outwardly from the connecting portion, the first attachment part being formed as a separate member from the sprocket ring part and the synthetic resin fastening part, and the synthetic resin fastening part overlying opposite axial faces of the radial projecting portion of the first attachment part with respect to the central rotation axis, a second attachment part at least partially embedded within the synthetic resin fastening part, the first and second attachment parts being separate members which are spaced relative to each other about the central rotation axis, the second attachment part including a connecting portion with a fastener hole, and a radial projecting portion extending outwardly from the connecting portion to space the connecting portion radially inward of the sprocket ring part, the second attachment part being formed as a separate member from the sprocket ring part and the synthetic resin fastening part, and the synthetic resin fastening part overlying opposite axial faces of the radial projecting portion of the second attachment part with respect to the central rotation axis, the connecting portions of the first and second attachment parts including tubular members surrounding the fastener holes and extending in an axial direction relative to the central rotation axis of the sprocket ring part such that an overall axial thickness of each of the connecting portions is greater than an overall axial thickness of each of the radial projecting portions, respectively.

27. A bicycle sprocket comprising:

a sprocket ring part including an inner periphery and an outer periphery with a plurality of sprocket teeth arranged on the outer periphery, the sprocket ring part extending around a central rotation axis;

a synthetic resin fastening part non-movably coupled to the sprocket ring part at a location radially inward of the sprocket teeth relative to the rotation axis;

a first attachment part at least partially embedded within the synthetic resin fastening part, the first attachment part including a connecting portion and a radial projecting portion extending outwardly from the connecting portion, the radial projecting portion having a distal end that is secured to the sprocket ring part by a fastener, the first attachment part being formed as a separate member from the sprocket ring part and the synthetic resin fastening part, and the synthetic resin fastening part overlying opposite axial faces of the radial projecting portion of the first attachment part with respect to the central rotation axis; and a second attachment part at least partially embedded within the synthetic resin fastening part, the second attachment part including a connecting portion and a radial projecting portion extending outwardly from the connecting portion to space the connecting portion radially inward of the sprocket ring part, the radial projecting portion having a distal end that is secured to the sprocket ring part by a fastener, the second attachment part being formed as a separate member from the sprocket ring part and the synthetic resin fastening part, and the synthetic resin fastening part overlying opposite axial faces of the radial projecting portion of the second attachment part with respect to the central rotation axis, the first and second attachment parts being separate members which are spaced relative to each other about the central rotation axis.

28. The bicycle sprocket as recited in claim 27, wherein the connecting portions of the first and second attachment parts each includes a fastener hole.

* * * * *